United States Patent
Schechter

(10) Patent No.: US 6,223,846 B1
(45) Date of Patent: May 1, 2001

(54) VEHICLE OPERATING METHOD AND SYSTEM

(76) Inventor: Michael M. Schechter, 31110 Country Ridge Cir., Farmington Hills, MI (US) 48331

( * ) Notice: Subject to any disclaimer, the term of this patent is extended or adjusted under 35 U.S.C. 154(b) by 0 days.

(21) Appl. No.: 09/098,010

(22) Filed: Jun. 15, 1998

(51) Int. Cl.$^7$ ................................................. B60K 6/12
(52) U.S. Cl. .................... 180/165; 180/302; 123/90.12
(58) Field of Search .................. 180/165, 69.4, 180/69.5, 302; 477/37, 186, 188, 189, 209; 123/188.2, 90.12, 65 SP, 527, 531; 60/712

(56) References Cited

U.S. PATENT DOCUMENTS

| | | | |
|---|---|---|---|
| 2,146,265 | * 2/1939 | Moore, Jr. | 123/531 |
| 4,361,204 | * 11/1982 | Earle | 180/302 |
| 4,478,304 | * 10/1984 | Delano | 180/165 |
| 4,523,550 | * 6/1985 | Matsuura | 123/90.12 |
| 4,798,053 | * 1/1989 | Chang | 180/165 |
| 5,113,829 | * 5/1992 | Motoyama | 123/531 |
| 5,255,641 | 10/1993 | Schechter | 123/90.11 |
| 5,259,345 | * 11/1993 | Richeson | 123/90.12 |
| 5,529,549 | 6/1996 | Moyer | 477/189 |
| 5,531,199 | * 7/1996 | Bryant et al. | 123/527 |
| 5,572,961 | * 11/1996 | Schechter et al. | 123/90.12 |
| 5,619,965 | * 4/1997 | Cosma et al. | 123/90.12 |
| 5,695,430 | 12/1997 | Moyer | 477/189 |

FOREIGN PATENT DOCUMENTS

| | | | |
|---|---|---|---|
| 2372044 | * 7/1978 | (FR) | 180/165 |
| 2507253 | * 12/1982 | (FR) | 180/302 |

OTHER PUBLICATIONS

M. Schechter and M. Levin, "Camless Engine", Feb. 1996 SAE 960581 pp. 22 to 26.

* cited by examiner

Primary Examiner—Frank Vanaman

(57) ABSTRACT

A method and a system for converting kinetic energy of a vehicle and part of energy supplied by its engine into energy of compressed air and using it to assist in vehicle propulsion later. A novel system of valves employing variable valve timing and valve deactivation is used to implement and control a two-way flow of compressed air between the engine and an air-reservoir where air-temperature control is maintained. During operation with compressed-air assist the engine operates both as an air-motor and as an internal combustion engine during each cycle in each cylinder. The engine can selectively and interchangeably operate either as a four-stroke or as a two-stroke internal combustion engine.

51 Claims, 17 Drawing Sheets

VEHICLE OPERATING METHOD AND SYSTEM

FIELD OF THE INVENTION

The present invention relates to vehicle systems capable to accumulate energy derived from vehicle motion during its deceleration or obtained from operation of the vehicle engine, and use the accumulated energy to assist in vehicle acceleration and propulsion at a later time.

BACKGROUND OF THE INVENTION

Most automotive vehicles are propelled by internal combustion engines consuming hydrocarbon fuels. Burning these fuels produces exhaust gas containing harmful air-pollutants, such as carbon monoxide, nitrogen oxides, and unburned hydrocarbons. It also contains substantial amount of carbon dioxide which, if produced in large quantities worldwide over long period of time, can contribute to an undesirable increase in average global temperature. Concern for clean air and a desire to prevent adverse consequences of man-made global warming dictate a need to substantially improve fuel efficiency of automotive vehicles.

By itself, the internal combustion engine is a reasonably efficient machine. Unfortunately, the driving pattern of most automotive vehicles is such, that a substantial fraction of energy produced by their engines is wasted. Typically, the driving pattern involves frequent accelerations, each followed by a deceleration. Each acceleration involves a significant increase in fuel consumption needed to produce the additional energy necessary to increase the vehicle speed. Then, during a subsequent deceleration, this added energy is absorbed by vehicle brakes and dissipated as heat.

Attempts to overcome such waste of energy led to development of systems in which the energy of vehicle motion is not dissipated during braking, but converted into a form in which it can be temporarily stored and, then, used again to accelerate the vehicle at a later time. Typically, such system includes an internal combustion engine, an energy storage, and a second machine absorbing the energy of vehicle motion and placing it into the storage during braking. During subsequent acceleration, the second machine receives energy from the energy storage and uses it to supplement the work of the internal combustion engine. Such systems are known as hybrid vehicle systems. An electric hybrid includes an electric generator/motor as a second machine, and an electric battery for energy storage. A fluid-power hybrid includes a pump/motor and a pressurized-fluid accumulator. A flywheel hybrid includes a variable-ratio transmission and a flywheel.

A disadvantage, common to all of the above mentioned hybrids, is added cost and complexity associated with the need for the second machine and associated mechanisms needed to connect it to vehicle wheels in-parallel to or in-line with the internal combustion engine. Added complexity also increases probability of failures, thus contributing to a reduction in overall system reliability.

Another significant disadvantage is a substantial increase in vehicle weight, which is especially pronounced in hybrids using electric batteries for energy storage. Electric batteries are excellent energy storage devices, but the weight of their electrode-plates and electrolyte often adds so much to the mass of the vehicle that it requires a larger engine to drive it. In addition, a heavier vehicle is likely to cause more damage in traffic accidents.

Another deficiency of hybrids using a second machine is that the process they use for energy conversion is often inefficient. For example, one-way energy conversion efficiency of many conventional electric generators and motors does not exceed 50%, and therefore, at best, only a quarter of braking energy can be reclaimed for acceleration. More advanced generators and motors have higher efficiency, but their cost is often prohibitive.

A very significant drawback of electric batteries is a relatively slow rate at which they can be efficiently charged. This limits their ability to absorb the vehicle braking energy during a strong deceleration.

In view of the above, it is clear that it is highly desirable to have a vehicle system which does not suffer from the above disadvantages, while retaining all the fuel economy advantages of other hybrid systems. A properly conceived hybrid system using compressed-air for energy storage can meet these requirements. Such a system is the subject of the present invention.

BACKGROUND ART

The concept of saving kinetic energy of a vehicle during braking, storing it as compressed-air, and later using it for vehicle acceleration has been proposed before. A U.S. Pat. No. 5,529,549 to Moyer describes one such concept. A review of the differences between the present invention and its advantages over the above patent is given below.

(1) The above patent is limited to a case of saving the energy of braking and using it for later acceleration. The present invention, in addition to saving the braking energy, includes charging the air-reservoir with compressed-air during periods other than vehicle braking, whenever the pressure in the air-reservoir drops below a predetermined level. This is accomplished by operating the engine partly as a compressor charging the air-reservoir and, at the same time, partly as an internal combustion engine propelling the vehicle and driving the compressor. Preventing a complete discharge of the air-reservoir is a significant advantage, since it assures availability of compressed-air whenever it is needed for acceleration or for assist in constant speed operation.

(2) Moyer's patent describes an internal combustion operation limited to a four-stroke cycle. The present invention, on the other hand, describes an engine which can selectively operate as a four-stroke, or as a two-stroke internal combustion engine, quickly switching from one cycle to another whenever needed. Ability to switch from the four-stroke to the two-stroke internal combustion operation permits a substantial increase in engine torque. It is especially useful during acceleration from low engine speed, when torque produced by a four-stroke engine is often inadequate.

(3) The present invention includes, in its preferred embodiment, a third type of a valve in each engine cylinder. This valve, the charging valve, is dedicated to connecting the cylinder to the air-reservoir, whenever needed. Thanks to the charging valves, the engine can receive air partly from the air-reservoir through the charging valves, and partly from an intake manifold through intake valves. This permits the engine to receive fuel into its cylinders via injection into the intake ports rather than via direct injection into the compressed air in the cylinders. Port fuel injection is much less expensive than direct fuel injection. Currently, most automobiles use port fuel injection. In addition, the charging valves permit recharging the air-reservoir with compressed-air during normal internal combustion operation. This is accomplished by selectively opening the charging valve during each compression stroke. The charging valve also eliminate the need for distribution valves. The above patent does not provide for the charging valves and therefore does not offer the above described advantages of the present invention.

(4) Moyer proposes to control the flow of air from the cylinder to the pressure tank and back by flowing the air through a variable restriction. As it is well known, throttling an air-flow in a restriction inevitably leads to a substantial loss of energy. The present invention avoids this type of energy loss. It envisions flowing the air through unrestricted passages and controlling the magnitude of the braking force by varying the volume of the air-charge received into the engine cylinder, as well as varying the volume and the degree of compression of the air discharged from the cylinder into the air-reservoir. This is accomplished by varying the timings of the valves openings and closings.

(5) The above patent includes a supercharged engine function. Supercharging an internal combustion engine involves filling its cylinders with pressurized air so that, at the beginning of the compression stroke, the cylinder pressure is higher than atmospheric pressure. This permits an increase in engine power. In contrast to this, the present invention is not limited to supercharging. It provides for a compressed-air assist at all levels of engine power, from light-load to full-load. This is accomplished by metering a variable volume of compressed-air into the cylinder, first without changing the pressure of the air-charge and then subjecting it to an orderly variable expansion during which its energy is transmitted to the piston. At the beginning of the compression stroke the pressure in the cylinder may be less than, equal to, or higher than atmospheric pressure, depending on the required level of engine power. During a four-stroke cycle mode of operation, each engine cylinder has two power strokes, one with compressed-air and one with combustion-gas, during each cycle. During a two-stroke cycle mode of operation, the compressed-air charge eliminates or reduces the amount of required compression work. Moyer's patent does not include these modes of engine operation.

(6) The present invention provides for a compressed-air reservoir with a heating jacket through which a variable and controllable flow of exhaust gas can be maintained. This prevents heat loss through external walls of the air-reservoir and maintains optimum air-temperature level for best engine operation. The above patent does not include any such measures. Without them, substantial energy losses, associated with cooling of compressed air during its storage, will result.

(7) The present invention includes a method for controlling the magnitude of the braking force by varying the transmission ratio during compression braking. The above patent does not anticipate such method of control.

(8) The present invention includes controlling the braking force by omitting some of the engine cycles during compression braking. This is not included in Moyer's patent.

(9) The present invention includes a method of preserving the energy of the residual compressed-air trapped in the clearance volume between the piston and the cylinder head at the end of the compression stroke during compression braking, when the engine operates as a compressor. It involves postponing opening the intake valve until the residual compressed-air expands to atmospheric pressure during the volume increasing stroke of the piston. During expansion, energy of the residual compressed-air is transmitted to the piston. Moyer's patent does not include such method of energy saving.

(10) The present invention includes a method for controlling the quantity of residual exhaust gas retained in the cylinder for nitrogen oxide control during operation with compressed-air assist. The method involves a variable early exhaust valve closing. This replaces exhaust gas recirculation which is not feasible when the engine receives its intake air from the air-reservoir. The above patent does not include such method.

(11) Moyer's patent includes a cylinder disabling function (listed in No 1 and No 6 independent claims). The present invention does not preclude, but does not require cylinder disabling. A better method of operation is to operate some of the cylinders as an internal combustion engine, and some as a compressor recharging the air-reservoir, as described in the present invention.

(12) The present invention includes a concept of using compressed-air to operate the vehicle electric generator only when needed, rather than continuously. This eliminates needless generator operation and saves fuel. The above patent does not include this.

(13) The present invention includes a concept of using a compressed-air hybrid system in combination with an electric hybrid. The above patent does not include this.

A U.S. Pat. No. 5,695,430 to Moyer is a continuation of U.S. Pat. No. 5,529,549. It includes the following:

(1) Flow of air into and out of the cylinder is controlled by varying the amplitude of the engine valve lift from zero to 100%. This type of flow control involves throttling the flow, which inevitably leads to a substantial energy loss. Controlling the quantity of air received into and discharged from the engine cylinder without throttling by varying the volume of the air-charge via variable valve timing, as proposed in the present invention, is not included in the above patent.

(2) The above patent also describes utilization of waste heat from the coolant and exhaust while returning the stored compressed-air to the cylinders for air-motor operation. It is dubious that much heat transfer can take place during the short duration of each intake stroke, and, besides, this does not prevent loss of heat energy from the compressed-air during its storage. In contrast to this, the present invention includes a concept of an air-reservoir with a controllable heating jacket which prevents heat loss and maintains proper temperature of stored air on a continuous basis.

A U.S. Pat. No. 5,255,641 to Schechter describes an electrohydraulic system for engine valve actuation. The valve has a small double-acting piston driven by hydraulic pressure. Such a system is sufficient for a conventional engine operation wherein there is no substantial gas pressure in the cylinder at the time of the valve opening. In the case of compression braking, however, the valve must be opened against a high in-cylinder gas pressure, and this requires a very high hydraulic pressure to open the engine valve. To eliminate the need for very high hydraulic pressure, the present invention describes an electrohydraulic valve actuator which includes an amplifier piston providing an additional hydraulic force at the beginning of the valve opening. This actuator also includes a latching device which prevents untimely opening of the valve.

SUMMARY OF THE INVENTION

In its embodiments, the present invention contemplates a system for and a method of operating a vehicle on wheels. The system includes an air-reservoir capable to receive, store, and discharge compressed-air. It also includes a reciprocating-piston engine capable to selectively operate as an internal combustion engine, or as a compressor, or as an air-motor. The engine can also operate concurrently as an internal combustion engine and a compressor, or concurrently as an internal combustion engine and an air-motor. During the internal combustion operation, the engine can selectively operate either as a four-stroke, or as a two-stroke internal combustion engine.

The engine has a gas exchange controlling system comprising a set of deactivatable and variably controllable valves which can selectively connect engine cylinders either to outside atmosphere, or to the air-reservoir. There is also a deactivatable fuel delivery system. The overall system also includes a control system, which is an on-board computer capable to monitor the vehicle driver's demands and respond to them by controlling the operation of the engine and other vehicle components according to a program contained in its software.

During vehicle braking the fuel delivery system is deactivated, and the engine valves activity is such, that the engine operates as a two-stroke compressor driven by a torque coming from the vehicle wheels, thus slowing down the vehicle motion. In each engine cylinder, during each volume-increasing stroke, a charge of atmospheric air is received into the cylinder chamber, and, during a subsequent volume-decreasing stroke, this air-charge is compressed and displaced into the air-reservoir. In this way, kinetic energy of vehicle motion is transformed into potential energy of compressed-air stored in the air-reservoir. Varying the timings of the valves openings and closings varies the intensity of braking.

During subsequent vehicle acceleration fuel delivery is reactivated, and the engine valves activity is such, that the engine operates as an internal combustion engine receiving air, needed for its operation, from the air-reservoir. Each compressed-air charge, received into each engine cylinder from the air-reservoir, brings-in its energy which supplements the energy released in combustion. This reduces the fuel consumption necessary to produce the required engine torque. In this way, a significant fraction of the braking energy is reclaimed during acceleration. Changing the schedule of the engine valves operation and doubling the frequency of fuel delivery can switch the engine operational cycle from a four-stroke to a two-stroke cycle, or vice versa. The engine can also operate as a conventional internal combustion engine receiving air from outside atmosphere.

To save fuel, the engine operation can be completely deactivated during vehicle coasting, when the driver depresses neither the acceleration pedal, nor the brake pedal. The same can be done whenever the vehicle stops. To restart the engine after a brief stop, it can be brought up to speed by operating it as a two-stroke air-motor receiving compressed-air from the air-reservoir.

Charging the air-reservoir with compressed-air can also be accomplished concurrently with internal combustion operation at part-load. For this, the schedule of the engine valves operation is modified, so that a fraction of the air-charge compressed in each cylinder by the cylinder piston during each volume-decreasing stroke is diverted into the air-reservoir. In another alternative, some of the engine cylinders operate as a compressor, while other cylinders operate as an internal combustion engine. If so desired, air-reservoir charging can also be performed during vehicle coasting and during short stops.

Accordingly, it is an object of the present invention to reduce the cost and complexity of a hybrid vehicle system by eliminating the need for a second machine complementing the internal combustion engine. Instead, a single engine is provided, capable to operate both as an internal combustion engine and as a compressor/air-motor.

Another object of the present invention is to improve the reliability of a hybrid vehicle system by eliminating a large number of components and subsystems needed for proper operation of the above second machine.

A further object of the present invention is to reduce the weight penalty associated with hybrid systems by using compressed-air as a medium for energy storage. Air, even when compressed to high pressure, is very light, and therefore the added weight is, essentially, limited to the weight of the reservoir. Elimination of the above second machine and associated components also contributes to weight reduction.

Yet another object of the present invention is to improve efficiency of a hybrid vehicle system by eliminating the energy losses and inefficiencies associated with operation of the above second machine and related components. In addition, compressing air in a cylinder and, then, reversing this event by expanding the air in the same cylinder of a fast operating engine is a very efficient process.

A further object of the present invention is to increase the peak torque and power of the engine by supercharging it with compressed-air from the air-reservoir, and by switching its internal combustion operation from a four-stroke to a two-stroke cycle. Supercharging increases the mass of air received by the engine cylinders and permits burning of an increased amount of fuel during each cycle at full-load operation. Switching from the four-stroke to the two-stroke cycle doubles the number of combustion events and leads to a significant step-up in engine torque and power.

Another object of the present invention is to reduce the fuel consumption during part-load operation by reducing the size of the engine. A reduction in engine size is possible thanks to the above increase in its torque and power. It is a significant advantage, since a smaller engine consumes less fuel at part-load. An additional reduction in fuel consumption is achieved by deactivating the combustion during vehicle coasting and during short stops.

A further object of the present invention is to reduce or eliminate the need for electric starter by starting the engine with compressed-air received from the air-reservoir. This is another cost reduction.

Another object of the present invention is to eliminate the external exhaust gas recirculation system. Exhaust gas recirculation is used in most engines to reduce nitrogen oxide emission. The variable valve systems employed by the embodiments of the present invention can trap sufficient amount of residual gas in each cylinder at the end of each exhaust stroke to control the amount of nitrogen oxide produced in the next cycle without the need for an external exhaust recirculation. Elimination of the exhaust gas recirculation system leads to a substantial cost reduction.

Another object of the present invention is to use stored energy of compressed-air to drive an on-board electric power generator independently of the engine operation. Generating electric power by selectively operating an on-board electric generator with an approximately constant speed, and only when its operation is needed, is a substantial improvement over conventional systems, in which the generators are continuously driven with variable speed, regardless of need. Selective generation of electric power in quantities matching the vehicle needs eliminates waste and thus improves the overall vehicle fuel economy. In addition, eliminating the need for the vehicle engine to drive the electric generator increases the peak engine torque and power available for vehicle propulsion A further object of the present invention is to reduce wear and increase durability of the vehicle friction brakes by using compression braking instead of friction braking.

Finally, it is a key object of the present invention to achieve a significant reduction in fuel consumption by saving and storing the energy of vehicle motion during its deceleration, and reusing it later during its subsequent acceleration and propulsion.

DESCRIPTION OF THE PREFERRED EMBODIMENT

Figure 1:
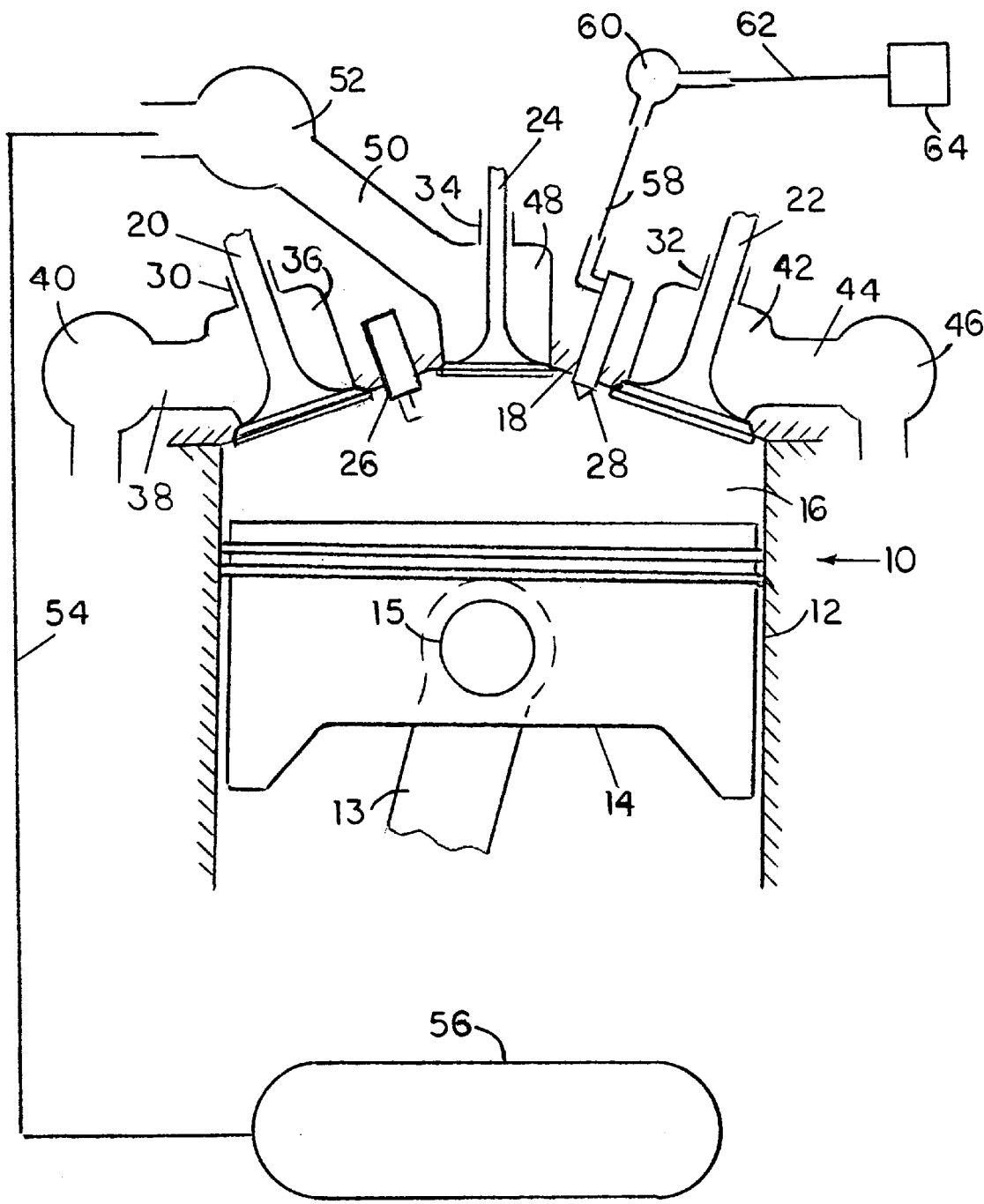
FIG. 1 is a schematic, cross-sectional side-view of an engine cylinder and head arrangement and its connection to a compressed-air reservoir, in accordance with a preferred embodiment of the present invention.

A preferred embodiment of the present invention is illustrated in FIGS. 1 to 4. FIG. 1 is a schematic, cross-sectional side-view of an engine cylinder and head arrangement and its connection to a compressed-air reservoir. An engine 10 has at least one cylinder 12 containing a piston 14. Piston 14 is mounted upon a connecting rod 13 by a wrist pin 15 and can reciprocate in cylinder 12, thus varying the volume of a cylinder chamber 16 enclosed between piston 14 and a cylinder head 18 attached to the top of cylinder 12.

Three types of normally-closed valves: an intake valve 20, an exhaust valve 22, and a charging valve 24, are installed in cylinder head 18. Valves 20, 22, and 24 are slideably mounted in guides 30, 32, and 34, respectively, which are arranged in cylinder head 18. Depending on the needs of the engine, there may be more than one valve of each type in each engine cylinder. A conventional spark plug 26 and a fuel injector 28 are also mounted within cylinder head 18 and protrude into cylinder chamber 16. If engine 10 is a diesel, there is no need for spark ignition and spark plug 26 is omitted.

Intake valve 20 is shown in its closed position in which it separates cylinder chamber 16 from an intake port 36 which opens into an intake passage 38. Intake passage 38 connects to an intake manifold 40 to which all intake ports and all intake passages from all engine cylinders are connected. Intake manifold 40 is connected to outside atmosphere, usually through a system of intake pipes, an air-filter, etc.

Exhaust valve 22 is shown in its closed position in which it separates cylinder chamber 16 from an exhaust port 42 which opens into an exhaust passage 44. Exhaust passage 44 connects to an exhaust manifold 46 to which all exhaust ports and all exhaust passages from all engine cylinders are connected. Exhaust manifold 46 is connected to outside atmosphere, usually through a system of exhaust pipes, a muffler, a catalyst, etc.

Charging valve 24 is shown in its closed position in which it separates cylinder chamber 16 from a charging port 48 which opens into a charging passage 50. Charging passage 50 connects to a charging manifold 52 to which all charging ports and all charging passages from all engine cylinders are connected. Charging manifold 52 is connected via a duct 54 to an air-reservoir 56. Air-reservoir 56 is made of a material capable to contain and withstand the pressure of compressed-air inside the reservoir. It can be located anywhere in the vehicle. If so desired, the vehicle may have several air-reservoirs, all connected to charging manifold 52.

Fuel injector 28 is of the kind in which timing of fuel injection and quantity of fuel injected during each engine cycle is determined by timing and duration, respectively, of injector opening. It is connected via a passage 58 to a fuel manifold 60 to which all fuel injectors from all engine cylinders are connected. Fuel manifold 60 is filled with fuel pressurized to a predetermined constant pressure and delivered to fuel manifold 60 from a vehicle fuel supply system 64 via a fuel line 62.

Figure 2:
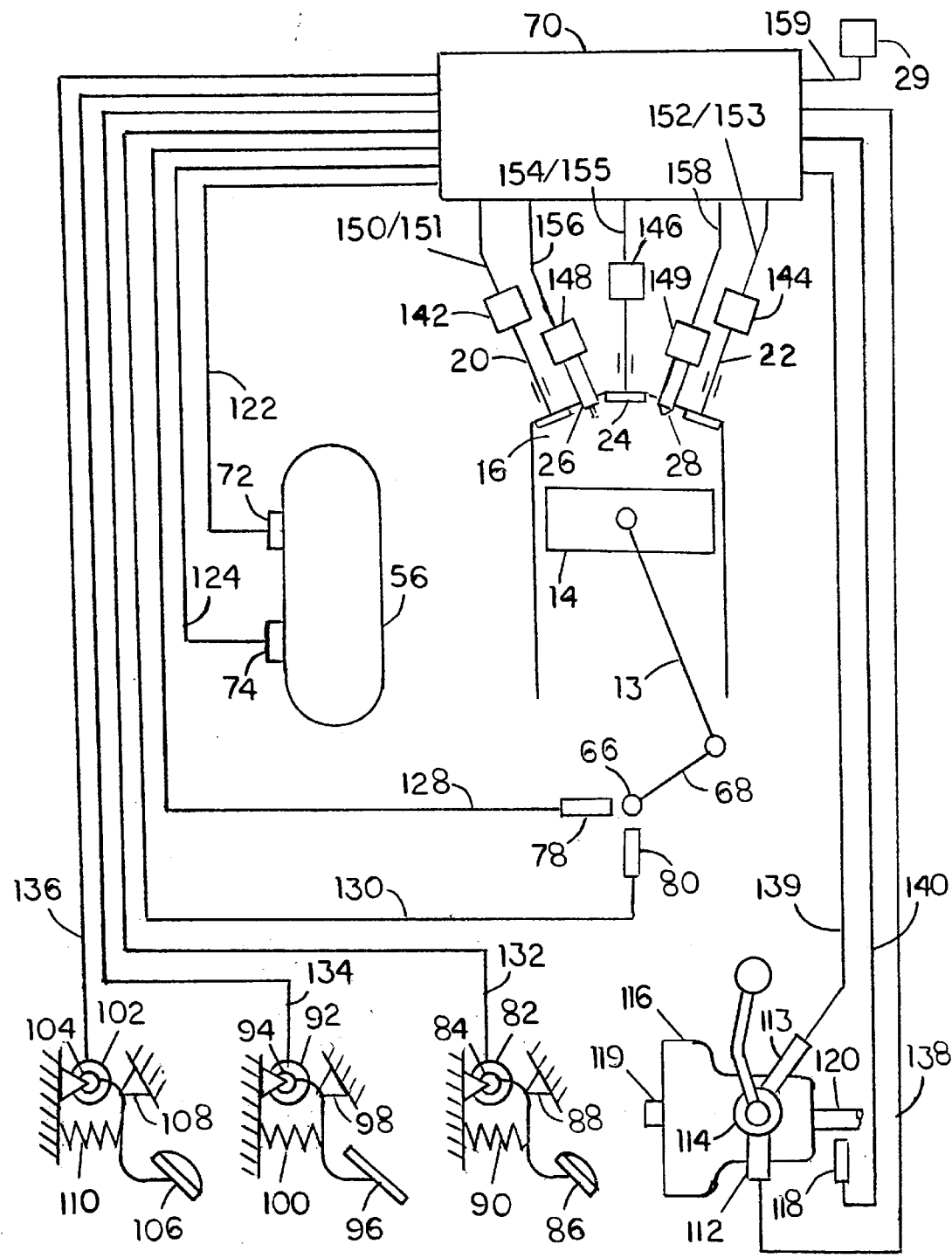
FIG. 2 is a schematic diagram illustrating a system of sensors sending input signals to a vehicle control system which sends out output signals to actuators controlling operation of various components of the system, in accordance with a preferred embodiment of the present invention.

FIG. 2 is a schematic diagram illustrating a system of sensors sending input signals to a vehicle control system which sends out output signals to actuators controlling operation of various components of the system. The signals generated by the sensors inform the control system about vehicle driver's demands for a specific vehicle propulsion or braking force, as the case may be. Propulsion force is a force acting on the vehicle in a direction of its motion. Braking force is a force acting on the vehicle in a direction opposite to its motion. The input signals also carry information on physical and operational conditions in various parts and components of the engine and the vehicle. The control system evaluates the received information and, in accordance with its internal logic, controls operation of the engine and other vehicle components, so as to satisfy the driver's demands while maintaining optimum fuel consumption efficiency.

As shown in FIG. 2, a pressure sensor 72 and a temperature sensor 74 are mounted in air-reservoir 56. They measure pressure and temperature of air inside air-reservoir 56 and transmit these data to a control system 70 via electric lines 122 and 124, respectively.

Two sensors, 78 and 80, monitor piston 14 position in cylinder 12 (FIG. 1). They are installed in proximity to a crankshaft 66 and actually measure rotational position of a crank 68 but, since motion of piston 14 is a well defined function of crank 68 rotation, this also defines piston 14 position. Sensor 78 sends a single electric pulse via an electric line 128 to control system 70 every time crank 68 puts piston 14 in a top dead center position. The top dead center is a piston position in which the direction of the piston motion is reversed and the volume of the cylinder chamber is at its minimum. Conversely, a bottom dead center is a piston position in which the direction of the piston motion is reversed and the volume of the cylinder chamber is at its maximum. Sensor 80 sends a continuous series of electric pulses via an electric line 130 to control system 70 during each crank 68 revolution. These pulses are separated from each other by equal angles of crank 68 rotation, each such angle being a fraction of crank 68 revolution. The two signals coming from sensors 78 and 80 supply control system 70 with frequently updated information on crank 68 and piston 14 positions relative to the top dead center in cylinder 12. This also supplies information on positions of cranks and pistons in all other engine cylinders, since positions of other cranks relative to crank 68 are known. In addition, time intervals between arrivals of individual pulses generated by sensor 80 provide control system 70 with information on the speed of crankshaft 66 rotation.

Two sensors, 82 and 92, are intended to inform control system 70 about the driver's demands for the vehicle braking or propulsion force, as the case may be. Sensor 82 is installed on a pivot-shaft 84 to which a brake pedal 86 is rigidly attached. In its free position, a spring 90 keeps brake pedal 86 pressed against a stop 88. In this position, sensor 82 generates no signal. Whenever brake pedal 86 is depressed, sensor 82 generates an electric signal the magnitude of which increases with an increase in brake pedal 86 travel away from stop 88. An increase or a decrease in the magnitude of this signal is a demand for an increase or a decrease, respectively, in the magnitude of the braking force.

Installation and operation of sensor 92 is similar to that of sensor 82. Sensor 92 is installed on a pivot-shaft 94 to which an acceleration pedal 96 is rigidly attached. In its free position, a spring 100 keeps acceleration pedal 96 pressed against a stop 98. In this position, sensor 92 generates no signal. Whenever acceleration pedal 96 is depressed, sensor 92 generates an electric signal the magnitude of which increases with an increase in acceleration pedal 96 travel away from stop 98. An increase or a decrease in the magnitude of this signal is a demand for an increase or a decrease, respectively, in the magnitude of the propulsion force.

The signals generated by sensors 82 and 92 are transmitted to control system 70 via electric lines 132 and 134, respectively. Absence of signals from sensor 82, or from sensor 92, is interpreted by control system 70 as an absence of a demand for a braking force, or an absence of a demand for a propulsion force, respectively. Absence of signals from both sensors, 82 and 92, is interpreted as an absence of a demand for either of the two forces.

A clutch sensor 102 is installed on a pivot-shaft 104 to which a clutch pedal 106 is rigidly attached. In its free position, a spring 110 keeps clutch pedal 106 pressed against a stop 108. In this position sensor 102 generates an electric signal which is transmitted to control system 70 via an electric line 136. This informs control system 70 that the vehicle clutch is engaged. Whenever clutch pedal 106 is depressed and moves away from stop 108, sensor 102 generates no signal. This informs control system 70 that the vehicle clutch is disengaged and the engine is not coupled to the vehicle wheels. In vehicles without a clutch, sensor 102 and line 136 are omitted.

A transmission ratio sensor 112 is mounted in a transmission ratio change mechanism 114 which is part of a transmission 116. Transmission 116 couples engine 10 (FIG. 1) to at least one of the vehicle wheels with a variable transmission ratio, except when it is in a neutral position, or when the vehicle clutch is disengaged. The transmission ratio is a ratio of the speed of a transmission input shaft 119 to the speed of a transmission output shaft 120. The neutral position is a temporary transmission components arrangement providing no mechanical coupling between transmission input shaft 119 and transmission output shaft 120. When transmission 116 is in neutral position, engine 10 is not coupled to the vehicle wheels. Transmission ratio sensor 112 sends a variable electric signal carrying information on the transmission ratio to control system 70 via an electric line 138. Whenever transmission 116 is in neutral position, transmission ratio sensor 112 generates no signal.

A vehicle motion sensor 118 is installed in proximity to transmission output shaft 120. Alternatively, sensor 118 may be installed in proximity to the vehicle driveshaft or any other component which rotates when the vehicle is in motion. Sensor 118 detects vehicle motion, measures its speed, and sends this information to control system 70 via an electric line 140.

Control system 70 is an on-board computer programmed to control operation of various components of the engine and the vehicle in accordance with a strategy program incorporated into its software. The software contains algorithms and data which permit the control system to evaluate the stream of input signals and determine the magnitude and the timing of each output signal. The output signals controlling operation of the engine and other vehicle components are updated at least once every engine cycle.

Control system 70 controls operation of spark plug 26 and fuel injector 28 by sending control signals to a spark plug actuator 148 and to a fuel injector actuator 149 via electric lines 156 and 158, respectively. It also controls spark plugs and fuel injectors in all other engine cylinders. Spark plug actuator 148 is an ignition coil installed directly on top of spark plug 26. Alternatively, an ignition coil can be remotely installed and electrically connected to the spark plug.

Fuel injector actuator 149 is a solenoid which opens and closes fuel injector 28, thus initiating and terminating, respectively, fuel injection into cylinder chamber 16. The timing and the duration of the control signal sent to fuel injector actuator 149 determine the timing of the fuel injection and the quantity of fuel injected, respectively. While this type of arrangement is the preferred embodiment of fuel injection and its control in the present invention, other types of fuel injection systems, possibly including solenoid-controlled plunger-type pumps and other types of fuel injection pumps, and other types of fuel injectors, may be used in accordance with the present invention.

If transmission 116 is of the type which operates under electronic control, transmission ratio change mechanism 114 incorporates a transmission ratio change actuator 113 capable to change the transmission ratio on a signal received from control system 70 via an electric line 139. In systems without electronic transmission control, actuator 113 and line 139 are omitted.

Control system 70 can also activate a conventional friction brake system 29. Whenever necessary, a control signal sent from control system 70 to friction brake system 29 via electric line 159 activates electrohydraulic, electromechanical, or electropneumatic actuators which bring into rubbing contact friction brake components, such as, for example, brake shoes and brake drums, with force that increases with an increase in the magnitude of the control signal coming from control system 70.

Control system 70 also controls operation of intake valve 20, exhaust valve 22, and charging valve 24 by sending control signals to valve actuators 142, 144, and 146, respectively, which effectuate opening and closing of their respective valves. It also controls all valves in all other engine cylinders. Each valve actuator receives two separate control signals, one for valve opening and one for valve closing. Actuator 142 receives signals for valve opening and closing via lines 150 and 151, respectively. These two lines are shown as a single line labeled 150/151 in FIG. 2. Actuator 144 receives signals for valve opening and closing via lines 152 and 153, respectively. Actuator 146 receives signals for valve opening and closing via lines 154 and 155, respectively. Timing of each valve opening and closing is determined by timing of respective control signals received by its actuator. Valve lift can be varied by varying duration of the signals.

Figure 3A:
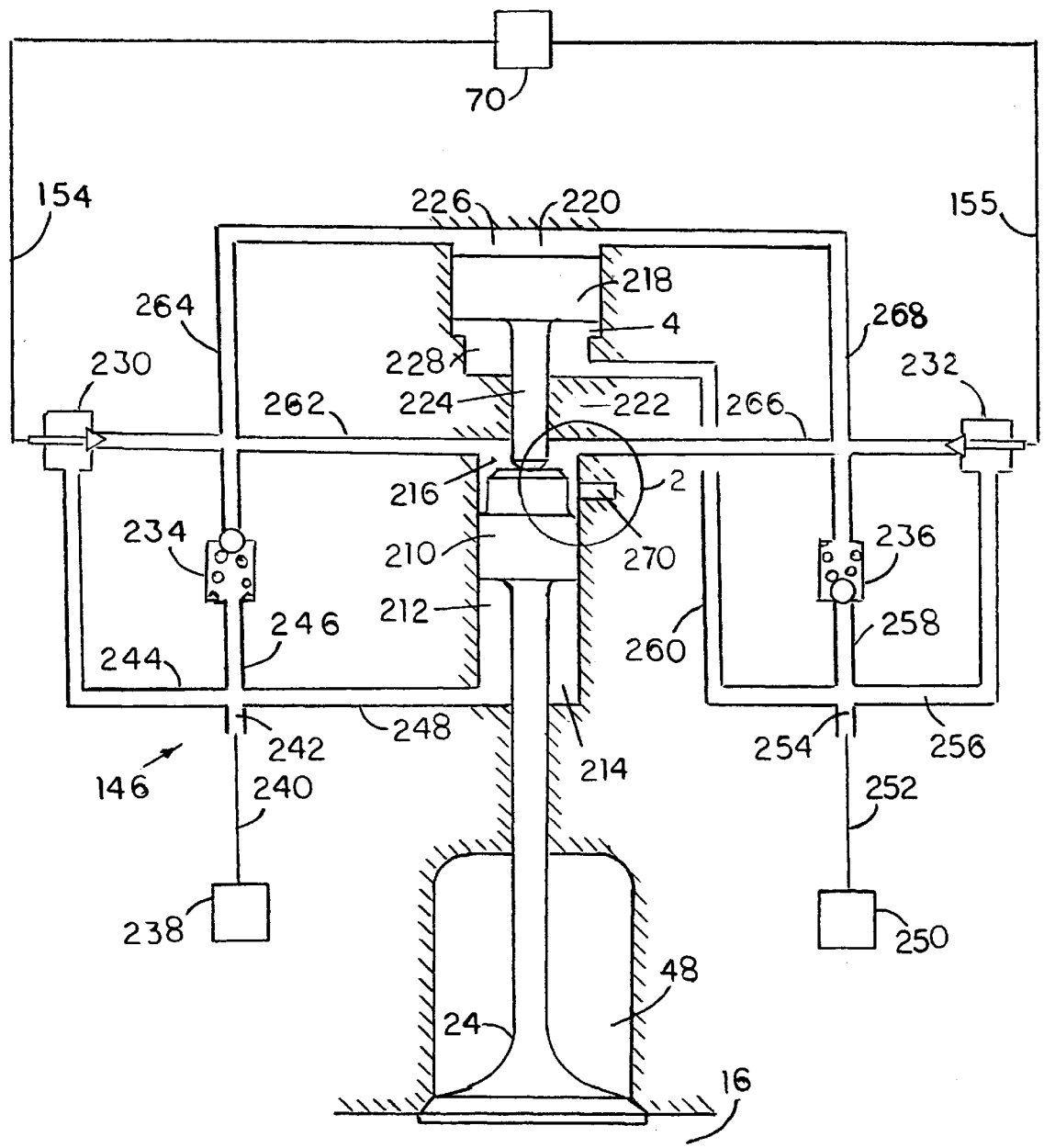
FIG. 3A is a schematic diagram illustrating a single electrohydraulically actuated engine valve, which is an example of an engine valve useable with the present invention.

FIG. 3A is a schematic diagram illustrating a single electrohydraulically actuated engine valve, which is an example of an engine valve useable with the present invention. It shows actuator 146 controlling charging valve 24, but similar actuators can be used to control other engine valves. While this example is the preferred embodiment of the valve actuator, other hydraulic, pneumatic, electrical, and mechanical systems can also be used to variably control engine valves, in accordance with the present invention. This includes an actuator disclosed in U.S. Pat. No. 5,255,641 to Schechter, which is incorporated herein by reference.

As shown in FIG. 3A, a valve piston 210, attached to the top of charging valve 24, is slideable within the limits of a first hydraulic chamber 214. Valve piston 210 divides first hydraulic chamber 214 into two volumes, a variable first upper volume 216 and a variable first lower volume 212. The piston pressure area in first upper volume 216 is larger than that in first lower volume 212. An amplifier piston 218 is slideable within the limits of a second hydraulic chamber 220, separated from first hydraulic chamber 214 by a partition 222. A push-rod 224, integral with or otherwise coupled to amplifier piston 218, slideably protrudes through an opening in partition 222 into first upper volume 216. Amplifier piston 218 divides second hydraulic chamber 220 into two volumes, a variable second upper volume 226 and a variable second lower volume 228.

Actuator 146 also includes two normally closed solenoid valves, a high pressure solenoid valve 230 and a low pressure solenoid valve 232, and two check-valves, 234 and 236. High-pressure fluid is supplied from a high-pressure fluid source 238 through a high-pressure passage 240 to a high-pressure port 242 and, from there, is distributed to high-pressure solenoid valve 230, to check-valve 234, and to first lower volume 212 through passages 244, 246, and 248, respectively. Passages 262 and 264 connect solenoid valve 230 and check valve 234 to upper volumes 216 and 226, respectively. Low-pressure fluid is supplied from a low-pressure fluid source 250 through a low-pressure passage 252 to a low-pressure port 254 and, from there, is distributed to low-pressure solenoid valve 232, to check-valve 236, and to second lower volume 228 through passages 256, 258, and 260, respectively. Passages 266 and 268 connect solenoid valve 232 and check valve 236 to upper volumes 216 and 226, respectively. The installation of the two check-valves is such, that check-valve 234 permits flow only in the direction leading back into high-pressure fluid source 238, and check-valve 236 permits flow only in the direction leading out of low-pressure fluid source 250.

High-pressure solenoid valve 230 and low-pressure solenoid valve 232 receive control signals from control system 70 via electric lines 154 and 155, respectively. Each control signal causes opening of the respective solenoid valve for the duration of the signal.

Opening of charging valve 24 is initiated by opening of high-pressure solenoid valve 230. This supplies high-pressure fluid to upper volumes 216 and 226 through passages 262 and 264, respectively. Because of a difference between valve piston 210 upper and lower pressure areas, a net hydraulic force acting on it is directed downward, toward charging valve 24 opening. High pressure in second upper volume 226 also generates a hydraulic force pushing amplifier piston 218 downward, and this additional force is transmitted to valve piston 210 by push-rod 224. A combined force of the two pistons is sufficient to crack-open charging valve 24 against pressure in cylinder chamber 16. This drops the pressure in cylinder chamber 16 and eliminates the need for a high hydraulic force during further opening travel of charging valve 24. Because of that, downward travel of amplifier piston 218 is limited to a short distance 4 sufficient to crack-open charging valve 24 enough to drop the pressure in cylinder chamber 16. After that, only the net hydraulic force acting on valve piston 210 accelerates charging valve 24 downward. Thanks to assist from amplifier piston 218, lower level of pressure can be maintained in high-pressure fluid source 238, which leads to lower energy consumption for engine valves operation.

When high-pressure solenoid valve 230 closes, pressure in upper chambers 216 and 226 drops, the net hydraulic force acting on valve piston 210 reverses its direction, and valve piston 210 decelerates, pumping fluid from first lower volume 212 back into high-pressure fluid source 238. This recovers some of the energy that was used to accelerate charging valve 24 downward. Concurrently, low-pressure fluid flowing through check-valve 236 fills upper volume 216. When charging valve 24 exhausts its momentum and its motion stops, check-valve 236 closes, and charging valve 24 remains locked in its open position.

Closing of charging valve 24 is initiated by opening low-pressure solenoid valve 232. This drops the pressure in and permits fluid to escape from upper volumes 216 and 226 through passages 266 and 268, respectively. As a result, the net hydraulic force acting on valve piston 210 accelerates charging valve 24 upward, towards its closing. When low-pressure solenoid valve 232 closes, pressure in first upper volume 216 rises, the net hydraulic force acting on valve piston 210 reverses its direction, and valve piston 210 decelerates, pumping fluid from first upper volume 216 through check-valve 234 back into high-pressure fluid source 238. This recovers some of the energy that was used to accelerate charging valve 24 upward.

When charging valve 24 approaches its closed position, valve piston 210 contacts push-rod 224, and added resistance of amplifier piston 218 pumping fluid from second upper volume 226 through passage 264 and check-valve 234 back to high-pressure fluid source 238 absorbs the remaining momentum of charging valve 24. When charging valve 24 closes, valve piston 210 becomes mechanically latched in its uppermost position by at least one latch 270 located in upper part of first upper volume 216. This eliminates the need for a high hydraulic pressure to keep charging valve closed against high air-pressure in charging port 48 when pressure in cylinder chamber 16 is low.

Figure 3B:
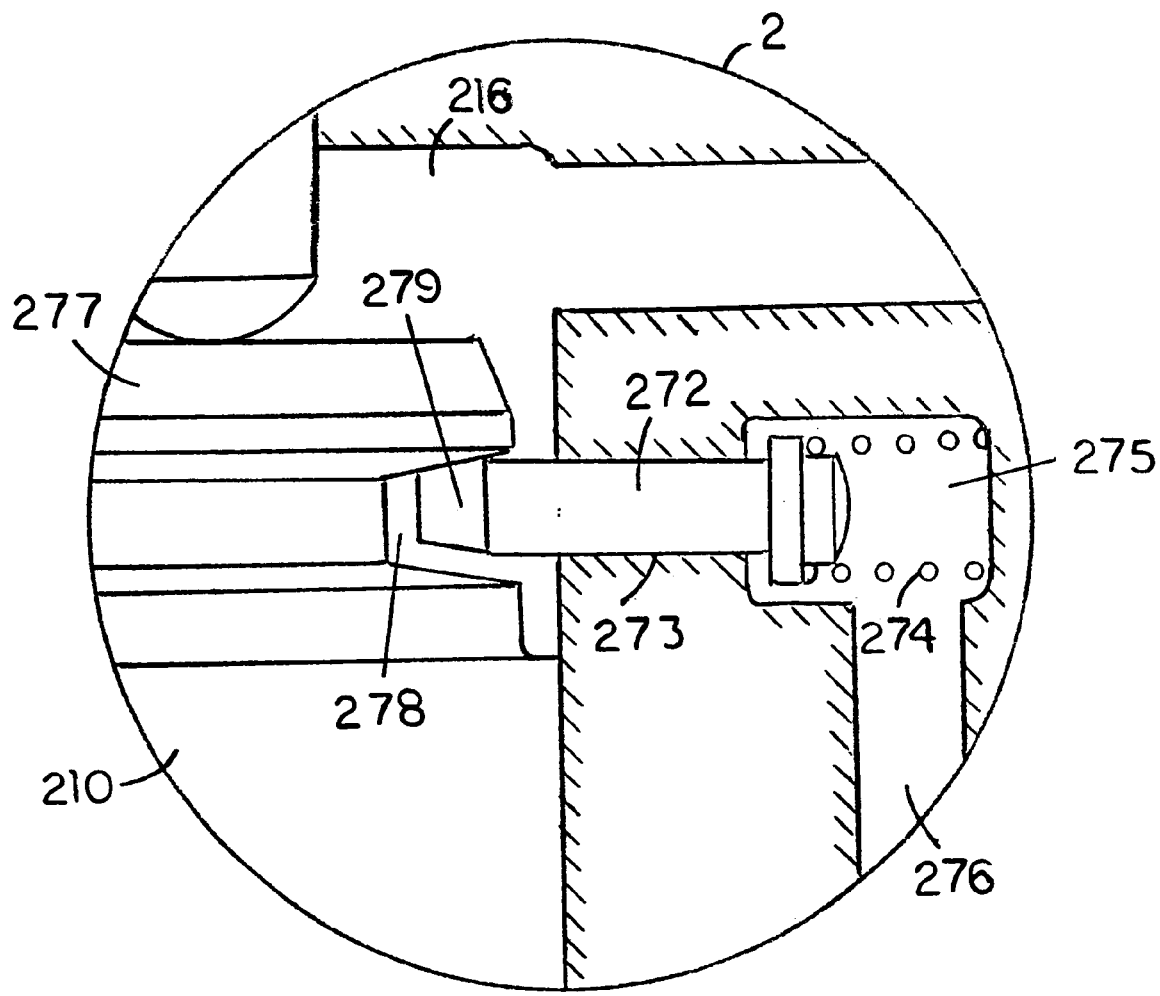
FIG. 3B is an enlarged view taken from encircled area 2 in FIG. 3A.

FIG. 3B is an enlarged view taken from encircled area 2 in FIG. 3A. It illustrates latch 270 and its engagement with valve piston 210. Several such latches may be installed along the circumference of upper volume 216.

A latch pin 272 is slideably installed in a tightly fitting guide 273. A spring 274, located in a latch chamber 275, exerts a force on latch pin 272 pushing it left, towards the center of first upper volume 216. A passage 276 leads to low-pressure fluid source 250 (FIG. 3A).

A dome 277, integral with valve piston 210, has an annular grove 278 with a trapezoidal cross-section. When valve piston 210 is in its uppermost position, a conical tip 279 of latch pin 272 engages annular grove 278, as shown in FIG. 3B, thus latching valve piston 210. When high pressure is applied to first upper volume 216, pressure differential between first upper volume 216 and latch chamber 275 forces latch pin 272 to retract from first upper volume 216, thus permitting downward motion of valve piston 210. When valve piston 210 returns to its uppermost position again, and the pressure in first upper volume 216 drops, spring 274 pushes latch pin 272 back into grove 278, thus latching valve piston 210 again. It then remains latched until high pressure from high-pressure fluid source 238 (FIG. 3A) is again applied to first upper volume 216.

Actions of amplifier piston 218 and latch 270 reduce the required level of pressure in high-pressure fluid source 238. Without them, much higher fluid pressure, or much larger valve piston 210 would be needed to crack-open charging valve 24 against high gas-pressure in cylinder chamber 16, and to keep it closed against high air-pressure in charging port 48. In either case, this would lead to an increase in energy consumption. Thus, application of amplifier piston 218 and latch 270 permits substantial reduction in energy needed for engine valves operation. In addition, amplifier piston 21 8 with push-rod 224 serve as a shock absorber insuring soft and quiet landing of charging valve 24 on its seat. Additional energy savings are realized thanks to fluid being pumped back into high-pressure fluid source 238 during charging valve 24 decelerations.

Figure 4:
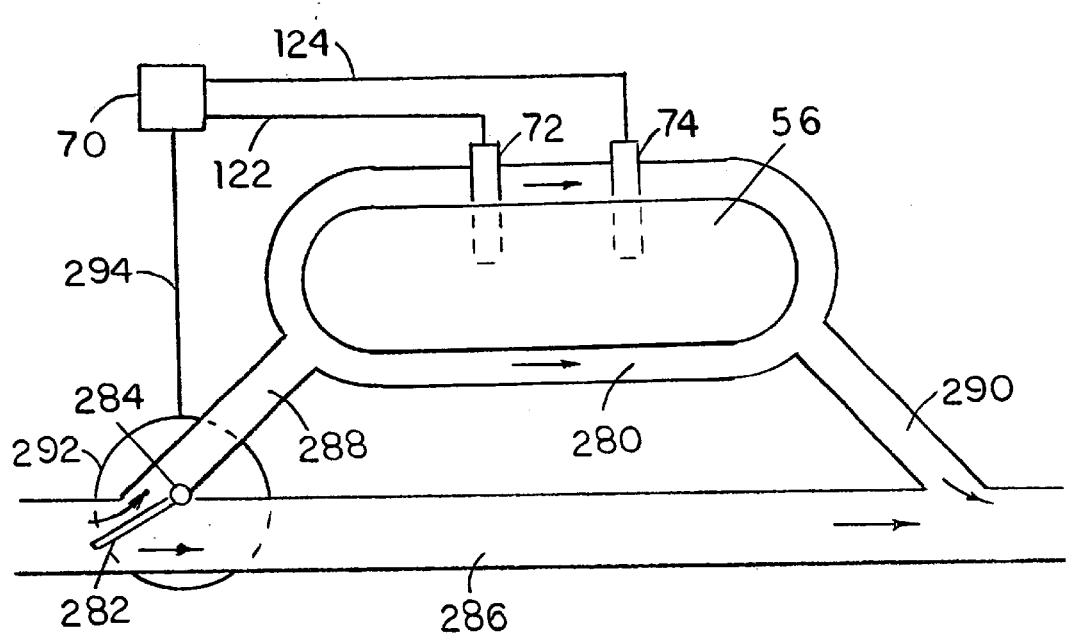
FIG. 4 is a schematic diagram illustrating automatic air-temperature control in a compressed-air reservoir useable with the present invention.

For good engine operation, it is desirable to control the temperature of compressed-air in the air-reservoir. FIG. 4 is a schematic diagram illustrating automatic air-temperature control in a compressed-air reservoir useable with the present invention. The air-temperature control has two objectives. The first one is to insure that relationship between the temperature and the pressure of compressed-air in the air-reservoir is within limits determined by an algorithm contained in the control system software. This is to insure that the engine gets air which is neither too cold, nor too hot for proper engine operation. If the air entering the engine cylinders is too cold, this may adversely affect the combustion process. If the air is too hot, this may lead to engine knock.

As shown in FIG. 4, outer surface of air-reservoir 56 has a double wall forming a heating jacket 280 through which hot exhaust-gas can be circulated during engine operation. A plate-valve 282 is rotatably installed on a pivot 284 inside an exhaust pipe 286. Depending on its position, plate-valve 282 can divert a variable fraction of total exhaust-gas flow into an inlet duct 288 leading into heating jacket 280. After circulating through heating jacket 280, the exhaust gas returns through an outlet duct 290 back into exhaust pipe 286. Arrows in the drawing illustrate the flow of exhaust gas.

An actuator 292, which, typically, is a stepper-motor, can vary the position of plate-valve 282, thus varying the exhaust-gas flow through heating jacket 280. Actuator 292 is controlled by a variable signal from control system 70 via an electric line 294. Control system 70 receives information on pressure and temperature of air inside air-reservoir 56 from pressure sensor 72 and temperature sensor 74, respectively, via electric lines 122 and 124, respectively. On the basis of this information, it controls the exhaust-gas flow through heating jacket 280 to insure that the temperature of the air inside air-reservoir 56 is a proper finction of its pressure, as dictated by the algorithm contained in the control system software. Increasing or decreasing the exhaust-gas flow through heating jacket 280 increases or decreases, respectively, the temperature of compressed-air in air-reservoir 56.

Availability of compressed-air stored in the air-reservoir creates an opportunity to use it to drive an on-board electric power generator. Most automotive vehicle systems include electric generators which produce electricity to satisfy various vehicle needs. Usually, such generator is mechanically driven by the vehicle engine and, therefore, operates continuously, regardless of need, which leads to waste of energy. A more efficient energy utilization can be achieved if the electric generator is driven only when its operation is needed.

Figure 17:
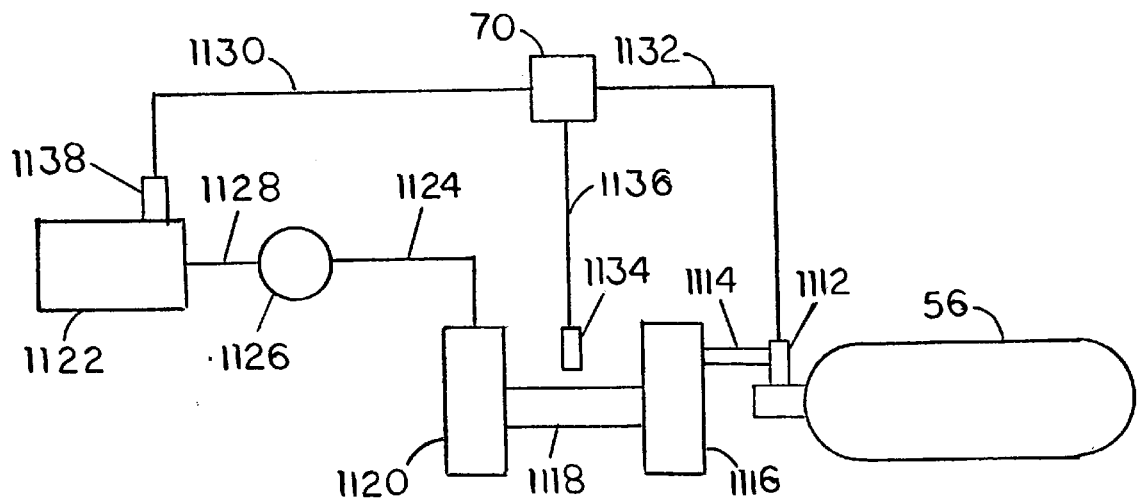
FIG. 17 is a schematic diagram illustrating an example of a system using stored energy of compressed-air to operate an on-board electric power generator.

FIG. 17 is a schematic diagram illustrating an example of an alternative system for operating an on-board electric power generator. A normally closed solenoid valve 1112 is installed on air-reservoir 56 and is connected via an air-duct 1114 to an air-motor 1116. Various types of air-motors such as, for example, vane-type or piston-type motors can be used. In other alternatives, an air-turbine or other type of a prime mover, using compressed-air as a source of energy, can be used. A shaftl 1118 couples air-motor 1116 to an electric generator 1120, which is electrically connected to an electric battery 1122 via an electric line 1124, a regulator 1126, and an electric line 1128. Regulator 1126 may include a voltage regulator and, if needed, an AC to DC current converter. A battery charge sensor 1138 and an electric line 1130 connect electric battery 1122 to control system 70, which permits the latter to monitor the battery charge. Control system 70 can control operation of solenoid valve 1112 by sending a control signal via an electric line 1132. Varying the intensity of the control signal can vary solenoid valve 1112 opening. A speed sensor 1134 is installed in the vicinity of shaft 1118. It sends a speed signal via an electric line 1136 to control system 70 which monitors the rotational speed of electric generator 1120.

Control system 70 continuously monitors the state of charge in electric battery 1122 and, whenever the charge drops below a first predetermined level, opens solenoid valve 1112. This sends compressed-air through air-duct 1114 to air-motor 1116, which starts its operation. Air-motor 1116 rotates shaft 1118, which drives electric generator 1120. Operation of electric generator 1120 supplies electric power through electric line 1124, regulator 1126, and electric line 1128 to electric battery 1122. This recharges the battery. When the state of charge of electric battery 1122 exceeds a second predetermined level, which is higher than the first predetermined level, control system 70 closes solenoid valve 1112, thus terminating the operation of air-motor 1116 and electric generator 1120. The values of the first and the second predetermined levels of battery charges are contained in control system 70 memory. Control system 70 can be programmed to maintain the rotational speed of electric generator 1120 within predetermined limits by controlling the flow of compressed-air to air-motor 1116. This can be accomplished by varying the opening of solenoid valve 1112.

Generating electric power by selectively operating an on-board electric generator with an approximately constant speed, and only when its operation is needed, is a substantial improvement over conventional systems, in which the generators are continuously driven with variable speed, regardless of need. Selective generation of electric power in quantities matching the vehicle needs eliminates waste and thus improves the overall vehicle fuel economy. In addition, eliminating, the need for the vehicle engine to drive the electric generator increases the peak engine torque and power available for vehicle propulsion.

The system of the present invention can also be arranged in combination with an electric hybrid system. For this, the system also includes an electric generator which can be selectively coupled either to the engine crankshaft or to the vehicle wheels, an electric motor which can be selectively coupled to the vehicle wheels, and an electric battery which is electrically connected to both the generator and the motor and can, selectively, either power the motor or be charged by the generator. The generator and the motor may be combined into a single generator-motor unit. When the electric hybrid system is activated, the generator converts energy derived either from vehicle motion during its deceleration or from operation of its engine into electric energy which is transferred to the electric battery for storage therein. Later, electric energy is transferred from the battery to the electric motor where it is converted into mechanical energy assisting in vehicle acceleration and propulsion. Such an electric hybrid system can serve as a back-up for the compressed-air-based hybrid system, and, in general, the two systems complement each other's operation. The control system is programmed to determine how to combine the operation of the two systems.

Those skilled in art will appreciate in view of this disclosure that other engine valves arrangements, other arrangements for supplying the control system with necessary information, and other methods of actuation of the key components of the system, possibly including other types of sensors and actuators, and other means of signal transmission, may be used according to the present invention. An example of an alternative embodiment of the present invention comprising an alternative valve arrangement is described below.

Description of an Alternative Embodiment

Figure 5:
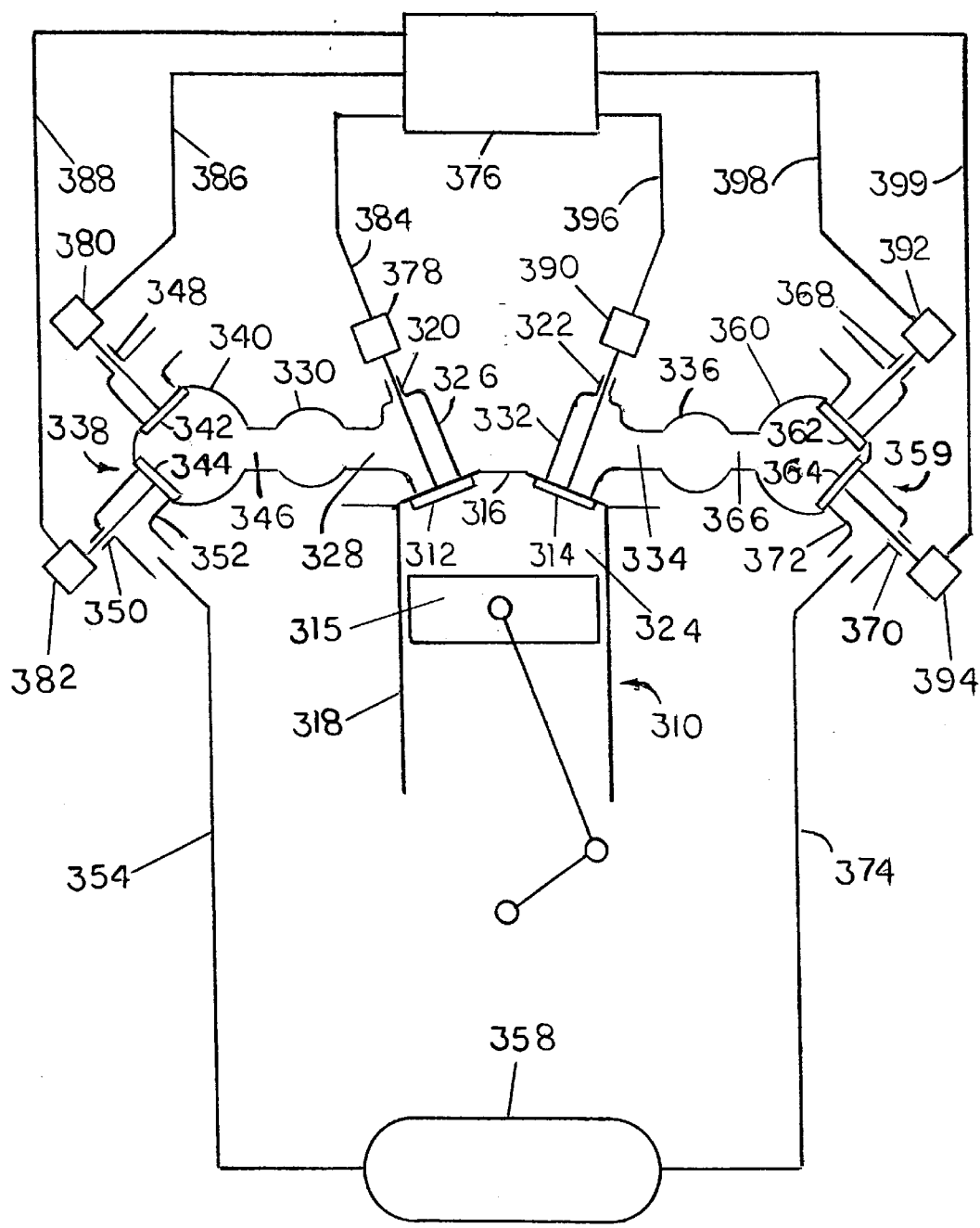
FIG. 5 is a schematic, cross-sectional side-view of an engine cylinder and head arrangement and its connection to a compressed-air reservoir, in accordance with an alternative embodiment of the present invention.

FIG. 5 is a schematic, cross-sectional side-view of an engine cylinder and head arrangement and its connection to a compressed-air reservoir, in accordance with an alternative embodiment of the present invention. In contrast to the above described preferred embodiment, the below described alternative embodiment features only two types of valves, an intake valve and an exhaust valve, in each engine cylinder. There are also switching arrangements which can selectively change the nature of functions performed by the intake and exhaust valves.

As shown in FIG. 5, an engine 310 has two types of normally-closed valves, an intake valve 312 and an exhaust valve 314, installed in a cylinder head 316 above an engine cylinder 318. Identical valve arrangements exist for all engine cylinders. Valves 312 and 314 are slideably mounted in guides 320 and 322, respectively. Depending on the needs of the engine, there may be more than one valve of each type in each engine cylinder Intake valve 312 is shown in its closed position in which it separates a cylinder chamber 324 from an intake port 326 which opens into an intake passage 328. Intake passage 328 connects to an intake manifold 330 to which all intake ports and all intake passages from all engine cylinders are connected.

Exhaust valve 314 is shown in its closed position in which it separates cylinder chamber 324 from an exhaust port 332 which opens into an exhaust passage 334. Exhaust passage 334 connects to an exhaust manifold 336 to which all exhaust ports and all exhaust passages from all engine cylinders are connected.

An intake switching arrangement 338 includes a switching chamber 340, attached to intake manifold 330, and two valves, a first intake switching valve 342 and a second intake switching valve 344. Intake switching chamber 340 can be connected to an opening 346 in the side of intake manifold 330, as shown in FIG. 5, with no opening at either of the two ends of the intake manifold. Alternatively, an intake switching chamber can be connected to an opening at one of the intake manifold two ends, with no opening at the other end. Valves 342 and 344 are slideably mounted in guides 348 and 350, respectively, which are arranged in switching chamber 340 First intake switching valve 342 is shown in its closed position, in which it separates intake manifold 330 from outside atmosphere. Second intake switching valve 344 is shown in its closed position, in which it separates intake manifold 330 from a port 352 connected via a duct 354 to an air-reservoir 358.

An exhaust switching arrangement 359 includes a switching chamber 360, attached to exhaust manifold 336, and two valves, a first exhaust switching valve 362 and a second exhaust switching valve 364. Exhaust switching chamber 360 can be connected to an opening 366 in the side of exhaust manifold 336, as shown in FIG. 5, with no opening at either of the two ends of the exhaust manifold. Alternatively, an exhaust switching chamber can be connected to an opening at one of the exhaust manifold two ends, with no opening at the other end. Valves 362 and 364 are slideably mounted in guides 368 and 370, respectively, which are arranged in switching chamber 360 First exhaust switching valve 362 is shown in its closed position, in which it separates exhaust manifold 336 from outside atmosphere. Second exhaust switching valve 364 is shown in its closed position, in which it separates exhaust manifold 336 from a port 372 connected via a duct 374 to air-reservoir 358.

A control system 376 controls operation of intake valve 312, first intake switching valve 342, and second intake switching valve 344 by sending control signals to actuators 378, 380, and 382, respectively, via cables 384, 386, and 388, respectively. Each cable may contain two lines, one for valve opening and one for closing. Control system 376 also controls operation of exhaust valve 314, first exhaust switching valve 362, and second exhaust switching valve 364 by sending control signals to actuators 390, 392, and 394, respectively, via cables 396, 398, and 399, respectively. Each cable may contain two lines, one for valve opening and one for closing.

In the above described example of the alternative embodiment there is only one intake manifold and one exhaust manifold. In other cases, however, the engine may have more than one intake manifold, each with its own intake switching arrangement, and more than one exhaust manifold, each with its own exhaust switching arrangement. In such a case, intake ports from a selective group of cylinders are connected to one of the intake manifolds, and exhaust ports from the same group of cylinders are connected to one of the exhaust manifolds. Intake and exhaust ports from other groups of cylinders are connected to other pairs of intake and exhaust manifolds. For example, in an eight-cylinder engine with two intake manifolds and two exhaust manifolds intake ports from a selective group of four cylinders can be connected to one of the two intake manifolds, while exhaust ports from the same group of cylinders are connected to one of the two exhaust manifolds. Similarly, intake and exhaust ports from a second group of four cylinders are connected to the second intake manifold and to the second exhaust manifold, respectively. Such an arrangement is useful when, as described below, some of the cylinders are assigned to operate as an internal combustion engine, while other cylinders operate as a compressor.

In all other respects, the above described alternative embodiment is identical to the previously described preferred embodiment. Those skilled in art will appreciate in view of this disclosure that other valve switching arrangements and other types of switching valves, possibly including rotary valves, may be used to effectuate connection of cylinder chambers in all engine cylinders through respective intake valves, selectively, either to outside atmosphere or to the air-reservoir, and through respective exhaust valves selectively, either to outside atmosphere or to the air-reservoir, according to the present invention.

Description of Operation of the Preferred Embodiment

The system described in the Description of Preferred Embodiment can operate in a variety of braking and propulsion modes which are described below.

Braking—Vehicle braking is performed whenever the vehicle driver signals a demand for a braking force by pressing on the brake pedal. It can be used to slow down the motion of the vehicle or to restrict its speed in a downhill drive. Compression braking is a preferred type of braking and is used whenever possible. Friction brakes are used only when needed to supplement compression braking, or when compression braking can not be used. Compression braking can be used only when the engine is coupled to the vehicle wheels and the vehicle is in motion.

In a moving vehicle with the engine coupled to the vehicle wheels, control system 70 (FIG. 2) responds to the driver's demand for a vehicle braking force by operating the engine in the compression braking mode. If the vehicle is not in motion, or if the engine is not coupled to the wheels, control system 70 responds to the driver's demand for a vehicle braking force by activating friction brake system 29 (FIG. 2).

During compression braking, no fuel is injected into the engine cylinders, and the engine operates as a reciprocating-piston two-stroke compressor driven from the vehicle wheels by vehicle motion. Air is received from outside atmosphere into the engine cylinders, compressed there, and displaced into air-reservoir 56 (FIG. 1). Work performed by the engine pistons absorbs the kinetic energy of the vehicle and slows it down or restricts its motion. In this way the energy of the vehicle motion is transformed into energy of compressed-air stored in air-reservoir 56.

FIGS. 6A to 6D illustrate a typical compression braking process employed by the preferred embodiment of the present invention. It is described as applied to cylinder 12 (FIG. 1), but, with proper shift in timing, it takes place in all engine cylinders. Arrows in the diagrams show the directions of crankshaft rotation and piston motion, as well as the motion of air into and out of the cylinder chamber. Each downstroke of the piston is a volume increasing stroke, and each upstroke is a volume decreasing stroke. The process can be considered consisting of four steps: intake, compression, air-reservoir charging, and residual-air expansion. Each four-step process is completed within a single engine revolution.

Figure 6A:
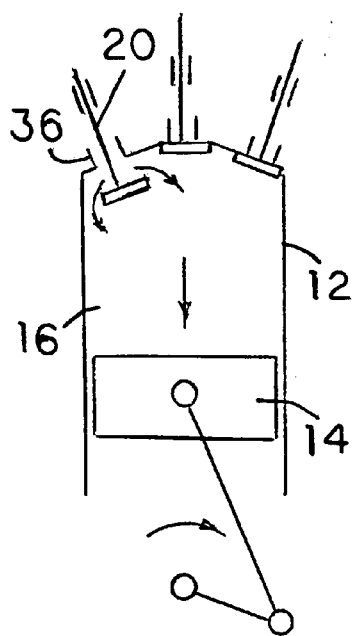
FIGS. 6A to 6D are schematic diagrams providing step-by-step illustrations of the vehicle engine cycle, when it operates as a compressor, in accordance with the present invention.
Figure 6B:
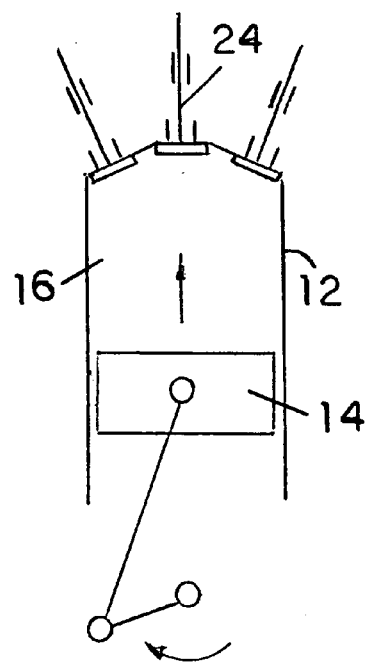

FIG. 6A is a diagram illustrating the step of intake. Intake valve 20 is open while the other valves remain closed, and a downward motion of piston 14 draws in atmospheric air through intake port 36 into cylinder chamber 16. The air comes to intake port 36 from intake manifold 40 (FIG. 1) through intake passage 38 (FIG. 1). The intake ends when intake valve 20 closes. Timing of intake valve 20 closure determines the volume of the air-charge received into cylinder chamber FIG. 6B illustrates the next step, the compression. All valves in cylinder 12 are closed, and an upward motion of piston 14 compresses the air-charge trapped in cylinder chamber 16. The compression ends when charging valve 24 opens. Timing of charging valve 24 opening determines how much the air-charge is compressed.

Figure 6C:
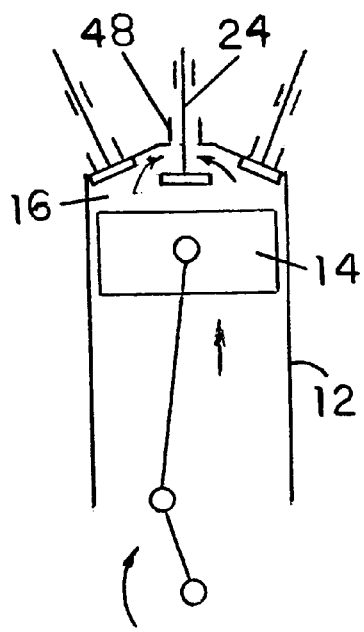

FIG. 6C illustrates the third step, the air-reservoir charging. Charging valve 24 is open while the other valves remain closed. Piston 14 continues its upward motion, displacing air from cylinder chamber 16 into charging port 48. From there, the displaced air flows (see FIG. 1) through charging passage 50, charging manifold 52, and duct 54 into air-reservoir 56. The air-reservoir charging ends when charging valve 24 closes, which, in a typical case, takes place when piston 14 reaches its top-dead-center position. Opening charging valve 24 before or after the top-dead-center reduces the amount of compressed-air displaced into air-reservoir 56.

Figure 6D:
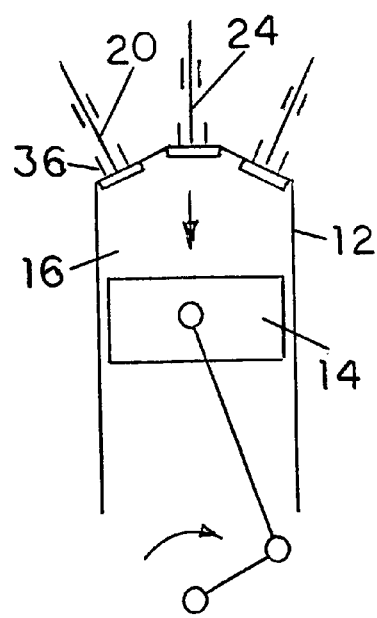

FIG. 6D illustrates the last step, the residual-air expansion. All valves in cylinder 12 are closed, and a downward motion of piston 14 expands the remnants of the air-charge left in cylinder chamber 16 after the closure of charging valve 24. This step ends when intake valve 20 opens, preferably when the pressure in cylinder chamber 16 drops to the level of atmospheric pressure. If intake valve 20 opens before the residual-air expands to atmospheric pressure, some of the air will be discharged back into intake port 36. This will reduce the expansion work performed on the piston by the residual-air. In an extreme case, intake valve 20 opens at top-dead-center, and there is no expansion of residual-air.

Control system 70 (FIG. 2) is programmed to control the process of compression braking in a manner which assures that the process generates a braking force of required magnitude, as determined by the magnitude of the signal generated by sensor 82 (FIG. 2). The magnitude of the braking force produced by compression braking increases or decreases with an increase or a decrease, respectively, in the rate at which the engine uses energy when it operates as a compressor. Therefore the braking force increases or decreases with an increase or a decrease, respectively, in the net negative work-per-cycle performed by the piston in each of the engine cylinders participating in the compression braking process. It also increases or decreases with an increase or a decrease, respectively, in frequency of the cycles repetition, and therefore it increases or decreases with an increase or a decrease, respectively, in the transmission ratio. Thus the braking force produced by compression braking can be varied by varying the work-per-cycle, or by varying the transmission ratio, or by varying both.

Thanks to operational flexibility offered by ability to quickly activate and deactivate the engine valves, the frequency of the cycles repetition can also be reduced, whenever needed, by selectively omitting some of the cycles. For example, the cycle can be performed once every other engine revolution, while during the in-between-cycle revolutions the valves are deactivated. This reduces the compression braking force in half, without any change in the work-per-cycle and the transmission ratio. Omission of some of the cycles is an additional method which the control system can use to control the magnitude of the braking force.

Compression braking is a preferable method for the braking force generation and control. However, if the compression braking can not produce the required braking force even at the maximum work-per-cycle and at the highest transmission ratio, control system 70 (FIG. 2) activates friction brake system 29 (FIG. 2), which then works in-parallel with compression braking.

The work-per-cycle in each cylinder is a finction of the timings of the engine valves openings and closings. These timings control various parameters contributing to the amount of work-per-cycle performed, such as the quantity of air received into the cylinder chamber, the ratio of air compression, the quantity of air displaced into the air-reservoir, and the ratio of residual-air expansion. Changing the timing of intake valve 20 closing varies the quantity of air received. Changing the timing of charging valve 24 opening varies the air compression ratio. Changing the timing of charging valve 24 closing varies the quantity of compressed-air displaced into the air-reservoir. Changing the timing of intake valve 20 opening varies the residual-air expansion ratio. Control system 70 (FIG. 2) controls and varies the braking force produced by compression braking by varying any, some, or all of the above valve timings and the transmission ratio according to a program contained in the control system software.

Figure 7A:
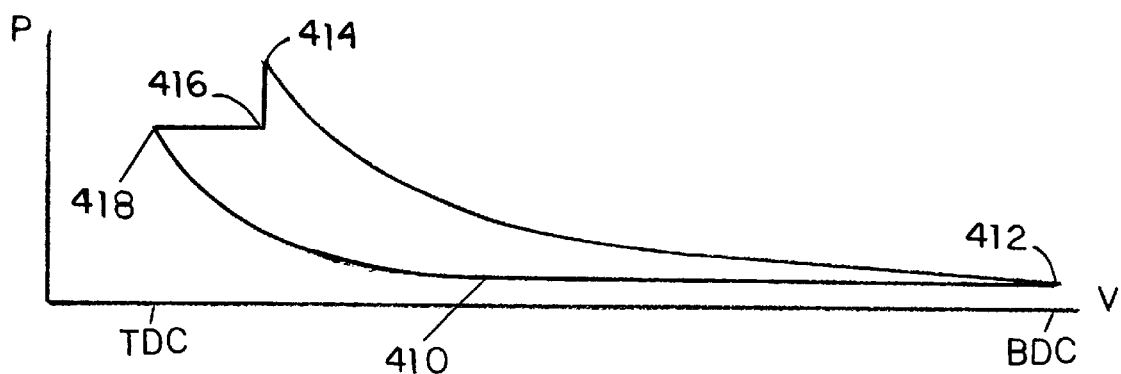
FIGS. 7A, 7B, and 7C are pressure-volume diagrams of the vehicle engine cycle illustrating its operation as a compressor, as shown in FIGS. 6A to 6D.
Figure 7B:
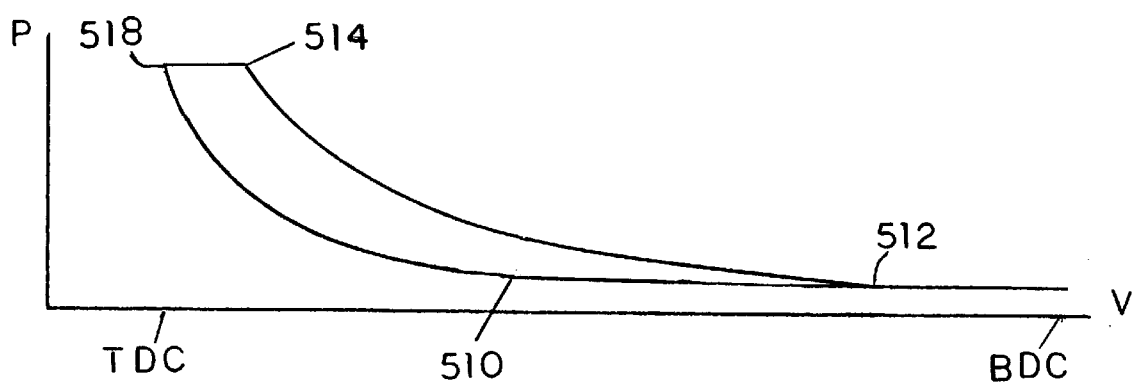

A more detailed insight into the above described compression braking process and its control can be acquired by examining a pressure-volume diagram of its cycle. Pressure-volume diagrams are frequently used to illustrate operation of reciprocating-piston machinery. Each diagram is a plot of pressure inside a cylinder as a function of the cylinder chamber volume, which varies with change in piston position. FIGS. 7A and 7B show pressure-volume diagrams, each illustrating a single cycle of compression braking in one of the engine cylinders. In each diagram, the cylinder chamber volume and the pressure are plotted along the horizontal and vertical axes, respectively. The pressure and volume axes in each diagram are labeled by letters P and V, respectively. The minimum volume at the top-dead-center and the maximum volume at the bottom-dead-center are marked on the horizontal axes by labels TDC and BDC, respectively. Each is an idealized diagram which assumes instantaneous valves opening and closing, and instantaneous air filling into and discharge from the cylinder chamber.

A typical pressure-volume diagram of compression braking during an early stage of the process is shown in FIG. 7A. Intake valve 20 (FIG. 6A) opens at a variable point 410 and later closes at a variable point 412. During this period, atmospheric air is received into cylinder chamber 16 (FIG. 6A) at constant pressure. This period, which takes place during a second part of the volume increasing stroke, corresponds to what is shown in FIG. 6A.

From point 412 to a variable point 414 all valves are closed, and the air-charge is compressed. This takes place during a first part of the volume decreasing stroke and corresponds to FIG. 6B.

At point 414 charging valve 24 (FIG. 6C) opens and remains open until its closure at a variable point 418. With opening of charging valve 24 at point 414, pressure in cylinder chamber 16 drops to the level of pressure in air-reservoir 56 (FIG. 1), which is illustrated by a point 416. From point 416 to point 418, air is displaced from cylinder chamber 16 into air-reservoir 56 at nearly constant pressure. There is only a relatively small increase in pressure associated with compression of air in air-reservoir 56. This takes place during a second part of the volume decreasing stroke and corresponds to FIG. 6C.

From point 418 to point 410 all valves are closed, and the fraction of the initial air-charge, still left in cylinder chamber 16, expands, preferably until its pressure drops to atmospheric pressure at point 410. This period takes place during a first part of the volume increasing stroke and corresponds to FIG. 6D.

In this description, work-per-cycle is referred to as net negative work, if it produces a braking force. If, on the other hand, it produces a propulsion force, it is referred to as net positive force. Net negative work performed during the above described cycle is equal to compression work performed from point 412 to point 414, plus displacement work performed from point 416 to point 418, and minus expansion work performed from point 418 to point 410.

A preferred method of controlling the work-per-cycle, during this stage of compression braking, is by controlling the compression work. Control system 70 (FIG. 2) can vary the compression work by varying the timing of intake valve 20 closure (point 412), or the timing of charging valve 24 opening (point 414), or the timing of both. Varying the timing of point 412 varies the quantity of air received into the cylinder. Varying the timing of point 414 varies the maximum pressure to which the air-charge is compressed.

Pressure in air-reservoir 56 (FIG. 1) increases with every compression braking cycle. Eventually, during a later stage of the process, pressure inside air-reservoir 56 may rise to the level of pressure in the engine cylinder at the end of compression. To continue pumping air into air-reservoir 56, each air-charge must be compressed, preferably, to a pressure at least equal to the pressure in the air-reservoir. Accordingly, control system 70 (FIG. 2) adjusts the required level of compression for every cycle.

FIG. 7B shows a typical pressure-volume diagram of compression braking during a later stage of the process. Intake valve 20 (FIG. 6A) opens at a variable point 510 and later closes at a variable point 512 after bottom-dead-center (in other cases point 512 may be timed before or at the bottom-dead-center). During this period, atmospheric air is received into cylinder chamber 16 (FIG. 6A) at constant pressure. This period takes place during a second part of the volume increasing stroke and corresponds to what is shown in FIG. 6A.

From point 512 to a variable point 514 all valves are closed, and the air-charge is compressed until its pressure becomes equal to pressure in air-reservoir 56. This takes place during a first part of the volume decreasing stroke and corresponds to FIG. 6B.

At point 514 charging valve 24 (FIG. 6C) opens and remains open until its closure at a variable point 518. From point 514 to point 518, air is displaced from cylinder chamber 16 into air-reservoir 56 at nearly constant pressure. There is only a relatively small increase in pressure associated with compression of air in air-reservoir 56. This period takes place during a second part of the volume decreasing stroke and corresponds to FIG. 6C.

From point 518 to point 510 all valves are closed, and the fraction of the initial air-charge, still left in cylinder chamber 16, expands, preferably until its pressure drops to atmospheric pressure at point 510. This period takes place during a first part of the volume increasing stroke and corresponds to FIG. 6D.

For each new cycle, control system 70 (FIG. 2) rises the pressure at the end of compression, at point 514, to match the pressure in air-reservoir 56. This is accomplished by retarding the timing of point 514. To maintain the required value of work-per-cycle, the volume of the air-charge is adjusted for each new cycle to compensate for the increase in pressure. This is performed by varying the timing of point 512.

Opening intake valve 20 before the pressure in cylinder chamber 16 drops to atmospheric pressure increases the work-per-cycle, since it results in a reduction in expansion work. This, however, is a less desirable method of work-per-cycle control, since it involves dumping of compressed-air into the atmosphere and, consequently, leads to a loss of energy.

Figure 7C:
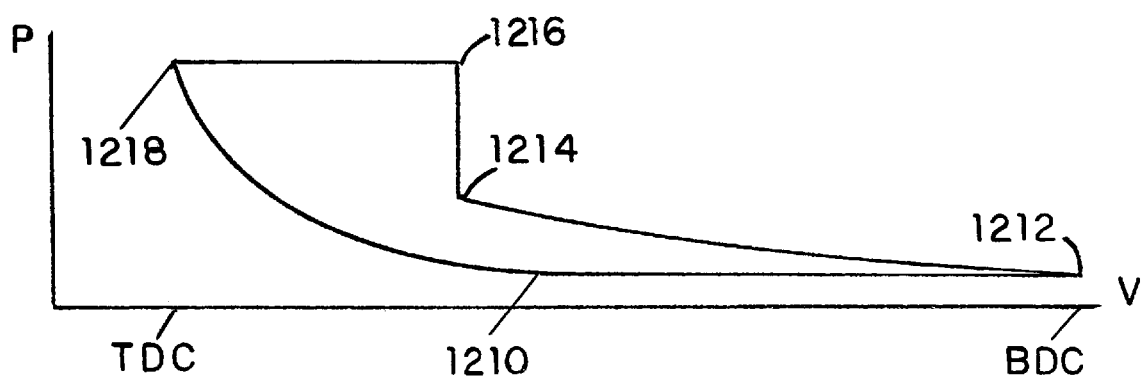

An alternative method of implementing compression braking involves opening the charging valve before the pressure in the cylinder chamber reaches the level of pressure in the air-reservoir. This may be useful when a substantial increase in work-per-cycle is needed. Such process is illustrated in a pressure-volume diagram shown in FIG. 7C.

Intake valve 20 (FIG. 6A) opens at a variable point 1210 and later closes at a variable point 1212. During this period, atmospheric air is received into cylinder chamber 16 (FIG. 6A) at constant pressure. This period, which takes place during a second part of the volume increasing stroke, corresponds to what is shown in FIG. 6A.

From point 1212 to a variable point 1214 all valves are closed, and the air-charge is compressed. This takes place during a first part of the volume decreasing stroke and corresponds to FIG. 6B.

At point 1214 charging valve 24 (FIG. 6C) opens and remains open until its closure at a variable point 1218. With the opening of charging valve 24 at point 1214, pressure in cylinder chamber 16 increases to the level of pressure in air-reservoir 56 (FIG. 1), which is illustrated by a point 1216. From point 1216 to point 1218, air is displaced from cylinder chamber 16 into air-reservoir 56 at nearly constant pressure. There is only a relatively small increase in pressure associated with compression of air in air-reservoir 56. This takes place during a second part of the volume decreasing stroke and corresponds to FIG. 6C.

From point 1218 to point 1210 all valves are closed, and the fraction of the initial air-charge, still left in cylinder chamber 16, expands, preferably until its pressure drops to atmospheric pressure at point 1210. This period takes place during a first part of the volume increasing stroke and corresponds to FIG. 6D

The above described process of compression braking, coupled with transfer of the compressed air into an air-reservoir, is a substantial improvement over a conventional braking involving friction brakes, which absorb the kinetic energy of the vehicle and dissipate it as heat. It is also an improvement over other types of compression braking, in which the compressed air is exhausted into the outside atmosphere. Instead, the energy of the vehicle motion is transformed into energy of compressed-air and stored in the air-reservoir. Later, the stored energy can be used to assist in vehicle propulsion and acceleration.

Using the vehicle engine as both an internal combustion engine and a compressor eliminates the need for additional machines, such as electric generators, hydraulic pumps, etc., which are employed by other hybrid vehicle systems. This simplifies the system and reduces its cost and weight.

Using air as a medium for energy storage has a distinct advantage over using other media, since air, even when compressed to a high pressure, is very light. This reduces the weight of the hybrid system. In addition, compressing air in a cylinder and, then, reversing this event by expanding the air in the same cylinder of a fast operating engine is a very efficient process.

Another advantage of the above described method of vehicle braking is reduced usage of friction brakes. This improves their reliability and extends their life, thus reducing the costs associated with their repair and replacement.

First Propulsion Mode—Control system 70 (FIG. 2) operates engine 10 (FIG. 1) as a prime mover selectively propelling the vehicle in one of several propulsion modes whenever the vehicle driver signals a demand for a propulsion force by pressing on accelerator pedal 96 (FIG. 2) and not pressing on brake pedal 86 (FIG. 2). The choice of the propulsion mode is determined by a control strategy incorporated in control system 70 software.

The first propulsion mode involves performance of a four-stroke hybrid cycle, during which the engine operates both as an air-motor and as an internal combustion engine. In this mode of operation the intake valves are deactivated and air is received into the engine cylinders from a compressed-air reservoir rather than from the outside atmosphere. The compressed-air charge expands in each cylinder and performs work displacing the piston during a first volume increasing stroke. Then the same air-charge is used in an internal combustion process, and expanding combustion gas performs additional work on the piston during a second volume increasing stroke. Thus each four-stroke cycle includes two power strokes, one with compressed-air and another one with combustion gas.

FIGS. 8A to 8F illustrate a typical first propulsion mode cycle. It is described as applied to cylinder 12 (FIG. 1), but, with proper shift in timing, it takes place in all the engine cylinders. Arrows in the diagrams show the directions of crankshaft rotation and piston motion, as well as motion of air into and exhaust gas out of the cylinder. Each downstroke of the piston is a volume increasing stroke, and each upstroke is a volume decreasing stroke. The process can be considered consisting of six steps: cylinder charging, air expansion, compression and ignition, gas expansion, exhaust, and residual gas retention. Each six-step cycle is completed within two engine revolutions.

Figure 8A:
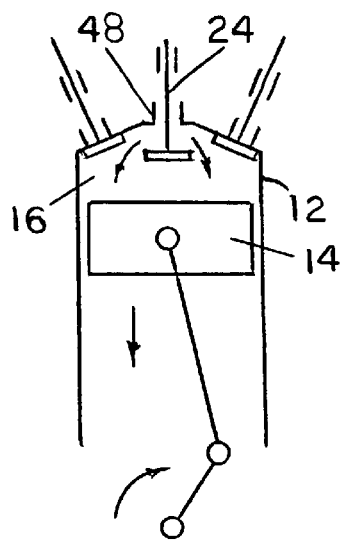
FIGS. 8A to 8F are schematic diagrams providing step-by-step illustrations of the vehicle engine cycle, when it operates as a compressed-air-assisted four-stroke internal combustion engine, in accordance with the present invention.

FIG. 8A is a diagram illustrating the first step—the cylinder charging. Charging valve 24 is open while the other valves remain closed. Piston 14 moves downward, and cylinder 12 is charged with compressed-air flowing through charging port 48 and open charging valve 24 into an expanding volume of cylinder chamber 16. The air comes to charging port 48 from air-reservoir 56 (FIG. 1) through duct 54 (FIG. 1), charging manifold 52 (FIG. 1), and charging passage 50 (FIG. 1). Cylinder charging ends when charging valve 24 closes. Timing of charging valve 24 closure determines the volume of the compressed-air charge received into the cylinder.

Figure 8B:
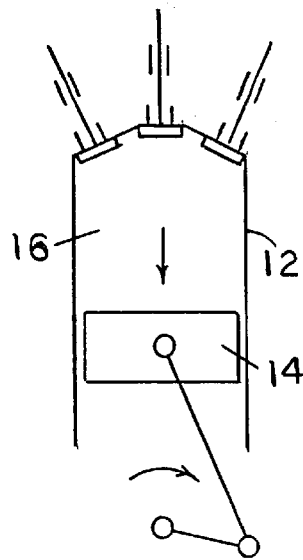

FIG. 8B illustrates the next step—the air expansion. All valves in cylinder 12 are closed, and a downward motion of piston 14 expands the air-charge trapped in cylinder chamber 16. The expansion ends when piston 14 reaches its bottom-dead-center position.

Figure 8C:
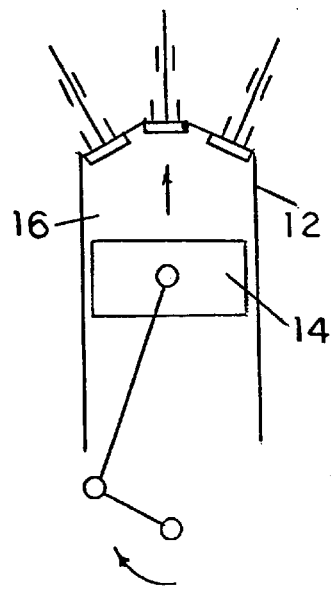

FIG. 8C illustrates the third step—compression and ignition. All valves in cylinder 12 remain closed, and an upward motion of piston 14 compresses the air-charge in cylinder chamber 16. Fuel is injected into cylinder chamber 16 and is ignited, preferably, before piston 14 reaches the top-dead-center. In spark-ignition engines fuel can be injected even before the bottom-dead-center.

Figure 8D:
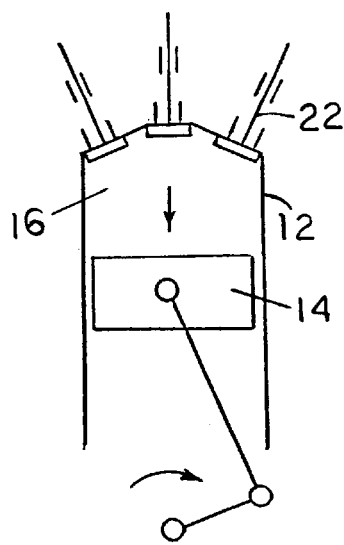

FIG. 8D illustrates the fourth step—the gas expansion. All valves in cylinder 12 remain closed. The air-fuel mixture burns in cylinder chamber 16, and the gaseous products of combustion expand, performing useful work on the downward moving piston 14. Expansion continues until exhaust valve 22 opens.

Figure 8E:
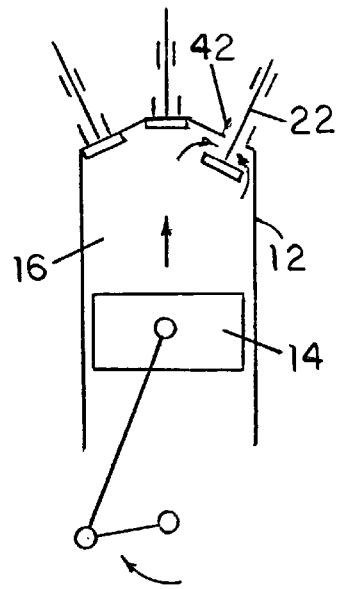

FIG. 8E illustrates the next step—the exhaust. Exhaust valve 22 is open while the other valves remain closed, and an upward motion of piston 14 expels the products of combustion, the combustion gas, from cylinder chamber 16 through the opened exhaust valve 22 and exhaust port 42. The exhaust ends when exhaust valve 22 closes.

Figure 8F:
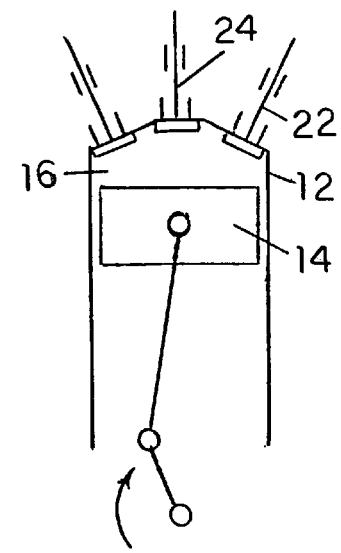

FIG. 8F illustrates the last step—the residual-gas retention. Exhaust valve 22 has closed before piston 14 reached the top-dead-center, and a certain quantity of combustion gas, the residual-gas, remains trapped in cylinder chamber 16. This gas is needed to restrict production of harmful nitrogen oxide in the next cycle. Timing of exhaust valve 22 closure determines the volume of residual-gas retained in the cylinder. This step ends when charging valve 24 opens, and then the same cycle is repeated again during the next two engine revolutions.

Control system 70 (FIG. 2) is programmed to control the first propulsion mode in a manner which assures that the process generates a propulsion force of required magnitude, as determined by the magnitude of the signal generated by sensor 92 (FIG. 2). The magnitude of the propulsion force increases or decreases with an increase or a decrease, respectively, in the net positive work-per-cycle performed on the piston in each of the engine cylinders. It also depends on frequency with which the cycles are repeated, and therefore it increases or decreases with an increase or a decrease, respectively, in the transmission ratio. Thus, the propulsion force can be varied by varying the work-per-cycle, or by varying the transmission ratio, or by varying both.

Two key contributors to the work-per-cycle are: work performed by compressed-air and work performed by combustion-gas. Work performed by compressed-air is a function of the timings of charging valve 24 opening and closing, which determine the quantity of air received from air-reservoir 56 (FIG. 1). Work performed by combustion-gas depends on the quantity of fuel added to the air in the cylinder. Thus, the work-per-cycle can be varied by varying three parameters: timings of charging valve 24 opening and closing, and the quantity of fuel added to the air-charge. Control system 70 (FIG. 2) controls the propulsion force by varying any, some, or all of the above parameters, and by varying the transmission ratio according to a program contained in the control system software. In vehicles with manual transmission control, it is the vehicle driver who varies the transmission ratio.

Figure 9:
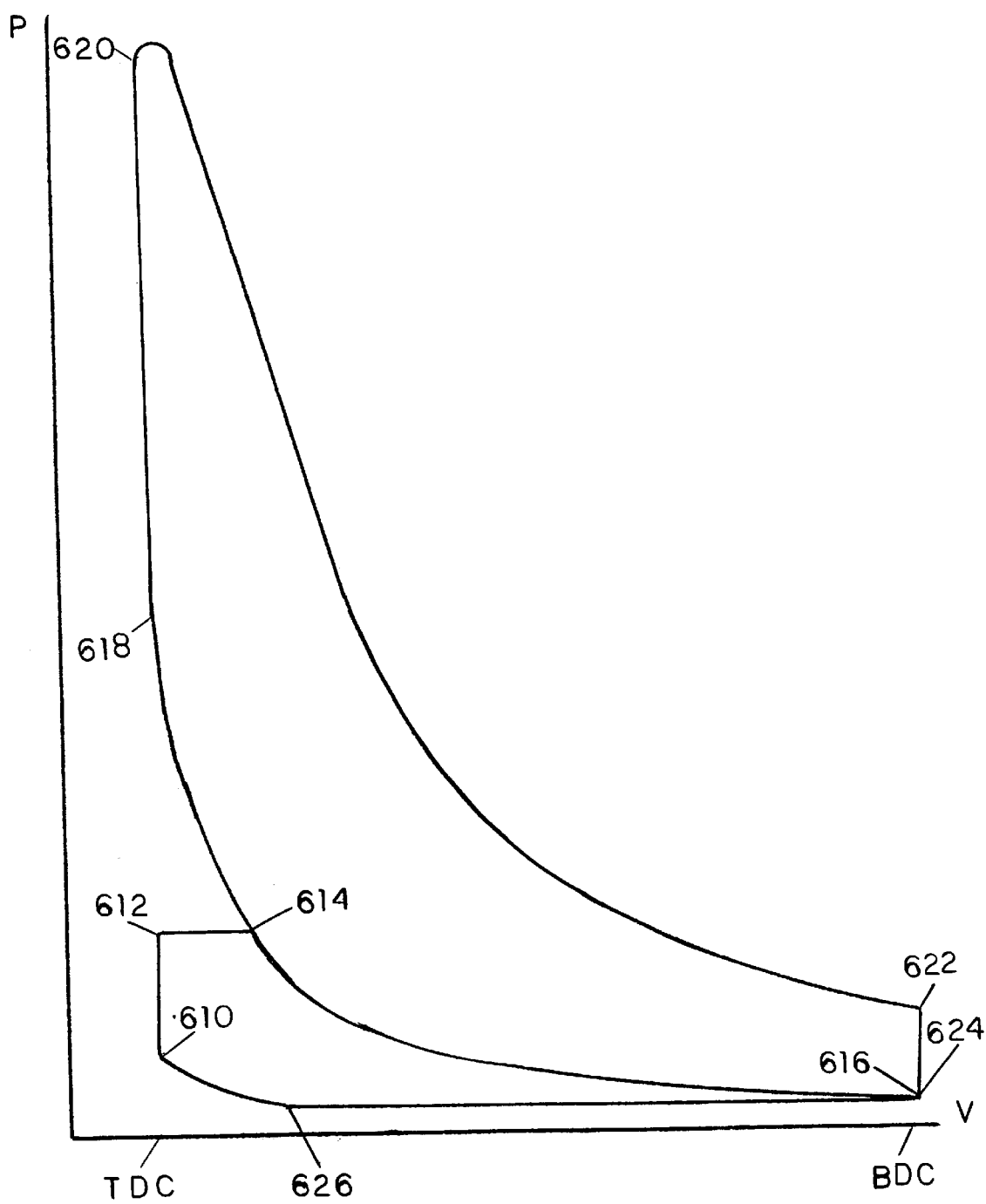
FIG. 9 is a pressure-volume diagram of the vehicle engine cycle illustrating its operation as a four-stroke internal combustion engine, as shown in FIGS. 8A to 8F.

A typical idealized pressure-volume diagram of the first propulsion cycle is shown in FIG. 9. Charging valve 24 (FIG. 8A) opens at a point 610, and the pressure in the cylinder increases to the level of pressure in air-reservoir 56 (FIG. 1), which corresponds to a point 612. A preferred timing of charging valve 24 opening is at the top-dead-center. From point 612 to a point 614 piston 14 (FIG. 8A) is displaced by a nearly constant air-pressure in cylinder chamber 16 (FIG. 8A). There is only a relatively small drop in pressure associated with expansion of air in air-reservoir 56. This period takes place during a first part of a first volume increasing stroke and corresponds to what is shown in FIG. 8A.

At point 614 charging valve 24 closes, and from point 614 to a point 616, which is at the bottom-dead-center, the air-charge in cylinder chamber 16 expands. This takes place during a second part of the first volume increasing stroke and corresponds to FIG. 8B.

From point 616 to a point 618 the cylinder charge is compressed, and from point 618 to a point 620 heat generated by combustion increases its pressure at nearly constant volume. This period takes place during a first volume decreasing stroke and corresponds to FIG. 8C.

From point 620 to a point 622 combustion is completed, and the expanding combustion-gas displaces piston 14 until it reaches its bottom-dead-center at point 622. This takes place during a second volume increasing stroke and corresponds to FIG. 8D.

Exhaust valve 22 (FIG. 8E) opens at or shortly before the bottom-dead-center, and the pressure in the cylinder drops to a nearly atmospheric pressure, as shown at a point 624 (it coincides with point 616 in the diagram). From point 624 to a point 626 combustion-gas is expelled from cylinder chamber 16 through the open exhaust valve 22. This period takes place during a first part of a second volume decreasing stroke and corresponds to FIG. 8E.

At point 626 exhaust valve 22 closes, and from point 626 to point 610 all valves are closed, and residual-gas compression takes place. This takes place during a second part of the second volume decreasing stroke and corresponds to FIG. 8F.

Net positive work performed during the above described cycle is equal to displacement work performed from point 612 to point 614, plus expansion work performed from point 614 to point 616, minus compression work performed from point 616 to point 618, plus expansion work performed from point 620 to point 622, and minus compression work performed from point 626 to point 610. It is assumed here that exhaust work from point 624 to point 626 is negligibly small.

The above described four-stroke cycle is just a typical example of operation in the first propulsion mode. Those skilled in art will appreciate that other variants of that cycle, with other sequences of events can be used for such operation. For example, instead of closing charging valve 24 at point 614 (FIG. 9) during the downstroke of piston 14, closure of the charging valve can be delayed until the piston returns to the same position during its upstroke. The volume of air received into the engine cylinder is determined by the position of the piston in the cylinder at the time of the charging valve closure, regardless of whether this position was reached during the downstroke or during the upstroke of the piston.

The fact that the above described first propulsion mode cycle includes two power strokes, one with compressed-air and another with combustion-gas, is a significant advantage over a conventional four-stroke internal combustion cycle including only one power stroke. Work performed by compressed-air during one power stroke is added to work performed by combustion-gas during a second power stroke. This reduces the work which the combustion-gas must perform and, thus, reduces the quantity of fuel required. Since the work performed by compressed-air represents energy which was previously saved, a substantial reduction in fuel consumption is achieved.

The additional work performed by compressed-air increases the magnitude of the peak torque that can be produced by the engine. A further increase in the peak torque and peak power of the engine can be achieved by supercharging the engine with compressed-air from the air-reservoir. Charging the engine cylinders with quantities of air in excess of what a conventional naturally aspirated engine can receive increases the maximum quantity of fuel that can be burned in each cylinder during each cycle. An increase in the peak engine torque and power, without an increase in engine displacement, creates an opportunity for a reduction in engine size (smaller engine displacement). This is a significant advantage, since a smaller engine consumes less fuel during part-load operation.

An additional advantage of the above described cycle is its ability to trap a variable and controllable quantity of residual-gas in each engine cylinder at the end of the second volume decreasing stroke. Retention of residual-gas contributes to a reduction in harmful nitrogen oxide emission and eliminates the need for exhaust-gas recirculation systems used for the same purpose in conventional internal combustion engines. This leads to a substantial reduction in costs.

Second Propulsion Mode—The second propulsion mode involves repeated performance of a four-stroke cycle, during which the engine operates as a conventional four-stroke internal combustion engine. The charging valves are deactivated, and air is received into the engine cylinders from the outside atmosphere. Each cylinder receives its air-charge through an open intake valve during a first volume increasing stroke. Then, during a first volume decreasing stroke, the air-charge is compressed, fuel is added to it, and the air-fuel mixture is ignited. During a second volume increasing stroke the expanding combustion-gas performs positive work on the piston, and during a second volume decreasing stroke the gas is expelled from the cylinder through an open exhaust valve. As in other four-stroke internal combustion engines, work-per-cycle is a function of the quantity of fuel burned in each cylinder during the cycle. Control system 70 (FIG. 2) controls the magnitude of the propulsion force by controlling the quantity of fuel added to each air-charge and by varying the transmission ratio. In vehicles with manual transmission control, it is the vehicle driver who varies the transmission ratio.

Control system 70 (FIG. 2) controls the quantity of air received into each cylinder during each cycle by controlling the timings of the intake valves opening and closing. Ability to vary the quantity of air received by varying the timings of the intake valve events is an important advantage over most other conventional four-stroke engines, since it eliminates the need for throttling the intake air flow. Elimination of throttling reduces the pumping loss and thus contributes to better fuel economy.

Control system 70 also controls the quantity of residual-gas remaining in the cylinder after the end of each cycle by controlling the timing of the exhaust valve closure. Such ability to control the quantity of residual gas is another important advantage, since it eliminates the need for an external exhaust-gas recirculation system needed, in most engines, to restrict nitrogen oxide emission. Elimination of the external exhaust-gas recirculation system leads to a reduction in costs.

Third Propulsion Mode—The third propulsion mode involves performance of a two-stroke hybrid cycle, during which the engine operates as a two-stroke internal combustion engine with a compressed-air assist. An entire cycle in each engine cylinder is completed during a single engine revolution. The intake valves are deactivated, and air is received into the engine cylinders from the compressed-air reservoir only.

In a typical third propulsion mode cycle, compressed-air from air-reservoir 56 (FIG. 1) is received into each engine cylinder and subjected to additional compression during a part of the piston volume decreasing stroke. Fuel is injected into the air-charge, and the air-fuel mixture is ignited, preferably before the piston reaches the top-dead-center. Combustion and combustion-gas expansion takes place during a volume increasing stroke of the piston, followed by exhaust during an early part of the volume decreasing stroke of the piston preceding the compressed-air intake.

FIGS. 10A to 10D illustrate a typical third propulsion mode cycle. It is described as applied to cylinder 12 (FIG. 1), but, with or without a shift in timing, it takes place in all the engine cylinders. Arrows in the diagrams show the directions of crankshaft rotation and piston motion, as well as motion of air into and exhaust gas out of the cylinder. Each downstroke of the piston is a volume increasing stroke, and each upstroke is a volume decreasing stroke. The process can be considered consisting of four steps: cylinder charging, compression and ignition, gas expansion, and exhaust. Each four-step cycle is completed within one engine revolution.

Figure 10A:
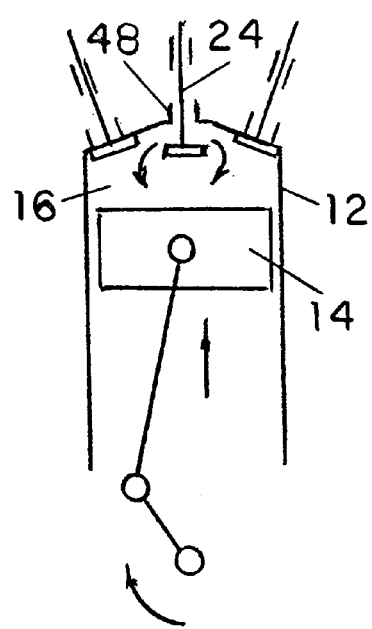
FIGS. 10A to 10D are schematic diagrams providing step-by-step illustrations of the vehicle engine cycle, when it operates as a compressed-air-assisted two-stroke internal combustion engine, in accordance with the present invention.

FIG. 10A is a diagram illustrating the first step—the cylinder charging. Charging valve 24 is open while the other valves remain closed. Piston 14 moves upward, and cylinder 12 is charged with compressed-air flowing through charging port 48 and open charging valve 24 into a shrinking volume of cylinder chamber 16. The air comes to charging port 48 from air-reservoir 56 (FIG. 1) through duct 54 (FIG. 1), charging manifold 52 (FIG. 1), and charging passage 50 (FIG. 1). Inside cylinder chamber 16, the air is mixed with residual exhaust-gas. Cylinder charging ends when charging valve 24 closes.

Figure 10B:
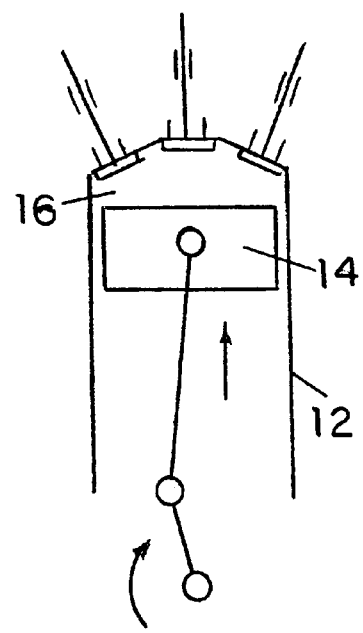

FIG. 10B illustrates the next step—compression and ignition. All valves in cylinder 12 are closed, and an upward motion of piston 14 compresses the mixture of air and residual gas. Fuel is injected into cylinder chamber 16 and is ignited, preferably, before piston 14 reaches the top-dead-center.

Figure 10C:
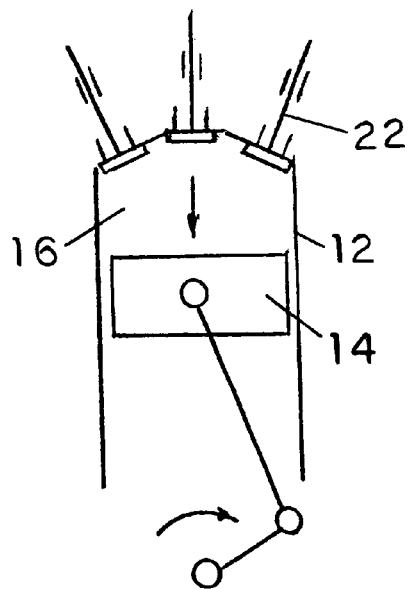

FIG. 10C illustrates the third step—the gas expansion. All valves in cylinder 12 remain closed. The air-fuel mixture in cylinder chamber 16 burns, and the gaseous products of combustion expand, performing useful work on the downward moving piston 14. Expansion continues until exhaust valve 22 opens.

Figure 10D:
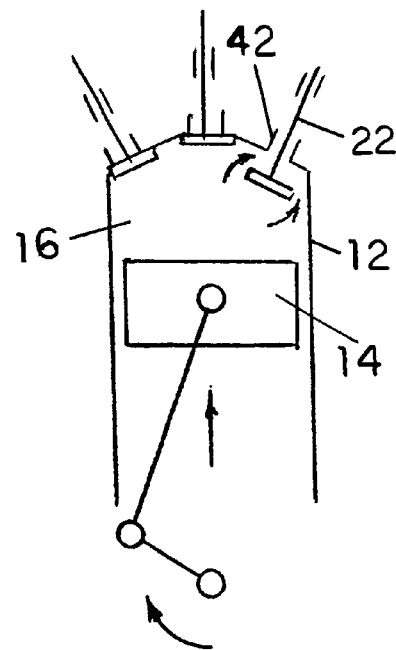

FIG. 10D illustrates the last step—the exhaust. Exhaust valve 22 is open while the other valves remain closed, and an upward motion of piston 14 expels the products of combustion from cylinder chamber 16 through the open exhaust valve 22 and exhaust port 42. This step precedes the first step of the next cycle, which takes place during the same piston stroke. The exhaust ends when exhaust valve 22 closes.

Control system 70 (FIG. 2) controls the third propulsion mode in the same way as the first propulsion mode. The factors affecting the magnitude of the propulsion force are the same as in the case of the first propulsion mode. The propulsion force increases or decreases with an increase or a decrease, respectively, in the net positive work-per-cycle, and with an increase or a decrease, respectively, in the transmission ratio. As in the first propulsion mode, the work-per-cycle can be varied by varying three parameters: timings of charging valve 24 opening and closing, and the quantity of fuel added to the air-charge. Control system 70 (FIG. 2) controls the propulsion force by varying any, some, or all of the above parameters, and by varying the transmission ratio according to a program contained in the control system software. In vehicles with manual transmission control, it is the vehicle driver who varies the transmission ratio.

Figure 11:
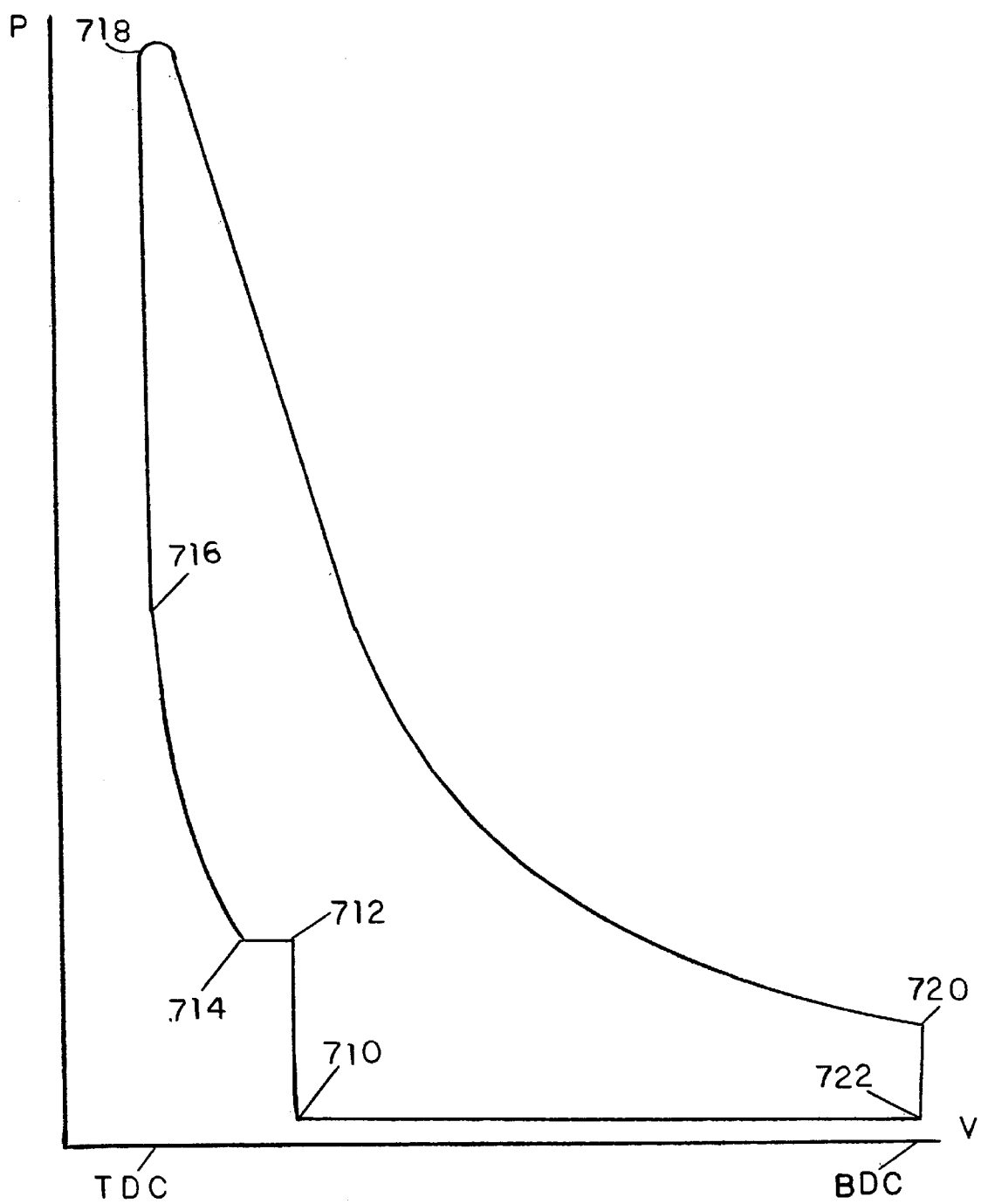
FIG. 11 is a pressure-volume diagram of the vehicle engine cycle illustrating its operation as a two-stroke internal combustion engine, as shown in FIGS. 10A to 10D.

A typical idealized pressure-volume diagram of the third propulsion mode cycle is shown in FIG. 11. Charging valve 24 (FIG. 10A) opens at a point 710, and the pressure in the cylinder increases to the level of pressure in air-reservoir 56 (FIG. 1) during an upstroke of piston 14 (FIG. 10A), which corresponds to a point 712. From point 712 to a point 714 piston 14 moves against nearly constant pressure in cylinder chamber 16 (FIG. 10A). There is only a relatively small increase in pressure associated with compression of air in air-reservoir 56. This takes place during a second part of the volume decreasing stroke and corresponds to FIG. 10A.

At point 714 charging valve 24 closes, from point 714 to a point 716 the cylinder charge is compressed, and from point 716 to a point 718 heat from combustion increases its pressure at nearly constant volume. This takes place during a third part of the volume decreasing stroke and corresponds to FIG. 10B.

From point 718 to a point 720 combustion is completed, and the expanding combustion-gas displaces piston 14 until it reaches its bottom-dead-center at point 720. This takes place during the volume increasing stroke and corresponds to FIG. 10C.

Exhaust valve 22 (FIG. 10D) opens at or shortly before the bottom-dead-center, and the pressure in the cylinder drops to nearly atmospheric pressure, as shown at a point 722. After point 722, upward motion of piston 14 (FIG. 10D) expels combustion-gas from cylinder chamber 16 (FIG. 10D) through the open exhaust valve 22 until the exhaust valve closes. This takes place during a first part of the volume decreasing stroke and corresponds to FIG. 10D. Timing of exhaust valve 22 closure determines the quantity of residual-gas retained in the cylinder. A preferred timing of exhaust valve 22 closing coincides with the timing of charging valve 24 (FIG. 10D) opening at point 710. From then on, the same cycle is repeated again during the next engine revolution.

The net positive work performed during the above described cycle is equal to expansion work performed from point 718 to point 720, minus displacement work performed from point 712 to point 714, and minus compression work performed from point 714 to point 716. It is assumed here that the exhaust work from point 722 to point 710 is negligibly small.

Charging each engine cylinder with compressed-air during each volume decreasing stroke reduces the amount of compression work required. This reduces the work which the combustion-gas must perform and, thus, reduces the quantity of fuel required. Since the work performed by compressed-air represents energy which was previously saved, a substantial reduction in fuel consumption is achieved.

Engine operation can be switched from a four-stroke cycle (first propulsion mode) to a two-stroke cycle (third propulsion mode), or vice versa simply by changing the sequence and frequency of operation of the engine valves, injectors, and spark plugs (when applicable). Such a change can be accomplished in one engine cycle. Ability to selectively switch the engine operation from a four-stroke cycle to a two-stroke cycle and back is an important advantage over conventional internal combustion engines, which, depending on their design, can operate only either as four-stroke, or as two-stroke engines. A switch from the four-stroke to the two-stroke cycle doubles the number of combustion events at a given engine speed, which leads to a significant step-up in engine torque and power. This is especially useful during acceleration from a low vehicle speed, when a sudden increase in torque is very desirable.

Fourth Propulsion Mode—In the fourth propulsion mode the engine operates as a two-stroke air-motor receiving compressed-air from a compressed-air reservoir. An entire cycle in each engine cylinder is completed during a single engine revolution. In a typical fourth propulsion mode cycle, fuel injectors are deactivated, and compressed-air from air-reservoir 56 (FIG. 1) is received into each engine cylinder and expands there displacing the piston during its volume increasing stroke. Then, during a volume decreasing stroke, the expanded air is exhausted from the cylinder into the outside atmosphere.

Figure 12A:
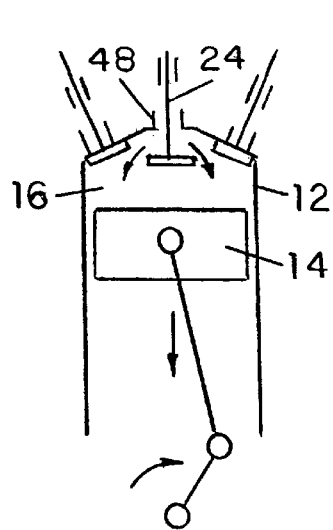
FIGS. 12A to 12C are schematic diagrams providing step-by-step illustrations of the vehicle engine cycle, when it operates as an air-motor, in accordance with the present invention.
Figure 12B:
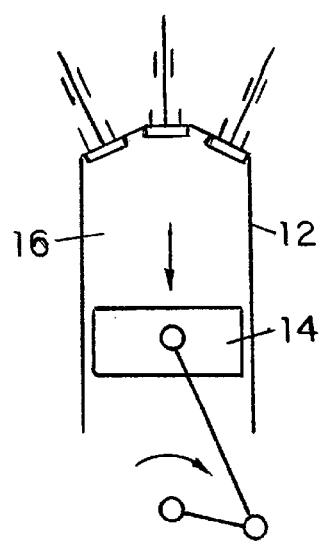
Figure 12C:
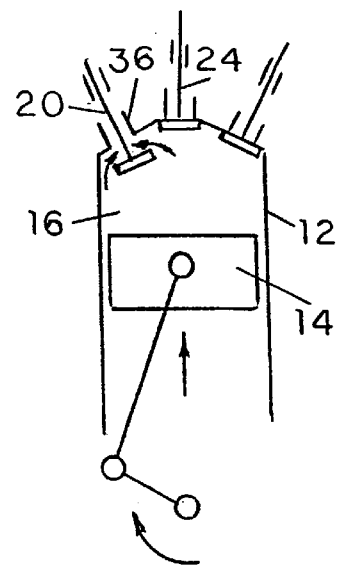

FIGS. 12A to 12C illustrate a typical fourth propulsion mode cycle. It is described as applied to cylinder 12 (FIG. 1), but, with proper shift in timing, it takes place in all the engine cylinders. Arrows in the diagrams show the directions of crankshaft rotation and piston motion, as well as motion of air into and out of the cylinder. Each downstroke of the piston is a volume increasing stroke, and each upstroke is a volume decreasing stroke. The process can be considered consisting of three steps: cylinder charging, air expansion, and exhaust. Each three-step cycle is completed within one engine revolution.

FIG. 12A is a diagram illustrating the first step—the cylinder charging. Charging valve 24 is open while the other valves remain closed. Piston 14 moves downward, and cylinder 12 is charged with compressed-air flowing through charging port 48 and open charging valve 24 into an expanding volume of cylinder chamber 16. The air comes to charging port 48 from air-reservoir 56 (FIG. 1) through duct 54 (FIG. 1), charging manifold 52 (FIG. 1), and charging passage 50 (FIG. 1). Cylinder charging ends when charging valve 24 closes. Timing of charging valve 24 closure determines the volume of the compressed-air charge received into the cylinder.

FIG. 12B illustrates the next step—the air expansion. All valves in cylinder 12 are closed, and a downward motion of piston 14 expands the air-charge trapped in cylinder chamber 16. The expansion ends when piston 14 reaches its bottom-dead-center position.

FIG. 12C illustrates the last step—the exhaust. Intake valve 20 is open while the other valves remain closed, and an upward motion of piston 14 expels the air from cylinder chamber 16 through open intake valve 20 and intake port 36. This step ends when intake valve 20 closes and charging valve 24 opens, and then the same cycle is repeated again during the next engine revolution.

In the above described cycle the exhaust valves are deactivated. Expelling the air from the cylinder through the intake valve, rather than through the exhaust valve, is preferable, since it prevents undesirable cooling of a catalyst which is part of the engine exhaust system. Nevertheless, in another variant of the above cycle, the intake valves can be deactivated and the air exhausted through the exhaust valves.

Control system 70 (FIG. 2) controls the magnitude of the propulsion force by controlling the net positive work-per-cycle and the transmission ratio. The work-per-cycle is controlled by varying the timings of the charging valve opening and closing, which determine the quantity of air received into the cylinder from air-reservoir 56 (FIG. 1). The propulsion force increases or decreases with an increase or a decrease, respectively, in the net positive work-per-cycle, and with an increase or a decrease, respectively in the transmission ratio. In vehicles with manual transmission control, it is the vehicle driver who varies the transmission ratio.

Figure 13:
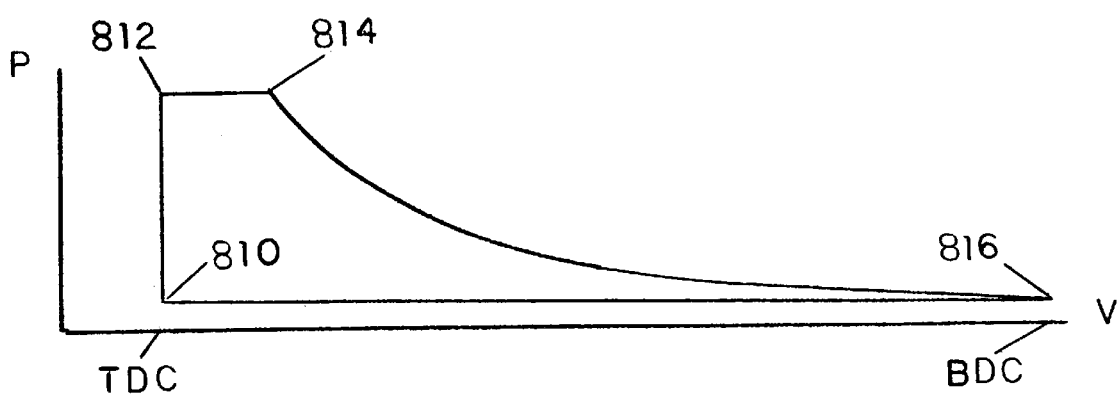
FIG. 13 is a pressure-volume diagram of the vehicle engine cycle illustrating its operation as an air-motor, as shown in FIGS. 12A to 12C.

A typical pressure-volume diagram of the fourth propulsion mode cycle is shown in FIG. 13. Charging valve 24 (FIG. 12A) opens at a point 810, which is preferably at the top-dead-center, and the pressure in cylinder chamber 16 (FIG. 12A) rises to the level of pressure in air-reservoir 56 (FIG. 1), which is illustrated by a point 812. From point 812 to a point 814 cylinder chamber 16 is charged with compressed-air from air-reservoir 56. This takes place during a first part of the volume increasing stroke and corresponds to FIG. 12A.

At point 814 charging valve 24 (FIG. 12A) closes, and from point 814 to a point 816 the air-charge expands, preferably to atmospheric pressure. This takes place during a second part of the volume increasing stroke and corresponds to FIG. 12B.

At a point 816, which is, preferably, at the bottom-dead-center, intake valve 20 (FIG. 12C) opens, and from point 816 to point 810 air is expelled from cylinder chamber 16 (FIG. 12C). This takes place during the volume decreasing stroke and corresponds to FIG. 12C. Closing of intake valve 20 approximately coincides with opening of charging valve 24 at point 810, and then the same cycle is repeated again.

The net work performed during the above described cycle is equal to displacement work performed from point 812 to point 814, plus expansion work performed from point 814 to point 816. It is assumed here that the exhaust work from point 816 to point 810 is negligibly small.

No fuel is consumed by the engine during periods of operation in the fourth propulsion mode. The vehicle is propelled by compressed-air, and, since the work performed by compressed-air represents energy previously saved, periodic operation in the fourth propulsion mode contributes to a reduction in average fuel consumption.

Operation in the fourth propulsion mode is especially useful for engine starting, since it permits starting the engine motion from rest and bringing it to a required speed without resorting to an electric starter. This reduces, and in some cases eliminates, the need for an electric starter, which contributes to a cost reduction.

Operation with Port-Injection—The previously described first propulsion mode requires direct fuel injection into the engine cylinders. However, many internal combustion engines operate with port fuel injection involving injection of fuel into each engine intake port in advance of the air-intake event. The system described in this invention can also be adopted to operate in a vehicle propulsion mode with port fuel injection. For this, each engine cylinder receives a fraction of its air-charge from the air-reservoir, and the rest of the air-charge comes from the outside atmosphere. Fuel is added to the atmospheric air while it is still in the intake port, before it enters the cylinder chamber.

Figure 14:
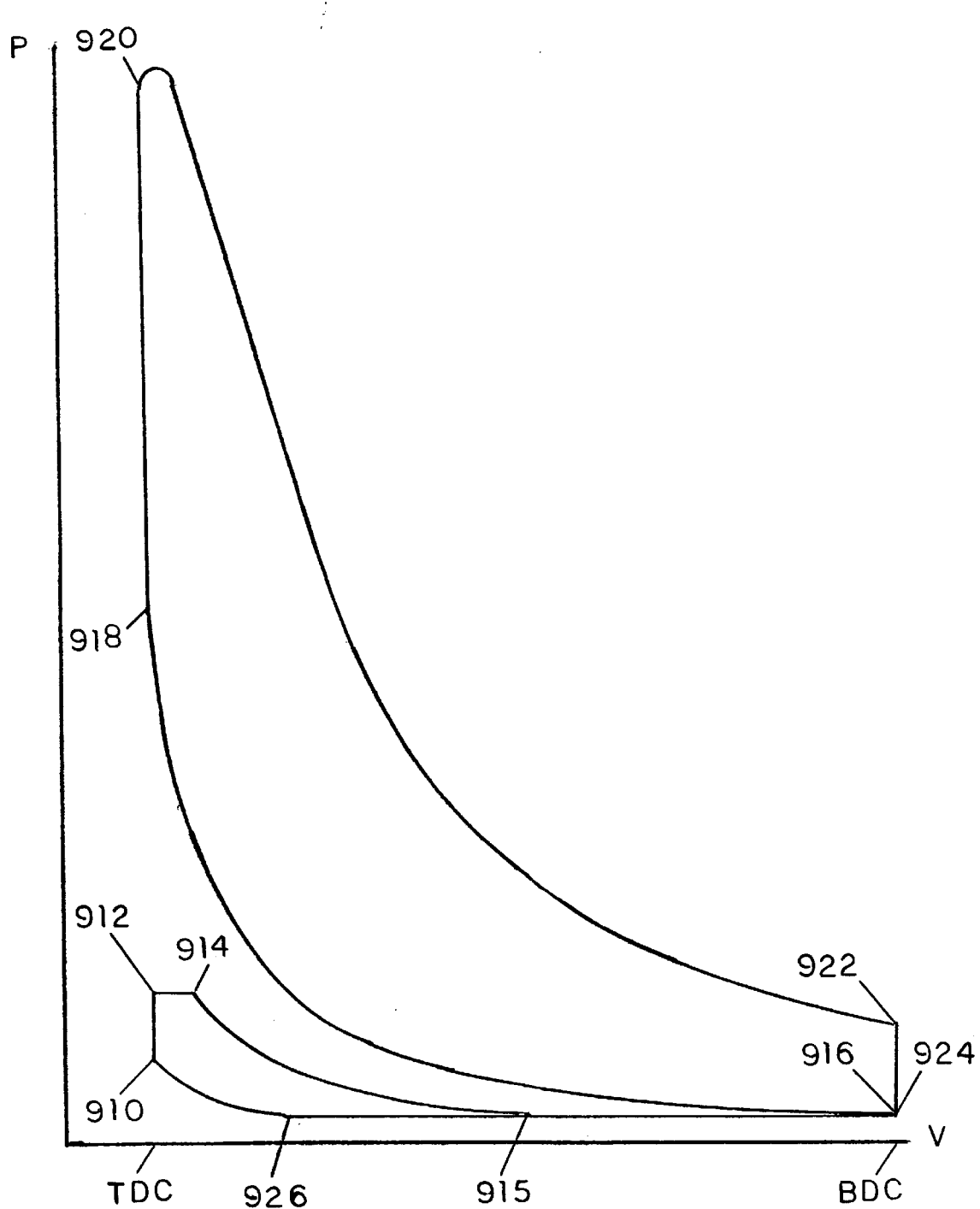
FIG. 14 is a pressure-volume diagram of the vehicle engine cycle illustrating its operation as a compressed-air-assisted four-stroke internal combustion engine receiving air partly from the compressed-air reservoir and partly from outside atmosphere, in accordance with the present invention.

FIG. 14 shows a typical pressure-volume diagram illustrating a modified first propulsion mode cycle operating with port fuel injection. Charging valve 24 (FIG. 1) opens at a point 910, and the pressure in the cylinder increases to the level of pressure in air-reservoir 56 (FIG. 1), which corresponds to a point 912. A preferred timing of charging valve 24 opening is at the top-dead-center. From point 912 to a point 914 piston 14 (FIG. 1) is displaced by a nearly constant air-pressure in cylinder chamber 16 (FIG. 1). There is only a relatively small drop in pressure associated with expansion of air in air-reservoir 56. This is the first part of the first volume increasing stroke.

At point 914 charging valve 24 closes, and from point 914 to a point 915 the air-charge in cylinder chamber 16 expands, preferably until the pressure in the cylinder drops to the level of pressure in intake manifold 40 (FIG. 1). This is a second part of the first volume increasing stroke.

Fuel is injected into intake port 36 (FIG. 1) in advance of intake valve 20 (FIG. 1) opening. At point 915 intake valve 20 opens, and from point 915 to a point 916 air mixed with fuel enters cylinder chamber 16 (FIG. 1) from intake port 36 (FIG. 1), through the open intake valve 20. This air-fuel mixture is further mixed with the air previously received into cylinder chamber 16 from air-reservoir 56. This takes place during a third part of the first volume increasing stroke. The intake of the air-fuel mixture ends when intake valve 20 closes at point 916.

From point 916 to a point 918 the cylinder charge is compressed and ignited, and from point 918 to a point 920 heat generated by combustion increases its pressure at nearly constant volume. This takes place during a first volume decreasing stroke.

From point 920 to a point 922 combustion is completed, and the expanding combustion-gas displaces piston 14 until it reaches its bottom-dead-center at point 922. This takes place during a second volume increasing stroke.

Exhaust valve 22 (FIG. 1) opens at or shortly before the bottom-dead-center, and the pressure in the cylinder drops to a nearly-atmospheric pressure, as shown at a point 924 (it coincides with point 916 in the diagrain). From point 924 to a point 926 combustion-gas is expelled from cylinder chamber 16 through the open exhaust valve 22. This takes place during a first part of a second volume decreasing stroke.

At point 926 exhaust valve 22 closes, and from point 926 to point 910 all valves are closed, and residual-gas compression takes place. This takes place during a second part of the second volume decreasing stroke. Then the same cycle is repeated again.

Control system 70 (FIG. 2) controls this propulsion mode in the same way as the previously described first propulsion mode using direct fuel injection. The factors affecting the magnitude of the propulsion force are the same as in the case of the first propulsion mode. The propulsion force increases or decreases with an increase or a decrease, respectively, in the net positive work-per-cycle, and with an increase or a decrease, respectively, in the transmission ratio. As in the first propulsion mode, the work-per-cycle can be varied by varying three parameters: timings of charging valve 24 opening and closing, and the quantity of fuel added to the air-charge. Control system 70 (FIG. 2) controls the propulsion force by varying any, some, or all of the above parameters, and by varying the transmission ratio according to a program contained in the control system software. In vehicles with manual transmission control, it is the vehicle driver who varies the transmission ratio.

In all the above described propulsion modes the frequency of cycles repetition can be reduced by selectively omitting some of the cycles, as it was previously described for the case of compression braking. To omit a cycle in a cylinder, all its valves and the fuel injector are deactivated. Then they are reactivated again for the next active cycle. Often this can be accomplished without changing the engine firing order. For example, in a three-cylinder engine every other cycle can be omitted without a change in the firing order. In a four-cylinder engine the firing order can remain unchanged if two out of every three cycles are omitted. Omission of some of the cycles can be beneficial during light-load engine operation, since, at a given engine load, it increases the work performed during each active cycle. At higher level of work-per-cycle mechanical efficiency of the engine is higher, and this reduces the fuel consumption.

Engine Deactivation—To improve fuel economy, the engine is deactivated whenever its operation would serve no useful purpose. Typical, in this respect, is vehicle coasting. Vehicle coasting takes place whenever neither accelerator pedal 96 (FIG. 2), nor brake pedal 86 (FIG. 2) are depressed while the vehicle is in motion. For best fuel economy, a preferred control strategy during coasting involves deactivation of all fuel injectors and all valves, preferably keeping the valves closed. This eliminates unproductive fuel consumption and air pumping. The vehicle is coasting down-the-road with its speed being slowly reduced by internal friction.

For best fuel economy, the engine is also deactivated whenever the vehicle stops. A typical pattern of driving an automotive vehicle often involves numerous short stops. This is especially typical for driving in urban environment. In most vehicles, internal combustion of the engine continues during short vehicle stops. In contrast to this, the system described in this invention stops the engine by deactivating all fuel injectors and all valves whenever the vehicle comes to a complete stop and the driver does not press on accelerator pedal 96 (FIG. 2). When crankshaft 66 (FIG. 2) stops, information on piston 14 (FIG. 1) position and direction of its motion is transmitted to control system 70 (FIG. 2) and retained in its memory. Later this information is used to restart the engine. When the driver presses on accelerator pedal 96 again, control system 70 restarts the engine by operating it as an air-motor in the previously described fourth propulsion mode. During this period, which can be as short as a fraction of a second, the engine crankshaft is disconnected from the vehicle wheels. This can be done either automatically by the control system, or manually by the driver. When the engine is brought to a speed at which efficient combustion can take place, control system 70 switches the engine to internal combustion operation, and the connection between the crankshaft and the wheels is restored.

Elimination of unproductive fuel consumption during vehicle stops and during coasting is an important advantage over most other vehicle operating systems using conventional internal combustion engines, since it contributes to a substantial improvement in average vehicle fuel consumption.

Other Methods of Charging the Air-Reservoir—In addition to compression braking, charging the air-reservoir with compressed-air can also be performed by using other methods during other modes of operation. This increases availability of compressed-air for operation in the above described first, third, and fourth propulsion modes. Availability of compressed-air-assist, whenever needed, is a significant advantage, since it permits to achieve the required peak power and torque with a smaller engine size. Smaller engines are more economical in terms of fuel consumption. Control system 70 (FIG. 2) monitors the pressure in air-reservoir 56 (FIG. 1) and, whenever this pressure drops below a first predetermined level, initiates charging of the air-reservoir with compressed-air by using at least one of the below described methods. Charging is discontinued when the pressure in the air-reservoir 56 exceeds a second predetermined level, which is higher than the first predetermined level. The values of the first and the second predetermined levels of pressure are contained in the control system memory.

Air-reservoir 56 can be charged with compressed-air during vehicle coasting. To accomplish this, the engine must remain coupled to the vehicle wheels and, in contrast to the above described case of engine deactivation, operates as a two-stroke compressor receiving air from outside atmosphere into each engine cylinder during each volume increasing stroke, and compressing it and substantially displacing it into the air-reservoir during each volume decreasing stroke. This process is the same as in the case of compression braking, except that the vehicle driver does not press on the brake pedal. Control system 70 controls the negative work-per-cycle to insure that a predetermined rate of vehicle deceleration, preferably smaller than any produced when the driver presses on the brake pedal, is maintained. The vehicle slowly decelerates, and its kinetic energy is transformed into energy of compressed-air stored in the air-reservoir.

Figure 15:
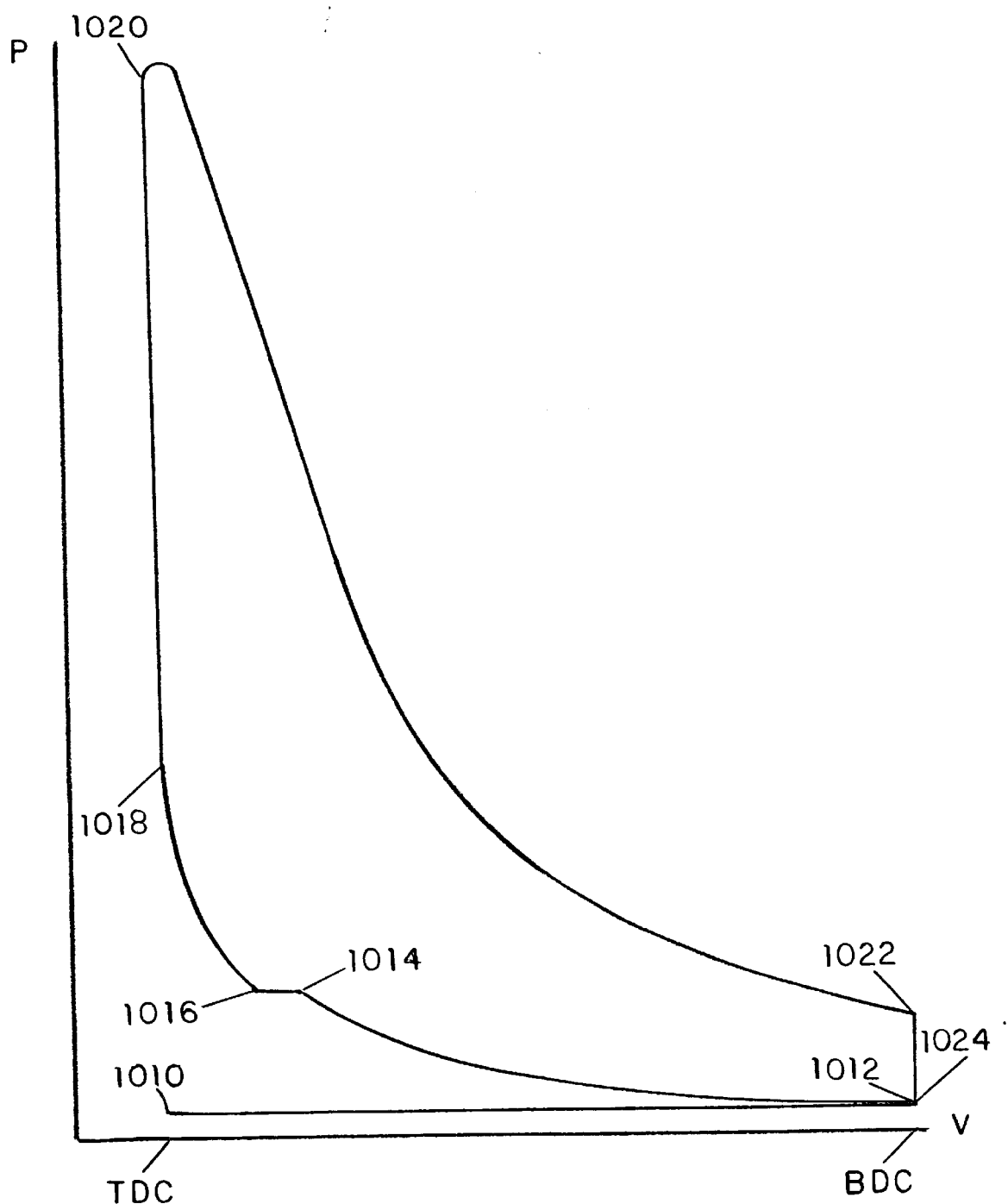
FIG. 15 is a pressure-volume diagram of the vehicle engine cycle illustrating its operation as a conventional four-stroke internal combustion engine propelling the vehicle and recharging the compressed-air reservoir at the same time, in accordance with the present invention.

Charging the air-reservoir can also be performed while the vehicle is propelled by the engine in response to a demand for a propulsion force. To accomplish this, the engine operates both as an internal combustion engine and as a compressor during each cycle in each engine cylinder. FIG. 15 is a pressure-volume diagram illustrating a hybrid four-stroke cycle during which the engine works as an internal combustion engine propelling the vehicle, and as a compressor charging the air-reservoir, Intake valve 20 (FIG. 1) opens at a point 1010 (FIG. 15), and from point 1010 to a point 1012 atmospheric air is received into cylinder chamber 16 (FIG. 1) through the open intake valve 20. This takes place during a first volume increasing stroke.

At point 1012 intake valve 20 closes, and from point 1012 to a point 1014 all valves are closed, and the air-charge is compressed, preferably to a pressure at least equal to pressure in air-reservoir 56 (FIG. 1). This takes place during a first part of a first volume decreasing stroke.

At point 1014 charging valve 24 (FIG. 1) opens, and from point 1014 to a point 1016 a fraction of the air-charge is displaced from cylinder chamber 16 (FIG. 1) through the open charging valve 24, charging port 48 (FIG. 1), charging passage 50 (FIG. 1), charging manifold 52 (FIG. 1), and duct 54 (FIG. 1) into air-reservoir 56 (FIG. 1). This is a second part of the first volume decreasing stroke.

At point 1016 charging valve 24 closes. From point 1016 to a point 1018 the cylinder charge is further compressed, fuel is injected, and the air-fuel mixture is ignited, and from point 1018 to a point 1020 heat generated by combustion increases the cylinder pressure at nearly constant volume. This takes place during a third part of the first volume decreasing stroke.

From point 1020 to a point 1022 combustion is completed, and the expanding combustion-gas displaces piston 14 (FIG. 1) until it reaches its bottom-dead-center at point 1022. This takes place during a second volume increasing stroke.

Exhaust valve 22 (FIG. 1) opens at or shortly before the bottom-dead-center, and the pressure in the cylinder drops to a nearly atmospheric pressure, as shown at a point 1024 (it coincides with point 1012 in the diagram). From point 1024 to point 1010 combustion-gas is substantially expelled from cylinder chamber 16 (FIG. 1) through the open exhaust valve 22. This period takes place during a second volume decreasing stroke. Exhaust valve 22 closes at or shortly after the top-dead-center, and then the same cycle is repeated again.

In the above described cycle the engine operates both as a prime mover propelling the vehicle and as a compressor pumping compressed-air into the air-reservoir. Part of the energy released in combustion is used to propel the vehicle, and another part of that energy is transformed into energy of compressed-air stored in the air-reservoir.

A process very similar to the one described above can be used to charge the air-reservoir when the vehicle is not in motion. To accomplish this, the engine is decoupled from the vehicle wheels and, in contrast to the previously described case of engine deactivation, operates as both an internal combustion engine and as a compressor, as described above and illustrated in FIG. 15. In this case, a substantial part of the energy released in combustion is transformed into energy of compressed-air stored in the air-reservoir.

Another method of air-reservoir charging involves operating some of the engine cylinders as an internal combustion engine and operating the rest of the cylinders as a compressor pumping compressed-air into the air-reservoir. For example, four cylinders of an eight-cylinder engine can operate as a four-stroke internal combustion engine, while the other four operate as a two-stroke compressor. Whenever a significant increase in torque is required, control system 70 (FIG. 2) switches the operation to internal combustion in all cylinders. When the vehicle is not in motion, the engine is decoupled from the vehicle wheels, and the cylinders operating as an internal combustion engine drive the cylinders operating as a compressor. When the vehicle is in motion, the engine is coupled to the vehicle wheels, and the cylinders operating as an internal combustion engine drive the cylinders operating as a compressor and propel the vehicle at the same time.

In any multi-cylinder internal combustion engine harshness of its operation decreases with an increase in the number of operating cylinders. This is due to a greater overlap of firing cycles and increased frequency of engine firings. The above described method of charging the air-reservoir involves a reduction in the number of cylinders operating as an internal combustion engine. This leads to increased harshness in engine operation. To alleviate this, a third propulsion mode can be used in the cylinders operating as an internal combustion engine. Operating these cylinders as a two-stroke internal combustion engine doubles the frequency of firings, relative to a four stroke operation, and eliminates the excessive harshness. For example, four cylinders of an eight-cylinder engine can operate as a two-stroke internal combustion engine in the third propulsion mode, while the other four operate as a two-stroke compressor. The frequency of firings remains the same as when all eight cylinders operate as a four-stroke internal combustion engine. A fraction of the compressed-air pumped by the cylinders operating as a compressor is used by the cylinders operating as a two-stroke internal combustion engine, and the balance goes into the air-reservoir. In some cases, the quantity of compressed-air produced can be adjusted to match the quantity consumed by the cylinders operating as a two-stroke internal combustion engine. In such a case, the balance of compressed-air going into the air-reservoir is zero. This permits prolonged operation of some cylinders in the third propulsion mode without changing the quantity of compressed-air in the air-reservoir.

Description of Operation of the Alternative Embodiment

Figure 16A:
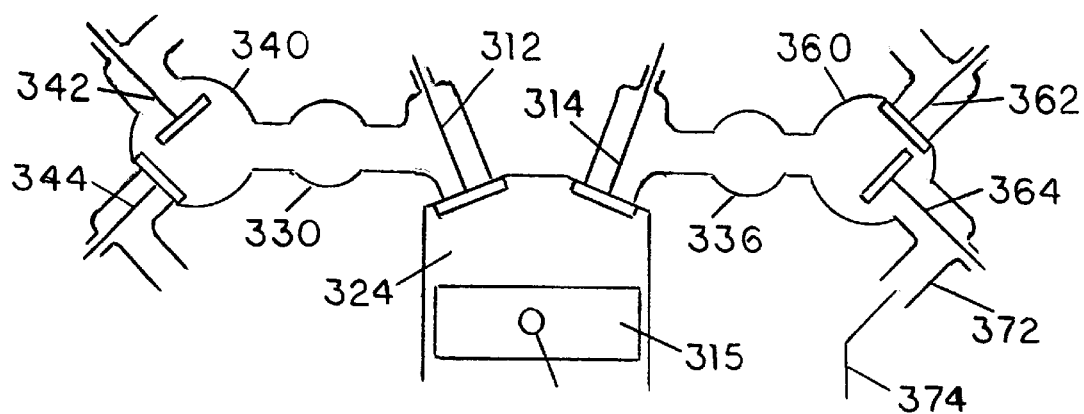
FIGS. 16A to 16C are schematic diagrams illustrating three different engine valves operating configurations serving various engine operating modes, in accordance with an alternative embodiment of the present invention.
Figure 16B:
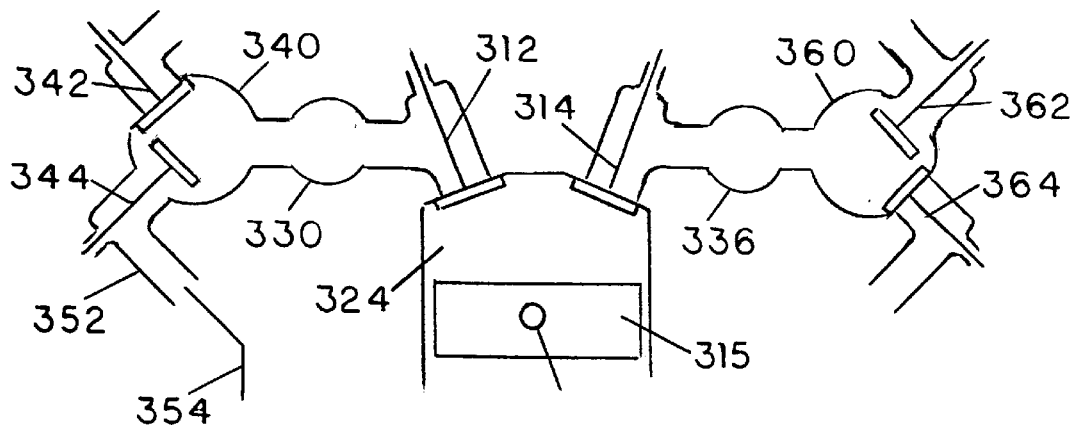
Figure 16C:
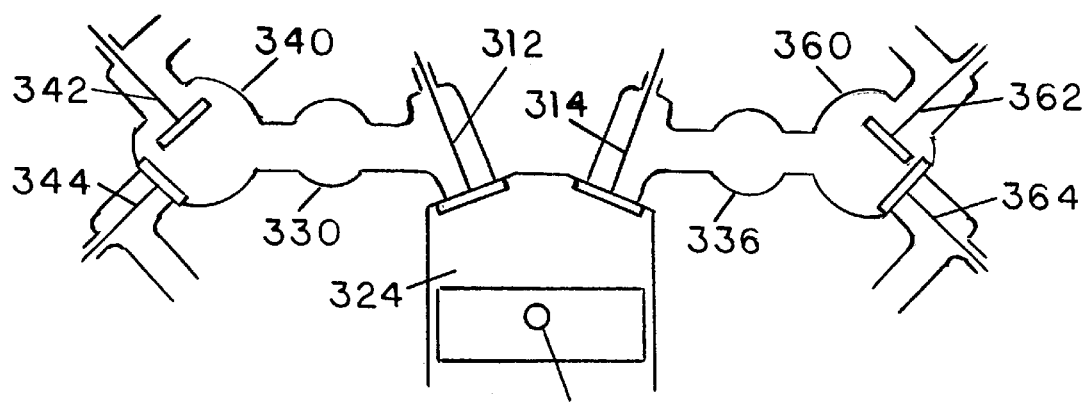

The alternative embodiment of the present invention, illustrated in FIG. 5, can operate in a variety of alternative modes of operation, including compression braking and first, second, third, and fourth propulsion modes. Its ability to operate in each mode depends on a specific configuration of switching valves opening and closing in the intake and exhaust switching arrangements. FIGS. 16A to 16C illustrate three different switching configurations.

FIG. 16A shows a first switching configuration, in which first intake switching valve 342 and second exhaust switching valve 364 remain continuously open, while second intake switching valve 344 and first exhaust switching valve 362 remain continuously closed. In this configuration, intake manifold 330 and intake switching chamber 340 are connected through the open first intake switching valve 342 to outside atmosphere, while exhaust manifold 336 and exhaust switching chamber 360 are connected through the open second exhaust switching valve 364, port 372, and duct 374 to air-reservoir 358 (FIG. 5).

FIG. 16B shows a second switching configuration, in which second intake switching valve 344 and first exhaust switching valve 362 remain continuously open, while first intake switching valve 342 and second exhaust switching valve 364 remain continuously closed. In this configuration, exhaust manifold 336 and exhaust switching chamber 360 are connected through the open first exhaust switching valve 362 to outside atmosphere, while intake manifold 330 and intake switching chamber 340 are connected through the open second intake switching valve 344, port 352, and duct 354 to air-reservoir 358 (FIG. 5).

FIG. 16C shows a third switching configuration, in which first intake switching valve 342 and first exhaust switching valve 362 remain continuously open, while second intake switching valve 344 and second exhaust switching valve 364 remain continuously closed. In this configuration, intake manifold 330 and intake switching chamber 340 are connected through the open first intake switching valve 342 to outside atmosphere, while exhaust manifold 336 and exhaust switching chamber 360 are connected to outside atmosphere through the open first exhaust switching valve 362.

Compression Braking—Compression braking requires the system to be in the first switching configuration, as illustrated in FIG. 16A. The engine operates as a two-stroke compressor, and its cycle is similar to that in the previously described preferred embodiment and can be illustrated by either FIG. 7A or 7B or 7C. A description given below refers to the pressure-volume diagram shown in FIG. 7B.

Intake valve 312 (FIG. 16A) opens at a variable point 510 and later closes at a variable point 512 after bottom-dead-center (in other cases point 512 may be timed before or at the bottom-dead-center). During this period, atmospheric air is received into cylinder chamber 324 (FIG. 16A) at constant pressure. This period takes place during a second part of the volume increasing stroke.

From point 512 to a variable point 514 all valves in the cylinder are closed, and the air-charge is compressed until its pressure becomes equal to pressure in air-reservoir 358 (FIG. 5). This takes place during a first part of the volume decreasing stroke.

At point 514 exhaust valve 314 (FIG. 16A) opens and remains open until its closure at a variable point 518. From point 514 to point 518, air is displaced from cylinder chamber 324 into air-reservoir 358 (FIG. 5) at nearly constant pressure. There is only a relatively small increase in pressure associated with compression of air in air-reservoir 358. This period takes place during a second part of the volume decreasing stroke.

From point 518 to point 510 all valves in the cylinder are closed, and the fraction of the initial air-charge, still left in cylinder chamber 324, expands, preferably until its pressure drops to atmospheric pressure at point 510. This period takes place during a first part of the volume increasing stroke.

First Propulsion Mode—Operation in the first propulsion mode requires the system to be in the second switching configuration, as illustrated in FIG. 16B. The engine operates as a four-stroke internal combustion engine with compressed-air assist. Its cycle is similar to that in the previously described preferred embodiment and can be illustrated by the pressure-volume diagram shown in FIG. 9.

As shown in FIG. 9, intake valve 312 (FIG. 16B) opens at a point 610, and the pressure in the cylinder increases to the level of pressure in air-reservoir 358 (FIG. 5), which corresponds to a point 612. A preferred timing of intake valve 312 opening is at the top-dead-center. From point 612 to a point 614 piston 315 (FIG. 16B) is displaced by a nearly constant air-pressure in cylinder chamber 324 (FIG. 16B). There is only a relatively small drop in pressure associated with expansion of air in air-reservoir 358 (FIG. 5). This period takes place during a first part of a first volume increasing stroke.

At point 614 intake valve 312 closes, and from point 614 to a point 616, which is at the bottom-dead-center, the air-charge in cylinder chamber 324 expands. This takes place during a second part of the first volume increasing stroke.

From point 616 to a point 618 the cylinder charge is compressed, and from point 618 to a point 620 heat generated by combustion increases its pressure at nearly constant volume. This period takes place during a first volume decreasing stroke.

From point 620 to a point 622 combustion is completed, and the expanding combustion-gas displaces piston 315 (FIG. 16B) until it reaches its bottom-dead-center at point 622. This takes place during a second volume increasing stroke.

Exhaust valve 314 (FIG. 16B) opens at or shortly before the bottom-dead-center, and the pressure in the cylinder drops to a nearly atmospheric pressure, as shown at a point 624 (it coincides with point 616 in the diagram). From point 624 to a point 626 combustion-gas is expelled from cylinder chamber 324 through the open exhaust valve 314. This takes place during a first part of a second volume decreasing stroke.

At point 626 exhaust valve 3 14 closes, and from point 626 to point 610 all valves in the cylinder are closed, and residual-gas compression takes place. This takes place during a second part of the second volume decreasing stroke.

Second Propulsion Mode—Operation in the second propulsion mode requires the system to be in the third switching configuration, as illustrated in FIG. 16C. The engine operates as a conventional four-stroke internal combustion engine receiving no air from air-reservoir 358.

Third Propulsion Mode—The second switching configuration (FIG. 16B) also permits operation in the third propulsion mode. The engine operates as a two-stroke internal combustion engine with compressed-air assist. Its cycle is similar to that in the previously described preferred embodiment and can be illustrated by the pressure-volume diagram shown in FIG. 11.

As shown in FIG. 11, intake valve 312 (FIG. 16B) opens at a point 710, and the pressure in the cylinder increases to the level of pressure in air-reservoir 358 (FIG. 5) during an upstroke of piston 315 (FIG. 16B), which corresponds to a point 712. From point 712 to a point 714 piston 315 moves against nearly constant pressure in cylinder chamber 324 (FIG. 16B). There is only a relatively small increase in pressure associated with compression of air in air-reservoir 358. This takes place during a second part of the volume decreasing stroke.

At point 714 intake valve 312 closes, from point 714 to a point 716 the cylinder charge is compressed, and from point 716 to a point 718 heat from combustion increases its pressure at nearly constant volume. This takes place during a third part of the volume decreasing stroke.

From point 718 to a point 720 combustion is completed, and the expanding combustion-gas displaces piston 315 (FIG. 16B) until it reaches its bottom-dead-center at point 720. This takes place during the volume increasing stroke.

Exhaust valve 314 (FIG. 16B) opens at or shortly before the bottom-dead-center, and the pressure in the cylinder drops to nearly atmospheric pressure, as shown at a point 722. After point 722, upward motion of piston 315 (FIG. 16B) expels combustion-gas from cylinder chamber 324 (FIG. 16B) through the open exhaust valve 314 until the exhaust valve closes. This takes place during a first part of the volume decreasing stroke. Timing of exhaust valve 314 closure determines the quantity of residual-gas retained in the cylinder. A preferred timing of exhaust valve 314 closing coincides with the timing of intake valve 312 (FIG. 16B) opening. From then on, the same cycle is repeated again during the next engine revolution.

Fourth Propulsion Mode—The second switching configuration (FIG. 16B) can also be used for operation in the fourth propulsion mode. The engine operates as a two-stroke air-motor. Its cycle is similar to that in the previously described preferred embodiment and can be illustrated by the pressure-volume diagram shown in FIG. 13.

As shown in FIG. 13, intake valve 312 (FIG. 16B) opens at a point 810, which is preferably at the top-dead-center, and the pressure in cylinder chamber 324 (FIG. 16B) rises to the level of pressure in air-reservoir 358 (FIG. 5), which is illustrated by a point 812. From point 812 to a point 814 cylinder chamber 324 is charged with compressed-air from air-reservoir 358. This takes place during a first part of the volume increasing stroke.

At point 814 intake valve 312 (FIG. 16B) closes, and from point 814 to a point 816 the air-charge expands, preferably to atmospheric pressure. This takes place during a second part of the volume increasing stroke.

At a point 816, which is, preferably, at the bottom-dead-center, exhaust valve 314 (FIG. 16B) opens, and from point 816 to point 810 air is expelled from cylinder chamber 324 (FIG. 16B). This takes place during the volume decreasing stroke. Closing of exhaust valve 314 approximately coincides with opening of intake valve 312, and then the same cycle is repeated again.

Operation in the fourth propulsion mode can also be performed when the system is in the first switching configuration. The process is, essentially, the same as in the above described case of operation in the second switching configuration, except that the roles of the intake and exhaust valves are interchanged. Compressed-air enters from air-reservoir 358 into cylinder chamber 324 through exhaust valve 314 and, after expansion, exits through intake valve 312. Exhausting the air through the intake system, rather than through the exhaust, avoids excessive cooling of the vehicle catalyst.

Other Modes—Whenever the vehicle stops, the engine can be deactivated by deactivating all valves and all fuel injectors in all engine cylinders. During vehicle coasting, the engine can be deactivated, or, alternatively, it can operate as a two-stroke compressor driven by the vehicle momentum and pumping compressed-air into the air-reservoir.

As in the case of the preferred embodiment, charging of the air-reservoir with compressed-air can also be performed by operating some of the engine cylinders as an internal combustion engine and operating the rest of the cylinders as a compressor pumping compressed-air into the air-reservoir. For example, four cylinders of an eight-cylinder engine can operate as a four-stroke internal combustion engine, while the other four operate as a two-stroke compressor. For this, the engine must have at least two intake manifolds and two exhaust manifolds, each with its own switching arrangement. The intake and exhaust manifolds serving the cylinders operating as an internal combustion engine have their respective switching valves arranged into the third switching configuration (FIG. 16C), while the intake and exhaust manifolds serving the cylinders operating as a compressor have their respective switching valves arranged into the first switching configuration (FIG. 16A). Whenever a significant increase in torque is required, control system 376 (FIG. 5) switches the operation to internal combustion in all cylinders. When the vehicle is not in motion, the engine is decoupled from the vehicle wheels, and the cylinders operating as an internal combustion engine drive the cylinders operating as a compressor. When the vehicle is in motion, the engine is coupled to the vehicle wheels, and the cylinders operating as an internal combustion engine drive the cylinders operating as a compressor and propel the vehicle at the same time.

As in the case of the preferred embodiment, the cylinders operating as an internal combustion engine can be operated using a two-stroke cycle in the third propulsion mode. In such a case, the intake and exhaust manifolds serving the cylinders operating as a two-stroke internal combustion engine have their respective switching valves arranged into the second switching configuration (FIG. 16B). A fraction of the compressed-air pumped by the cylinders operating as a compressor is used by the cylinders operating as a two-stroke internal combustion engine, and the balance goes into the air-reservoir.

Operational Strategy

A preferred operational strategy for the system of the present invention is intended to minimize fuel consumption, whenever possible, and maximize the engine torque and power, whenever needed. To achieve good fuel economy, energy derived from the vehicle motion is accumulated in the air-reservoir during vehicle deceleration and then used to assist in subsequent vehicle acceleration. Additional fuel saving can be realized by eliminating unproductive fuel consumption during vehicle stops and when the vehicle is coasting.

When the vehicle is cruising with a substantially constant speed, the engine, usually, operates as a conventional internal combustion engine in the second propulsion mode. During braking, the vehicle is decelerated by compression braking, and the engine operates as a two-stroke compressor driven by the vehicle momentum and pumping compressed-air into the air-reservoir. During subsequent vehicle acceleration, the engine operates either in the first, or in the third propulsion mode, thus utilizing the energy previously accumulated during vehicle deceleration. Operation in the third propulsion mode is, preferably, used only when the magnitude of the required engine torque exceeds a certain predetermined level, specified in the control system software. During vehicle stops and during coasting all engine valves and all fuel delivery means in all cylinders are deactivated. To restart the engine after a full stop, a third propulsion mode is used.

During braking the engine operates as a compressor, while during acceleration it operates as both an air-motor and an internal combustion engine. Therefore the energy accumulated in the air-reservoir during vehicle deceleration may not be fully used up during acceleration. This often permits the engine to operate in the first and third propulsion modes even during constant speed driving, at least part of the time.

To improve availability of compressed-air, the control system can be programmed to prevent a complete discharge of the air-reservoir. Whenever the pressure in the air-reservoir drops below a first predetermined level, the control system initiates operation in an auxiliary charging mode which includes selective charging of the air-reservoir by operating the engine partly as a compressor pumping compressed-air into the air-reservoir, and partly as an internal combustion engine driving the compressor. Several variants of this type of a hybrid engine operation were described above. Recharging the air-reservoir, during operation in the auxiliary charging mode, can also be performed by operating the engine as a compressor driven from the vehicle wheels by vehicle momentum when the vehicle is coasting. When, as a result of the recharging, the pressure in the air-reservoir exceeds a second predetermined level, higher than the first predetermined level, the above operation in the auxiliary charging mode is terminated. Deactivation of all engine valves and all fuel delivery means in all engine cylinders during vehicle stops and during coasting is still practiced, but only when the engine is not operating in the above auxiliary charging mode.

While certain embodiments of the present invention have been described in detail, those familiar with the art to which this invention relates will recognize various alternative designs and embodiments for practicing this invention as defined by the following claims.

I claim:

1. A method of operating a wheeled vehicle, said method comprising the steps of:
    (a) providing an engine mounted in said vehicle and coupled to at least one vehicle wheel for its propulsion and braking, said engine including:
        (1) at least one cylinder,
        (2) a cylinder chamber within said at least one cylinder,
        (3) a head mounted to said at least one cylinder, and
        (4) a piston operatively engaging said at least one cylinder, with the piston to head and cylinder relationship being such that the volume of said cylinder chamber shrinks during a volume decreasing stroke, when said piston moves towards said head, and expands during a volume increasing stroke, when said piston moves away from said head,
    (b) providing an air-reservoir means mounted in said vehicle for receiving, storage, and discharge of compressed air,
    (c) providing a control means for controlling the operation of said engine and said vehicle in response to driver's demands and in accordance with a control program incorporated in said control means,
    (d) providing a gas exchange controlling means for selectively, variably, and alternatively connecting said cylinder chamber to outside atmosphere and to said air-reservoir, in timed relation to said engine operation,
    (e) providing a fuel delivery means for selectively and variably adding fuel to the air intended for participation in combustion in said engine in timed relation to said engine operation,
    (f) providing a means for allowing a vehicle driver to perform vehicle control functions including:
        (1) selectively demanding a vehicle braking force,
        (2) selectively demanding a vehicle propulsion force,
        (3) selectively demanding a change in magnitude of said vehicle braking force, and
        (4) selectively demanding a change in magnitude of said vehicle propulsion force,
    (g) operating said engine in a compressor mode driven by a vehicle momentum in response to a demand for a vehicle braking force, when said vehicle is in motion and said engine is coupled to said at least one vehicle wheel, by repeatedly performing a two-stroke compressor cycle in said at least one cylinder during which a charge of atmospheric air is received from said outside atmosphere into said cylinder chamber, compressed therein, and substantially displaced into said air-reservoir means for storage therein, whereby energy of the vehicle motion is transformed into energy of compressed air stored in said air-reservoir means, and
    (h) operating said engine in a prime mover mode propelling said vehicle in response to a demand for a vehicle propulsion force when there is no concurrent demand for said vehicle braking force, said prime mover mode including:
        (I) operating said engine in a mode selected from a variety of propulsion modes comprising:
            (1) a first propulsion mode including repeated performance of a hybrid four-stroke cycle in said at least one cylinder, said hybrid four-stroke cycle comprising two power strokes:
                a first power stroke including expansion of a compressed-air charge, received from said air-reservoir means, in said cylinder chamber during a first volume increasing stroke, and
                a second power stroke including expansion of combustion gas produced as a result of fuel combustion in said cylinder chamber during a second volume increasing stroke,
                whereby work performed during said first power stroke is added to work performed during said second power stroke, and
            (2) a second propulsion mode including operating said engine in a conventional internal combustion mode receiving air from said outside atmosphere, and
        (II) changing said engine operation from one propulsion mode to another one selected from said variety of propulsion modes.

2. The method of claim 1 wherein said variety of propulsion modes further includes:
    (a) a third propulsion mode including repeated performance of a hybrid two-stroke internal combustion cycle in said at least one cylinder during which a compressed air charge is received into said cylinder chamber from said air-reservoir means and used for combustion during the same cycle, whereby energy of said compressed air charge supplements the energy released in combustion, and
    (b) a fourth propulsion mode including repeated performance of a two-stroke air-motor cycle in said at least one cylinder during which a compressed air charge received from said air-reservoir means expands in said cylinder chamber during said volume increasing stroke, whereby said vehicle is propelled without any fuel being consumed.

3. The method of claim 1 further comprising the steps of deactivating said fuel delivery means and deactivating said gas exchange controlling means in response to an absence of said demand for a vehicle braking force and a concurrent absence of said demand for a vehicle propulsion force, whereby no fuel is consumed when said vehicle is not in motion and when said vehicle is coasting.

4. The method of claim 1 further comprising the steps of providing at least one friction brake, and activating said at least one friction brake in response to said demand for a vehicle braking force when said vehicle is not in motion.

5. The method of claim 1 further comprising the steps of providing at least one friction brake, and activating said at least one friction brake when operating said engine in said compressor mode, whereby the braking force produced by said at least one friction brake supplements the braking force produced by said engine.

6. The method of claim 1 further comprising the steps of providing a transmission means for selectively coupling said engine to said at least one vehicle wheel with a variable transmission ratio, and responding to said demand for a change in magnitude of said vehicle braking force by selectively changing said transmission ratio.

7. The method of claim 1 further comprising the steps of providing a transmission means for selectively coupling said engine to said at least one vehicle wheel with a variable transmission ratio, and responding to said demand for a change in magnitude of said vehicle propulsion force by selectively changing said transmission ratio.

8. The method of claim 1 further comprising the steps of:
    (a) initiating selective charging of said air-reservoir means with compressed air whenever the pressure in said air-reservoir means drops below a first predetermined level, said selective charging including the step of operating said engine in a compressor mode driven by vehicle momentum from said at least one vehicle wheel, when said vehicle is coasting, by repeatedly performing a two-stroke compressor cycle in said at least one cylinder during which a charge of atmospheric air is received from outside atmosphere into said cylinder chamber, compressed therein, and substantially displaced into said air-reservoir means for storage therein, the combination of the mass of said charge of atmospheric air and the degree of its compression being such that a predetermined amount of net negative work is performed during each cycle, whereby kinetic energy of the coasting vehicle is transformed into energy of compressed air stored in said air-reservoir means, and whereby a predetermined rate of vehicle deceleration is maintained, and (b) terminating said selective charging of said air-reservoir when the pressure in said air-reservoir means exceeds a second predetermined level, higher than said first predetermined level.

9. The method of claim 1 wherein said variety of propulsion modes further comprises a hybrid propulsion mode including operation of some of the engine cylinders in a two-stroke internal combustion mode, in which a compressed-air charge is received into said some of the engine cylinders and used for combustion during the same cycle, and operation of the rest of the engine cylinders in a compressor mode pumping compressed air in quantity equal to the quantity of compressed air consumed by the cylinders operating in said two-stroke internal combustion mode, whereby the engine cylinders operating in said two-stroke internal combustion mode propel said vehicle and drive the engine cylinders operating in said compressor mode, and whereby duration of such operation is not limited by the supply of air from said air-reservoir means.

10. The method of claim 1 wherein the step of providing said gas exchange controlling means comprises the steps of:

(a) providing at least one engine valve reciprocable between its closed and open positions in a guide provided in said head, (b) providing a first hydraulic chamber, (c) providing a valve piston coupled to said at least one engine valve and reciprocable within said first hydraulic chamber, said valve piston dividing said first hydraulic chamber into a first upper volume and a first lower volume, with the valve piston pressure area in said first upper volume being larger than its pressure area in said first lower volume, (d) providing a second hydraulic chamber, (e) providing a partition between said first hydraulic chamber and said second hydraulic chamber, (f) providing an amplifier piston reciprocable within said second hydraulic chamber, said amplifier piston dividing said second hydraulic chamber into a second upper volume and a second lower volume, with the amplifier piston pressure area in said second upper volume being larger than its pressure area in said second lower volume, (g) providing a rod coupled to or integral with said amplifier piston and protruding from said second lower volume through an opening in said partition into said first upper volume, where it remains in physical contact with said valve piston when said at least one engine valve is in its closed position and during an initial part of its opening stroke, said initial part of the engine valve opening stroke being of such length that a substantial reduction in the pressure in said cylinder chamber can be achieved when opening said at least one engine valve against an in-cylinder pressure, (h) providing a high-pressure fluid source and a low-pressure fluid source, (i) providing high-pressure passages and a normally-closed high-pressure valve for selectively connecting said high-pressure fluid source to said first upper volume and said second upper volume, (j) providing low-pressure passages and a normally-closed low-pressure valve for selectively connecting said low-pressure fluid source to said first upper volume and said second upper volume, (k) providing high-pressure passages and a high-pressure check valve for connecting said high-pressure fluid source to said first upper volume and said second upper volume, the check valve installation being such that fluid can flow only into said high-pressure fluid source, (l) providing low-pressure passages and a low-pressure check valve for connecting said low-pressure fluid source to said first upper volume and said second upper volume, the check valve installation being such that fluid can flow only out of said low-pressure fluid source, (m) providing a high-pressure passage connecting said high-pressure fluid source to said first lower volume, (n) providing a low-pressure passage connecting said low-pressure fluid source to said second lower volume, and (o) using said control means to control said high-pressure and low-pressure valves for repeated and variable opening and closing of said at least one engine valve in timed relation to said engine operation, said opening and closing of the engine valve comprising the steps of:

(1) variably opening said high-pressure valve and connecting said high-pressure fluid source to said first upper volume and said second upper volume, whereby the engine valve is accelerated in the direction of its opening by a combined acceleration force generated by hydraulic pressures acting on both said valve piston and said amplifier piston during said initial part of said engine valve opening stroke, (2) continuing acceleration of the engine valve in the direction of its opening by an acceleration force generated by hydraulic pressures acting on said valve piston, (3) variably closing said high-pressure valve and flowing fluid from said low-pressure fluid source through said low-pressure check valve into said first upper volume, whereby the engine valve is decelerated by a deceleration force generated by hydraulic pressures acting on said valve piston until the engine valve exhausts its momentum and stops in its open position, (4) preventing escape of fluid from said first upper volume, whereby the engine valve is maintained in its open position, (5) variably opening said low-pressure valve and connecting said low-pressure fluid source to said first upper volume and said second upper volume, whereby the engine valve is accelerated in the direction of its closing by an acceleration force generated by hydraulic pressures acting on said valve piston, (6) variably closing said low-pressure valve and flowing fluid from said first upper volume through said high-pressure check valve into said high-pressure fluid source, whereby the engine valve is decelerated by a deceleration force generated by hydraulic pressures acting on said valve piston until the engine valve exhausts its momentum and stops in its closed position, (7) using said control means to selectively vary the timings of openings of said high-pressure and low-pressure valves, whereby the timings of the engine valve opening and closing, respectively, are varied, and (8) using said control means to selectively vary the timings of closings of said high-pressure and low-pressure valves, whereby the stroke of the engine valve is varied, whereby contribution of said amplifier piston to the initial acceleration force reduces the hydraulic pressure required to open said at least one engine valve against in-cylinder pressure, whereby energy consumption needed for said at least one engine valve operation is reduced, and whereby said at least one engine valve is operated with variable timings of opening and closing and with a variable stroke.

11. The method of claim 10 further comprising the steps of:

(a) providing a latching means for retaining said at least one engine valve in its closed position, (b) using said latching means to automatically latch said at least one engine valve in its closed position after it completes its closing stroke, (c) using said latching means to retain said at least one engine valve in its closed position during a time period between the end of its closing stroke and the beginning of its opening stroke, and (d) using said latching means to automatically unlatch said at least one engine valve before it begins said opening stroke, whereby no hydraulic force is needed to retain said at least one engine valve in its closed position.

12. The method of claim 11 further including the step of providing a hydraulic means for unlatching said at least one engine valve, said hydraulic means using pressure from said high-pressure fluid source.

13. The method of claim 1 further comprising the steps of:

(a) providing a heating jacket surrounding said air-reservoir means, and (b) flowing exhaust gas through said heating jacket during operation of said engine, whereby escape of heat from the air in said air-reservoir is prevented.

14. The method of claim 13 further comprising the steps of:

(a) providing a gas flow control valve for controlling flow of exhaust gas through said heating jacket, (b) providing a temperature sensor for measuring temperature of air inside said air-reservoir means, (c) providing said control means with information from said temperature sensor and with ability to cooperate with said gas flow control valve to control said flow of exhaust gas through said heating jacket, and (d) using said control means to control said flow of exhaust gas in a manner which assures that said temperature of air inside said air-reservoir means is maintained within a predetermined range.

15. The method of claim 1 further comprising the steps of:

(a) providing an electric battery and a battery charge sensor for measuring the charge of said electric battery, (b) providing an air-motor means coupled to an electric generator, said electric generator being electrically connected to said electric battery and supplying it with electric power when driven by said air-motor means, (c) providing a control valve and an air-duct for selectively and variably connecting said air-reservoir means to said air-motor means, (d) providing a speed sensor for measuring the speed of said electric generator, and (e) providing said control means with information from said electric battery charge and speed sensors, and using said control means to control operation of said control valve for periodic recharging of said electric battery, said recharging comprising the steps of:

(1) using said control valve to start operation of said air-motor means by initiating flow of air from said compressed air reservoir means to said air-motor means whenever the battery charge drops below a first predetermined level, (2) using said control valve to continue said flow of air from said compressed air reservoir means to said air-motor means until the battery charge increases to a second predetermined level, (3) using said control valve to vary said flow of air in a manner which assures that the speed of said electric generator is maintained within predetermined limits, and (4) using said control valve to stop operation of said air-motor means by terminating said flow of air from said compressed air reservoir means to said air-motor means when the battery charge exceeds said second predetermined level, whereby operation of said electric generator takes place only when charging of the battery is needed, and whereby waste of energy for needless electric generator operation is eliminated.

16. The method of claim 1 further including the step of operating said engine with a reduced frequency of cycle repetition relative to the frequency of said engine revolutions by repeating each two-stroke cycle less frequently than once every engine revolution, and repeating each four-stroke cycle less frequently than once every two engine revolutions, while during the in-between-cycles revolutions said gas exchange means and said fuel delivery means are deactivated, whereby work performed during each cycle increases, and whereby efficiency of said engine is improved.

17. The method of claim 2 wherein the step of providing said gas exchange controlling means comprises the steps of:

(a) providing at least one normally-closed intake valve for selectively and variably connecting said cylinder chamber to said outside atmosphere, (b) providing at least one normally-closed exhaust valve for selectively and variably connecting said cylinder chamber to said outside atmosphere, and (c) providing at least one normally-closed charging valve for selectively and variably connecting said cylinder chamber to said air-reservoir means.

18. The method of claim 17 wherein the operation of said engine in said compressor mode comprises, during each two-stroke cycle, the steps of:

(a) deactivating said fuel delivery means, (b) deactivating said at least one exhaust valve, (c) expanding the residual compressed air during a first part of said volume increasing stroke, (d) variably opening said at least one intake valve, (e) receiving air from said outside atmosphere into said cylinder chamber during a second part of said volume increasing stroke, (f) variably closing said at least one intake valve, (g) compressing said air in said cylinder chamber during a first part of said volume decreasing stroke, (h) variably opening said at least one charging valve, (i) substantially displacing the compressed air from said cylinder chamber into said air-reservoir means during a second part of said volume decreasing stroke, and (j) variably closing said at least one charging valve.

19. The method of claim 17 wherein the operation of said engine in said first propulsion mode comprises, during each four-stroke cycle, the steps of:

(a) deactivating said at least one intake valve, (b) variably opening said at least one charging valve, (c) receiving compressed air into said cylinder chamber from said air-reservoir means during a first part of a first volume increasing stroke, (d) variably closing said at least one charging valve, (e) expanding said compressed air in said cylinder chamber during a second part of said first volume increasing stroke, (f) compressing the air in said cylinder chamber during a first volume decreasing stroke, (g) adding fuel to said air in said cylinder chamber, (h) initiating combustion of said fuel in said cylinder chamber, whereby said fuel and said air are converted into a combustion gas, (i) expanding said combustion gas in said cylinder chamber during a second volume increasing stroke, (j) variably opening said at least one exhaust valve, (k) substantially expelling said combustion gas from said cylinder chamber during a first part of a second volume decreasing stroke, (l) variably closing said at least one exhaust valve, and (m) trapping the residual combustion gas remaining in said cylinder chamber during a second part of said second volume decreasing stroke, whereby work performed by said combustion gas during said second volume increasing stroke is supplemented by work performed by said compressed air during said first volume increasing stroke, and whereby trapping said residual combustion gas in said cylinder chamber during said second part of said second volume decreasing stroke contributes to reduction in harmful nitrogen oxide emission.

20. The method of claim 17 wherein the operation of said engine in said third propulsion mode comprises, during each two-stroke cycle, the steps of:

(a) deactivating said at least one intake valve, (b) variably opening said at least one charging valve, (c) receiving compressed air into said cylinder chamber from said air-reservoir means during a second part of said volume decreasing stroke, (d) variably closing said at least one charging valve, (e) compressing the air and the residual combustion gas in said cylinder chamber during a third part of said volume decreasing stroke, (f) adding fuel to the mixture of said air and said residual combustion gas in said cylinder chamber, (g) initiating combustion of said fuel in said cylinder chamber, whereby said fuel and said air are converted into a combustion gas, (h) expanding said combustion gas in said cylinder chamber during said volume increasing stroke, (i) variably opening said at least one exhaust valve, (j) substantially expelling said combustion gas from said cylinder chamber during a first part of said volume decreasing stroke, and (k) variably closing said at least one exhaust valve, whereby receiving of said compressed air into said cylinder chamber from said air-reservoir means reduces the amount of compression work required, and whereby the peak torque and the power of said engine increase.

21. The method of claim 17 wherein the operation of said engine in said fourth propulsion mode comprises, during each two-stroke cycle, the steps of:

(a) deactivating said fuel delivery means, (b) deactivating said at least one exhaust valve, (c) variably opening said at least one charging valve, (d) receiving compressed air into said cylinder chamber from said air-reservoir means during a first part of said volume increasing stroke, (e) variably closing said at least one charging valve, (f) expanding said compressed air in said cylinder chamber during a second part of said volume increasing stroke, (g) variably opening said at least one intake valve, (h) substantially expelling the air from said cylinder chamber during said volume decreasing stroke, and (i) variably closing said at least one intake valve.

22. The method of claim 17 wherein the operation of said engine in said fourth propulsion mode comprises, during each two-stroke cycle, the steps of:

(a) deactivating said fuel delivery means, (b) deactivating said at least one intake valve, (c) variably opening said at least one charging valve, (d) receiving compressed air into said cylinder chamber from said air-reservoir means during a first part of said volume increasing stroke, (e) variably closing said at least one charging valve, (f) expanding said compressed air in said cylinder chamber during a second part of said volume increasing stroke, (g) variably opening said at least one exhaust valve, (h) substantially expelling the air from said cylinder chamber during said volume decreasing stroke, and (i) variably closing said at least one exhaust valve.

23. The method of claim 17 wherein the operation of said engine in said second propulsion mode includes the step of deactivating said charging valve.

24. The method of claim 17 wherein the operation of said engine in said first propulsion mode comprises, during each four-stroke cycle, the steps of:

(a) variably opening said at least one charging valve, (b) receiving compressed air into said cylinder chamber from said air-reservoir means during a first part of a first volume increasing stroke, (c) variably closing said at least one charging valve, (d) expanding said compressed air in said cylinder chamber during a second part of said first volume increasing stroke, (e) adding fuel to atmospheric air before it enters said cylinder chamber, (f) variably opening said at least one intake valve, (g) receiving an air/fuel mixture through the open intake valve into said cylinder chamber during a third part of said first volume increasing stroke, and mixing it there with air previously received through said charging valve, (h) variably closing said at least one intake valve, (i) compressing the air/fuel mixture in said cylinder chamber during a first volume decreasing stroke, (j) initiating combustion of said fuel in said cylinder chamber, whereby said fuel and said air are converted into a combustion gas, (k) expanding said combustion gas in said cylinder chamber during a second volume increasing stroke, (l) variably opening said at least one exhaust valve, (m) substantially expelling said combustion gas from said cylinder chamber during a second volume decreasing stroke, and (n) variably closing said at least one exhaust valve, whereby said engine operates with port fuel injection.

25. The method of claim 17 further comprising the step of responding to said demand for a change in magnitude of said vehicle braking force by making changes in at least one parameter selected from a set of parameters controlling the operation of said gas exchange controlling means, said set of parameters including:

(a) timing of opening of said at least one intake valve, (b) timing of closing of said at least one intake valve, (c) timing of opening of said at least one charging valve, and (d) timing of closing of said at least one charging valve, whereby the net negative work-per-cycle performed in said at least one engine cylinder is changed.

26. The method of claim 17 further comprising the step of responding to said demand for a change in magnitude of said vehicle propulsion force by selectively making changes in at least one parameter selected from a set of parameters controlling operation of said gas exchange controlling means, said set of parameters including:

(a) timing of opening of said at least one intake valve, (b) timing of closing of said at least one intake valve, (c) timing of opening of said at least one charging valve, (d) timing of closing of said at least one charging valve, (e) timing of opening of said at least one exhaust valve, and (f) timing of closing of said at least one exhaust valve, and changing the quantity of fuel added to the air intended for participation in combustion, when operating in any mode involving fuel combustion, whereby the net positive work-per-cycle performed in said at least one engine cylinder is changed.

27. The method of claim 2 further comprising the steps of:

(a) initiating selective charging of said air-reservoir means with compressed air whenever the pressure in said air-reservoir means drops below a first predetermined level, said selective charging including the step of operating said engine partly in a compressor mode and partly in an internal combustion mode driving said compressor mode, said compressor mode pumping compressed air into said air-reservoir means, and (b) terminating said selective charging of said air-reservoir means when the pressure in said air-reservoir means exceeds a second predetermined level, higher than said first predetermined level.

28. The method of claim 27 wherein the operation of said engine partly in said compressor mode and partly in said internal combustion mode, when said vehicle is in motion, includes operating some of the engine cylinders in said internal combustion mode, and operating the rest of the engine cylinders in said compressor mode pumping compressed air into said air-reservoir means, whereby the engine cylinders operating in said internal combustion mode propel said vehicle and drive the engine cylinders operating in said compressor mode.

29. The method of claim 27 wherein the operation of said engine partly in said compressor mode and partly in said internal combustion mode, when said vehicle is in motion, includes the steps of operating some of the engine cylinders in a two-stroke internal combustion mode, in which a compressed-air charge is received into said some of the engine cylinders and used for combustion during the same cycle, and operating the rest of the engine cylinders in said compressor mode pumping compressed air into said air-reservoir means and into the cylinders operating in said two-stroke internal combustion mode, whereby the engine cylinders operating in said two-stroke internal combustion mode propel said vehicle and drive the engine cylinders operating in said compressor mode, and whereby a fraction of the compressed air pumped by the cylinders operating in said compressor mode is used by the cylinders operating in said two-stroke internal combustion mode, and the balance of said compressed air goes into said air-reservoir means.

30. The method of claim 27 wherein the operation of said engine partly in said compressor mode and partly in said internal combustion mode, when said vehicle is not in motion, includes the steps of uncoupling said engine from said at least one vehicle wheel, operating some of the engine cylinders in said internal combustion mode, and operating the rest of the engine cylinders in said compressor mode pumping compressed air into said air-reservoir means, whereby the engine cylinders operating in said internal combustion mode drive the engine cylinders operating in said compressor mode.

31. The method of claim 27 wherein the step of providing said gas exchange controlling means comprises the steps of:

(a) providing at least one intake valve for selectively and variably connecting said cylinder chamber to said outside atmosphere, (b) providing at least one exhaust valve for selectively and variably connecting said cylinder chamber to said outside atmosphere, and (c) providing at least one charging valve for selectively and variably connecting said cylinder chamber to said air-reservoir means.

32. The method of claim 31 wherein the operation of said engine partly in said compressor mode and partly in said internal combustion mode, when said vehicle is in motion, includes repeated performance of a hybrid four-stroke cycle in said at least one cylinder, said hybrid four-stroke cycle comprising the steps of:

(a) variably opening said at least one intake valve, (b) receiving air from said outside atmosphere into said cylinder chamber during a first volume increasing stroke, (c) variably closing said at least one intake valve, (d) compressing said air in said cylinder chamber during a first part of a first volume decreasing stroke, (e) variably opening said at least one charging valve, (f) displacing a fraction of the compressed air from said cylinder chamber into said air-reservoir means during a second part of said first volume decreasing stroke, (g) variably closing said at least one charging valve, (h) further compressing the air remaining in said cylinder chamber during a third part of said first volume decreasing stroke, (i) adding fuel to said air in said cylinder chamber, (j) initiating combustion of said fuel in said cylinder chamber, whereby said fuel and said air are converted into a combustion gas, (k) expanding said combustion gas in said cylinder chamber during a second volume increasing stroke, (l) variably opening said at least one exhaust valve, (m) substantially expelling said combustion gas from said cylinder chamber during a second volume decreasing stroke, and (n) variably closing said at least one exhaust valve, whereby said engine operates, during each cycle in each cylinder, partly in an internal combustion mode propelling said vehicle and partly in a compressor mode pumping compressed air into said air-reservoir means, and whereby part of the energy released in combustion is used to propel said vehicle, and another part of that energy is transformed into energy of compressed air stored in said air-reservoir means.

33. The method of claim 31 wherein the operation of said engine partly in said compressor mode and partly in said internal combustion mode, when said vehicle is not in motion, includes uncoupling said engine from said at least one vehicle wheel and repeated performance of a hybrid four stroke cycle, said hybrid four-stroke cycle comprising the steps of:

(a) variably opening said at least one intake valve, (b) receiving air from said outside atmosphere into said cylinder chamber during a first volume increasing stroke, (c) variably closing said at least one intake valve, (d) compressing said air in said cylinder chamber during a first part of a first volume decreasing stroke, (e) variably opening said at least one charging valve, (f) displacing a fraction of the compressed air from said cylinder chamber into said air-reservoir means during a second part of said first volume decreasing stroke, (g) variably closing said at least one charging valve, (h) further compressing the air remaining in said cylinder chamber during a third part of said first volume decreasing stroke, (i) adding fuel to said air in said cylinder chamber, (j) initiating combustion of said fuel in said cylinder chamber, whereby said fuel and said air are converted into a combustion gas, (k) expanding said combustion gas in said cylinder chamber during a second volume increasing stroke, (l) variably opening said at least one exhaust valve, (m) substantially expelling said combustion gas from said cylinder chamber during a second volume decreasing stroke, and (n) variably closing said at least one exhaust valve, whereby said engine operates, during each cycle in each cylinder, partly in a compressor mode pumping compressed-air into said air-reservoir means and partly in an internal combustion mode driving said compressor mode, and whereby substantial part of the energy released in combustion is transformed into energy of compressed air stored in said air-reservoir means.

34. The method of claim 2 wherein the step of providing said gas exchange controlling means comprises the steps of:

(a) providing an intake manifold means for accomodating gas flow into or out of said cylinder chamber, (b) providing at least one normally-closed intake valve for selectively and variably connecting said cylinder chamber to said intake manifold means, (c) providing an exhaust manifold means for accomodating gas flow out of or into said cylinder chamber, (d) providing at least one normally-closed exhaust valve for selectively and variably connecting said cylinder chamber to said exhaust manifold means, and (e) providing a switching means for setting the arrangement of said gas exchange controlling means into a configuration selected from a variety of configurations, and switching said arrangement from one configuration to another in accordance with said program incorporated in said control means, said variety of configurations including:

(1) a first switching configuration wherein said intake manifold means is connected to outside atmosphere and disconnected from said air-reservoir means, and said exhaust manifold means is connected to said air-reservoir means and disconnected from outside atmosphere, (2) a second switching configuration wherein said intake manifold means is connected to said air-reservoir means and disconnected from outside atmosphere, and said exhaust manifold means is connected to outside atmosphere and disconnected from said air-reservoir means, and (3) a third switching configuration wherein said intake manifold means and said exhaust manifold means are both connected to outside atmosphere and disconnected from said air-reservoir means.

35. The method of claim 34 wherein the operation of said engine in said compressor mode comprises the step of operating said gas exchange controlling means in said first switching configuration.

36. The method of claim 34 wherein the operation of said engine in said prime mover mode comprises:

(a) operating said gas exchange controlling means in said second switching configuration if said engine operates in said first propulsion mode, (b) operating said gas exchange controlling means in said third switching configuration if said engine operates in said second propulsion mode, (c) operating said gas exchange controlling means in said second switching configuration if said engine operates in said third propulsion mode, and (d) operating said gas exchange controlling means in said second switching configuration if said engine operates in said fourth propulsion mode.

37. The method of claim 34 wherein the operation of said engine in said prime mover mode comprises:

(a) operating said gas exchange controlling means in said second switching configuration if said engine operates in said first propulsion mode, (b) operating said gas exchange controlling means in said third switching configuration if said engine operates in said second propulsion mode, (c) operating said gas exchange controlling means in said second switching configuration if said engine operates in said third propulsion mode, and (d) operating said gas exchange controlling means in said first switching configuration if said engine operates in said fourth propulsion mode, whereby the functions of said intake valve and said exhaust valve are interchanged and said compressed air enters into said at least one cylinder through said exhaust valve and, after expansion, exits through said intake valve, and whereby excessive cooling of the vehicle catalyst is avoided.

38. The method of claim 34 wherein the step of providing said switching means comprises the steps of:
(a) providing a first intake switching valve for selectively connecting said intake manifold means to outside atmosphere,
(b) providing a second intake switching valve for selectively connecting said intake manifold means to said air-reservoir means,
(c) providing a first exhaust switching valve for selectively connecting said exhaust manifold means to outside atmosphere, and
(d) providing a second exhaust switching valve for selectively connecting said exhaust manifold means to said air-reservoir means.

39. The method of claim 35 wherein the operation of said engine in said compressor mode comprises, during each two-stroke cycle, the steps of:
(a) deactivating said fuel delivery means,
(b) expanding the residual compressed air remaining in said cylinder chamber during a first part of said volume increasing stroke,
(c) variably opening said at least one intake valve,
(d) receiving air from said outside atmosphere into said cylinder chamber during a second part of said volume increasing stroke,
(e) variably closing said at least one intake valve,
(f) compressing said air in said cylinder chamber during a first part of said volume decreasing stroke,
(g) variably opening said at least one exhaust valve,
(h) substantially displacing the compressed air from said cylinder chamber into said air-reservoir means during a second part of said volume decreasing stroke, and
(i) variably closing said at least one exhaust valve.

40. The method of claim 36 wherein the operation of said engine in said first propulsion mode comprises, during each four-stroke cycle, the steps of:
(a) variably opening said at least one intake valve,
(b) receiving compressed air into said cylinder chamber from said air-reservoir means during a first part of a first volume increasing stroke,
(c) variably closing said at least one intake valve,
(d) expanding said compressed air in said cylinder chamber during a second part of said first volume increasing stroke,
(e) compressing the air in said cylinder chamber during a first volume decreasing stroke,
(f) adding fuel to said air in said cylinder chamber,
(g) initiating combustion of said fuel in said cylinder chamber, whereby said fuel and said air are converted into a combustion gas,
(h) expanding said combustion gas in said cylinder chamber during a second volume increasing stroke,
(i) variably opening said at least one exhaust valve,
(j) substantially expelling said combustion gas from said cylinder chamber during a first part of a second volume decreasing stroke,
(k) variably closing said at least one exhaust valve, and
(l) trapping the residual combustion gas remaining in said cylinder chamber during a second part of said second volume decreasing stroke,
whereby work performed by said combustion gas during said second volume increasing stroke is supplemented by work performed by said compressed air during said first volume increasing stroke, and whereby trapping said residual combustion gas in said cylinder chamber during said second part of said second volume decreasing stroke contributes to reduction in harmful nitrogen oxide emission.

41. The method of claim 36 wherein the operation of said engine in said third propulsion mode comprises, during each two-stroke cycle, the steps of:
(a) variably opening said at least one intake valve,
(b) receiving compressed air into said cylinder chamber from said air-reservoir means during a second part of said volume decreasing stroke,
(c) variably closing said at least one intake valve,
(d) compressing the air and the residual combustion gas in said cylinder chamber during a third part of said volume decreasing stroke,
(e) adding fuel to the mixture of said air and said residual combustion gas in said cylinder chamber,
(f) initiating combustion of said fuel in said cylinder chamber, whereby said fuel and said air are converted into a combustion gas,
(g) expanding said combustion gas in said cylinder chamber during said volume increasing stroke,
(h) variably opening said at least one exhaust valve,
(i) substantially expelling said combustion gas from said cylinder chamber during a first part of said volume decreasing stroke, and
(j) variably closing said at least one exhaust valve,
whereby receiving of said compressed air into said cylinder chamber from said air-reservoir means reduces the amount of compression work required, and whereby the peak torque and the power of said engine increase.

42. The method of claim 36 wherein the operation of said engine in said fourth propulsion mode comprises, during each two-stroke cycle, the steps of:
(a) deactivating said fuel delivery means,
(b) variably opening said at least one intake valve,
(c) receiving compressed air into said cylinder chamber from said air-reservoir means during a first part of said volume increasing stroke,
(d) variably closing said at least one intake valve,
(e) expanding said compressed air in said cylinder chamber during a second part of said volume increasing stroke,
(f) variably opening said at least one exhaust valve,
(g) substantially expelling the air from said cylinder chamber during said volume decreasing stroke, and
(h) variably closing said at least one exhaust valve.

43. The method of claim 37 wherein the operation of said engine in said fourth propulsion mode comprises, during each two-stroke cycle, the steps of:
(a) deactivating said fuel delivery means,
(b) variably opening said at least one exhaust valve,
(c) receiving compressed air into said cylinder chamber from said air-reservoir means during a first part of said volume increasing stroke,
(d) variably closing said at least one exhaust valve,
(e) expanding said compressed air in said cylinder chamber during a second part of said volume increasing stroke, (f) variably opening said at least one intake valve, (g) substantially expelling the air from said cylinder chamber during said volume decreasing stroke, and (h) variably closing said at least one intake valve, whereby the functions of said intake valve and said exhaust valve are interchanged and said compressed air enters into said at least one cylinder through said exhaust valve and, after expansion, exits through said intake valve, and whereby excessive cooling of the vehicle catalyst is avoided.

44. The method of claim 2 further comprising the step of using an operational strategy including:

(a) operating said engine in said second propulsion mode when said vehicle is being propelled with a substantially constant speed, (b) operating said engine in said compressor mode driven by the vehicle momentum and charging said air-reservoir means with compressed air when said vehicle is being decelerated in response to said demand for said vehicle braking force, (c) operating said engine in said first propulsion mode when said vehicle is being accelerated and the magnitude of the required engine torque does not exceed a predetermined level, (d) operating said engine in said third propulsion mode when said vehicle is being accelerated and the magnitude of the required engine torque exceeds said predetermined level, (e) deactivating said gas exchange controlling means and said fuel delivery means when said vehicle is coasting driven by its inertia, (f) deactivating said gas exchange controlling means and said fuel delivery means when said vehicle stops, and (g) restarting said engine, after a full stop, by operating it in said fourth propulsion mode.

45. The method of claim 44 further comprising the step of operating said engine in said first propulsion mode when said vehicle is being propelled with a substantially constant speed, following a period of vehicle deceleration and subsequent acceleration during which the energy accumulated in said air-reservoir means during said deceleration was not fully used up during said acceleration.

46. The method of claim 2 further comprising the step of using an operational strategy including:

(a) operating said engine in said second propulsion mode when said vehicle is being propelled with a substantially constant speed, (b) operating said engine in said compressor mode driven by the vehicle momentum and charging said air-reservoir means with compressed air when said vehicle is being decelerated in response to a demand for said vehicle braking force, (c) operating said engine in said first propulsion mode when said vehicle is being accelerated and the magnitude of the required engine torque does not exceed a predetermined level, (d) operating said engine in said third propulsion mode when said vehicle is being accelerated and the magnitude of the required engine torque exceeds said predetermined level, (e) initiating an auxiliary charging mode of engine operation when the pressure in said air-reservoir means drops below a first predetermined level, the operation in said auxiliary charging mode including the steps of:

(1) operating said engine in a compressor mode driven by vehicle momentum from said at least one vehicle wheel and pumping compressed air into said air-reservoir means when said vehicle is coasting, (2) operating said engine partly in said compressor mode pumping compressed air into said air-reservoir means, and partly in an internal combustion mode driving said compressor mode during vehicle stops, and (3) operating said engine partly in said compressor mode pumping compressed air into said air-reservoir means, and partly in said internal combustion mode driving said compressor mode and propelling said vehicle, when there is a demand for a propulsion force, (f) continuing operation in said auxiliary charging mode until the pressure in said air-reservoir means rises to a second predetermined level, higher than said first predetermined level, (g) terminating operation in said auxiliary charging mode when the pressure in said air-reservoir means exceeds said second predetermined level, (h) deactivating said gas exchange controlling means and said fuel delivery means when said vehicle is coasting driven by its inertia and said engine is not operating in said auxiliary charging mode, (i) deactivating said gas exchange controlling means and said fuel delivery means when said engine does not operate in said auxiliary charging mode and said vehicle stops, and (j) restarting said engine after a full stop by operating it in said fourth propulsion mode.

47. A method of operating engine valves, said method comprising the steps of:

(a) providing at least one engine valve reciprocable between its closed and open positions within a head mounted to an engine cylinder, (b) providing a first hydraulic chamber and a second hydraulic chamber separated from each other by a partition, (c) providing a valve piston coupled to said at least one engine valve and reciprocable within said first hydraulic chamber, said valve piston dividing said first hydraulic chamber into a first upper volume and a first lower volume, (d) providing an amplifier piston reciprocable within said second hydraulic chamber, said amplifier piston dividing said second hydraulic chamber into a second upper volume and a second lower volume, (e) providing a rod coupled to or integral with said amplifier piston and protruding from said second lower volume through an opening in said partition into said first upper volume, where it remains in physical contact with said valve piston when said at least one engine valve is in its closed position and during an initial part of its opening stroke, (f) providing a high-pressure fluid source and a low-pressure fluid source, (g) providing a system of valves and conduits for selectively connecting said high-pressure and low-pressure fluid sources to said first and second hydraulic chambers, and for regulating the flow of fluid in the conduits, (h) providing a control means for control of said system of valves and conduits, and (i) using said control means for control of said system of valves and conduits to perform a process of repeated and variable opening and closing of said at least one engine valve in timed relation to the engine operation, whereby contribution of said amplifier piston to the initial acceleration force reduces the hydraulic pressure required to open said at least one engine valve against in-cylinder pressure, and whereby energy consumption needed for the engine valve operation is reduced.

48. The method of claim 47 further comprising the steps of:
  (a) providing a latching means for retaining said at least one engine valve in its closed position,
  (b) using said latching means to automatically latch said at least one engine valve in its closed position after it completes its closing stroke,
  (c) using said latching means to retain said at least one engine valve in its closed position during a time period between the end of its closing stroke and the beginning of its opening stroke, and
  (d) using said latching means to automatically unlatch said at least one engine valve before it begins its opening stroke,
whereby no hydraulic force is needed to retain said at least one engine valve in its closed position.

49. The method of claim 48 further including the step of providing a hydraulic means for unlatching said at least one engine valve, said hydraulic means using pressure from said high-pressure fluid source.

50. The method of claim 47 wherein the step of providing said system of valves and conduits comprises the steps of:
  (a) providing high-pressure conduits and a normally-closed high-pressure valve for selectively connecting said high-pressure fluid source to said first upper volume and said second upper volume,
  (b) providing low-pressure conduits and a normally-closed low-pressure valve for selectively connecting said low-pressure fluid source to said first upper volume and said second upper volume,
  (c) providing high-pressure conduits and a high-pressure check valve for connecting said high-pressure fluid source to said first upper volume and said second upper volume, the check valve installation being such that fluid can flow only into said high-pressure fluid source,
  (d) providing low-pressure conduits and a low-pressure check valve for connecting said low-pressure fluid source to said first upper volume and said second upper volume, the check valve installation being such that fluid can flow only out of said low-pressure fluid source,
  (e) providing a high-pressure conduit connecting said high-pressure fluid source to said first lower volume, and
  (f) providing a low-pressure conduit connecting said low-pressure fluid source to said second lower volume.

51. The method of claim 50 wherein the process of opening and closing of said at least one engine valve comprises the steps of:
  (a) variably opening said high-pressure valve and connecting said high-pressure fluid source to said first upper volume and said second upper volume, whereby the engine valve is accelerated in the direction of its opening by a combined acceleration force generated by hydraulic pressures acting on both the valve piston and the amplifier piston during said initial part of the engine valve opening stroke,
  (b) continuing acceleration of the engine valve in the direction of its opening by an acceleration force generated by hydraulic pressures acting on said valve piston,
  (c) variably closing said high-pressure valve and flowing fluid from said low-pressure fluid source through said low-pressure check valve into said first upper volume, whereby the engine valve is decelerated by a deceleration force generated by hydraulic pressures acting on said valve piston until the engine valve exhausts its momentum and stops in its open position,
  (d) preventing escape of fluid from said first upper volume, whereby the engine valve is maintained in its open position,
  (e) variably opening said low-pressure valve and connecting said low-pressure fluid source to said first upper volume and said second upper volume, whereby the engine valve is accelerated in the direction of its closing by an acceleration force generated by hydraulic pressures acting on said valve piston,
  (f) variably closing said low-pressure valve and flowing fluid from said first upper volume through said high-pressure check valve into said high-pressure fluid source, whereby the engine valve is decelerated by a deceleration force generated by hydraulic pressures acting on said valve piston until the engine valve exhausts its momentum and stops in its closed position,
  (g) using said control means to selectively vary the timings of openings of the high-pressure and low-pressure valves, whereby the timings of the engine valve opening and closing, respectively, are varied, and
  (h) using said control means to selectively vary the timings of closings of the high-pressure and low-pressure valves, whereby the stroke of the engine valve is varied,
whereby contribution of said amplifier piston to the initial acceleration force reduces the hydraulic pressure required to open said at least one engine valve against in-cylinder pressure, whereby energy consumption needed for the engine valve operation is reduced, and whereby said at least one engine valve is operated with variable timings of opening and closing and with a variable stroke.

* * * * *